United States Patent
Matsura et al.

(10) Patent No.: US 12,006,853 B2
(45) Date of Patent: Jun. 11, 2024

(54) ENGINE SYSTEM

(71) Applicant: Yanmar Holdings Co., Ltd., Osaka (JP)

(72) Inventors: Yoshimitsu Matsura, Osaka (JP); Yoshinori Fukui, Osaka (JP); Eito Yamaguchi, Osaka (JP); Yuki Kobayashi, Osaka (JP); Shinnosuke Miyazaki, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 17/983,387

(22) Filed: Nov. 8, 2022

(65) Prior Publication Data

US 2023/0147721 A1    May 11, 2023

(30) Foreign Application Priority Data

Nov. 9, 2021  (JP) .................................. 2021-182440
Nov. 9, 2021  (JP) .................................. 2021-182441

(51) Int. Cl.
| | | |
|---|---|---|
| *F01M 13/04* | (2006.01) | |
| *B01D 53/74* | (2006.01) | |
| *F01P 3/02* | (2006.01) | |
| *F01P 3/14* | (2006.01) | |
| *F01P 3/16* | (2006.01) | |
| *F02M 21/02* | (2006.01) | |
| *F01M 13/00* | (2006.01) | |

(52) U.S. Cl.
CPC ............. *F01M 13/04* (2013.01); *B01D 53/74* (2013.01); *F01P 3/02* (2013.01); *F01P 3/14* (2013.01); *F01P 3/16* (2013.01); *F02M 21/0278* (2013.01); *F01M 2013/0038* (2013.01); *F01M 2013/0438* (2013.01)

(58) Field of Classification Search
CPC ........... F01M 13/04; F01M 2013/0038; F01M 2013/0438; F01P 3/02; F01P 3/14; F01P 3/16; B01D 53/74; F02M 21/0278
See application file for complete search history.

(56) References Cited

U.S. PATENT DOCUMENTS 4,602,607 A  *  7/1986  Balsley ................ F01M 13/023
                                          123/41.86
6,234,154 B1 *  5/2001  Spix ....................... F01M 13/04
                                          123/572
(Continued)

FOREIGN PATENT DOCUMENTS

| JP | 2006-194197 A | 7/2006 |
|---|---|---|
| JP | 2018-127894 A | 8/2018 |

*Primary Examiner* — Syed O Hasan
(74) *Attorney, Agent, or Firm* — NORTON ROSE FULBRIGHT US LLP

(57) ABSTRACT

An engine system in which blow-by gas with a specific gravity less than 1 with reference to air is generatable includes a cylinder block. The cylinder block includes a cylinder and a crank chamber which are arranged in an up/down direction, the crank chamber being positioned below the cylinder. An internal peripheral face of the cylinder block has a ventilation port that connects to a ventilation passage that connects an internal space of the crank chamber with an external space out of the cylinder block, and that is open. The ventilation port is placed above a center in the up/down direction in the crank chamber.

21 Claims, 30 Drawing Sheets

(56) References Cited

U.S. PATENT DOCUMENTS

| | | | | |
|---|---|---|---|---|
| 7,047,955 B2* | 5/2006 | Ookawa | ............... | F01M 13/022 |
| | | | | 123/572 |
| 8,919,329 B2* | 12/2014 | Lohr | .................... | F02F 1/4235 |
| | | | | 123/572 |
| 2006/0032486 A1* | 2/2006 | Prasad | ................... | F01M 13/04 |
| | | | | 55/DIG. 19 |

* cited by examiner

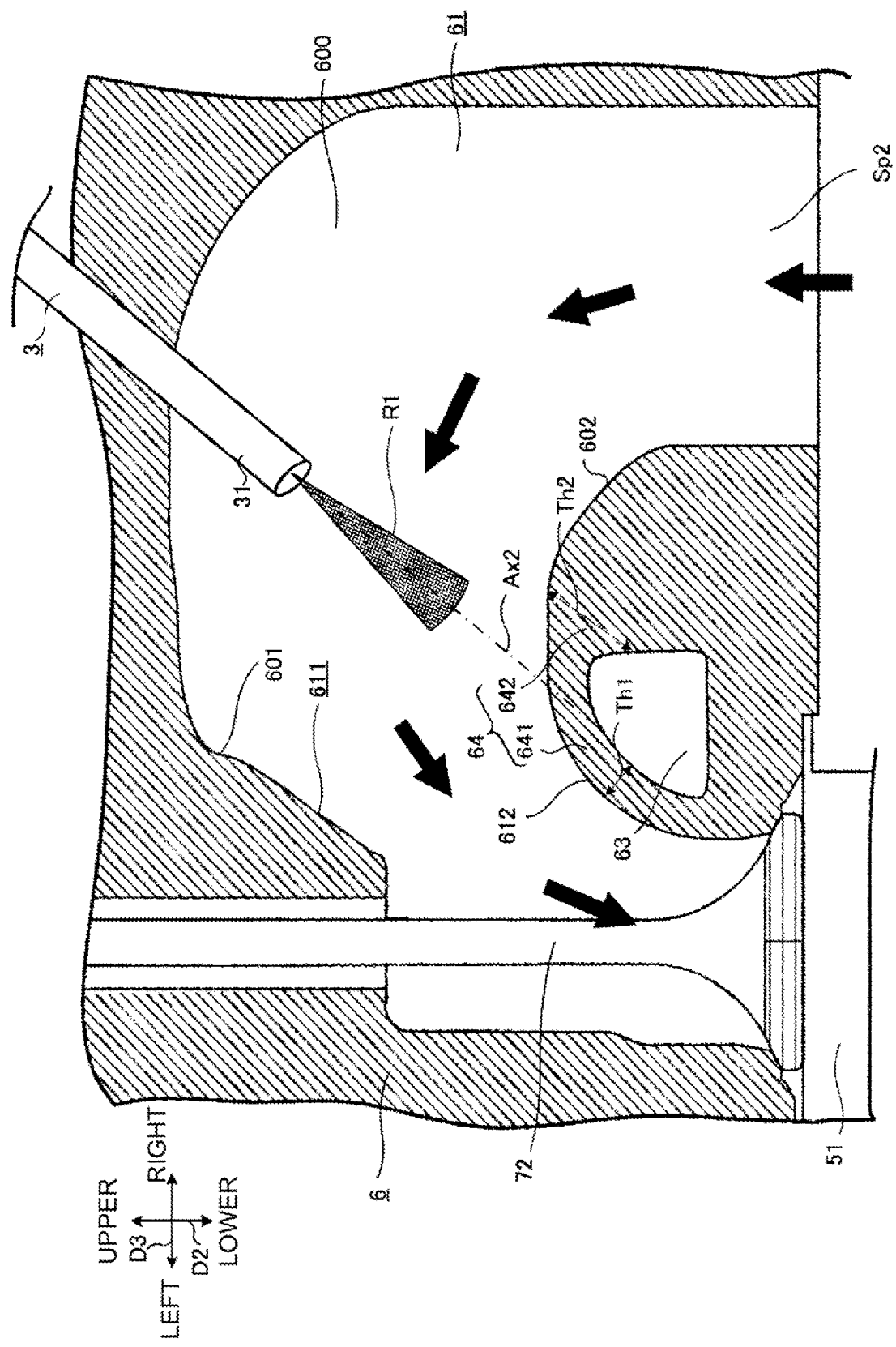

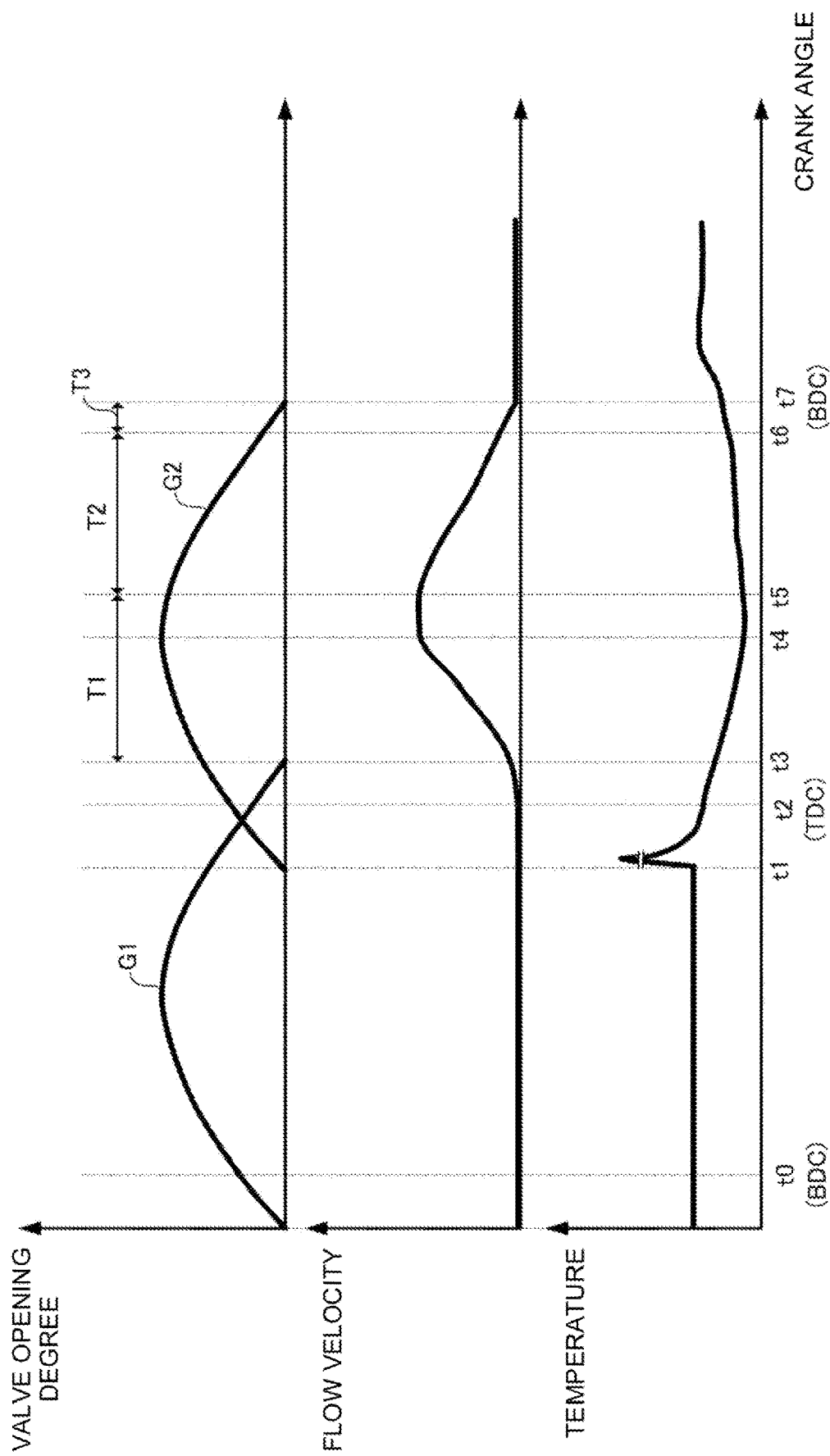

ENGINE SYSTEM

CROSS-REFERENCE TO RELATED APPLICATIONS

This application claims priority under 35 U.S.C. § 119 to JP Application No. 2021-182441 filed Nov. 9, 2021 and JP Application No. 2021-182440 filed Nov. 9, 2021, the entire contents of which are hereby incorporated by reference.

TECHNICAL FIELD

The present disclosure relates to an engine system in which blow-by gas with a specific gravity smaller than 1 with reference to air is generatable, and to an engine system provided with a fuel supply unit that supplies a gaseous fuel to an internal space of an intake port.

BACKGROUND ART

As a related technology, an engine system (internal combustion engine) with countermeasure for blow-by gas leaking out from a combustion chamber to a crank chamber (crankcase) is known (see, for example, Patent Document 1). In the engine system according to the related technology, an intake port to take in the blow-by gas from the crank chamber is provided on an internal face portion of the crank chamber. The intake port is connected to a blow-by gas passage by an intake passage, and the engine system is so configured as to return, by the blow-by gas passage, the blow-by gas to the combustion chamber via the intake system. Here, the intake port (the blow-by gas intake portion) is placed in a position below a crank journal, thereby to avoid an interference between the blow-by gas intake portion and the crankshaft's crank journal. Also known is a dual-injection type engine system (internal combustion engine) provided with an in-cylinder injector and an intake passage injector (see, for example, Patent Document 2). In the engine system according to the related technology, adjusting (correcting) a fuel injection volume suppresses generation of a backfire seen during an execution of a purging process of fuel evaporated gas. Specifically, at the time of executing the purging process of the fuel evaporated gas seen when a sharing ratio of the in-cylinder injector and the intake passage injector is within a predetermined range, the fuel injection volume correction that corresponds to a to-be-introduced purged fuel volume is performed by changing only the fuel injection volume from the intake passage injector.

PRIOR ART DOCUMENT

Patent Document

Patent Document 1: Japanese Unexamined Patent Application Publication No. 2018-127894
Patent Document 2: Japanese Unexamined Patent Application Publication No. 2006-194197

SUMMARY OF INVENTION

Technical Problem

By the way, in an engine system using a gaseous fuel, such as hydrogen, with a specific gravity smaller than 1, for example, blow-by gas leaking out to a crank chamber is likely to stay above the crank chamber. Therefore, placing the intake port in a position below the crank journal, as in the above related technology may not be able to efficiently discharge the blow-by gas from the crank chamber. Further, in the engine system that uses the gaseous fuel such as hydrogen, for example, the fuel is, as the case may be, more easily ignited. Therefore, it is desirable, in the event of occurrence of the backfire, to perform a further backfire countermeasure in anticipation of a possible ignition of the fuel supplied in the intake port and a chain of backfires.

An object of the present disclosure is to provide an engine system that efficiently discharges blow-by gas from a crank chamber with ease, and an engine system that is capable of providing a further backfire countermeasure.

Solution to Problem

An engine system according to one mode of the present disclosure is an engine system in which blow-by gas with a specific gravity less than 1 with reference to air is generatable, the engine system including: a cylinder block. The cylinder block includes a cylinder and a crank chamber which are arranged in an up/down direction, the crank chamber being positioned below the cylinder. An internal peripheral face of the cylinder block has a ventilation port that connects to a ventilation passage that connects an internal space of the crank chamber with an external space out of the cylinder block, and that is open. The ventilation port is placed above a center in the up/down direction in the crank chamber. Further, the engine system according to one mode of the present disclosure, includes: an intake port, and a fuel supply unit. The intake port supplies the air to a combustion chamber. The fuel supply unit supplies a gaseous fuel to an internal space of the intake port. The fuel supply unit has an injection unit that injects the gaseous fuel. Of an internal peripheral face of the intake port, at least an intersection with a central axis of an injection area of the gaseous fuel from the injection unit has a cooled portion.

Advantageous Effects of Invention

According to the present disclosure, it is possible to provide an engine system that efficiently discharges blow-by gas from a crank chamber with ease, and an engine system that is capable of providing a further backfire countermeasure.

BRIEF DESCRIPTION OF DRAWINGS

FIG. 20 is a schematic cross sectional view showing the configuration around an intake port of the engine system according to the first embodiment.

FIG. 22 is a timing chart showing an example of a controlling operation of the engine system according to the first embodiment.

DESCRIPTION OF EMBODIMENTS

Figure 1:
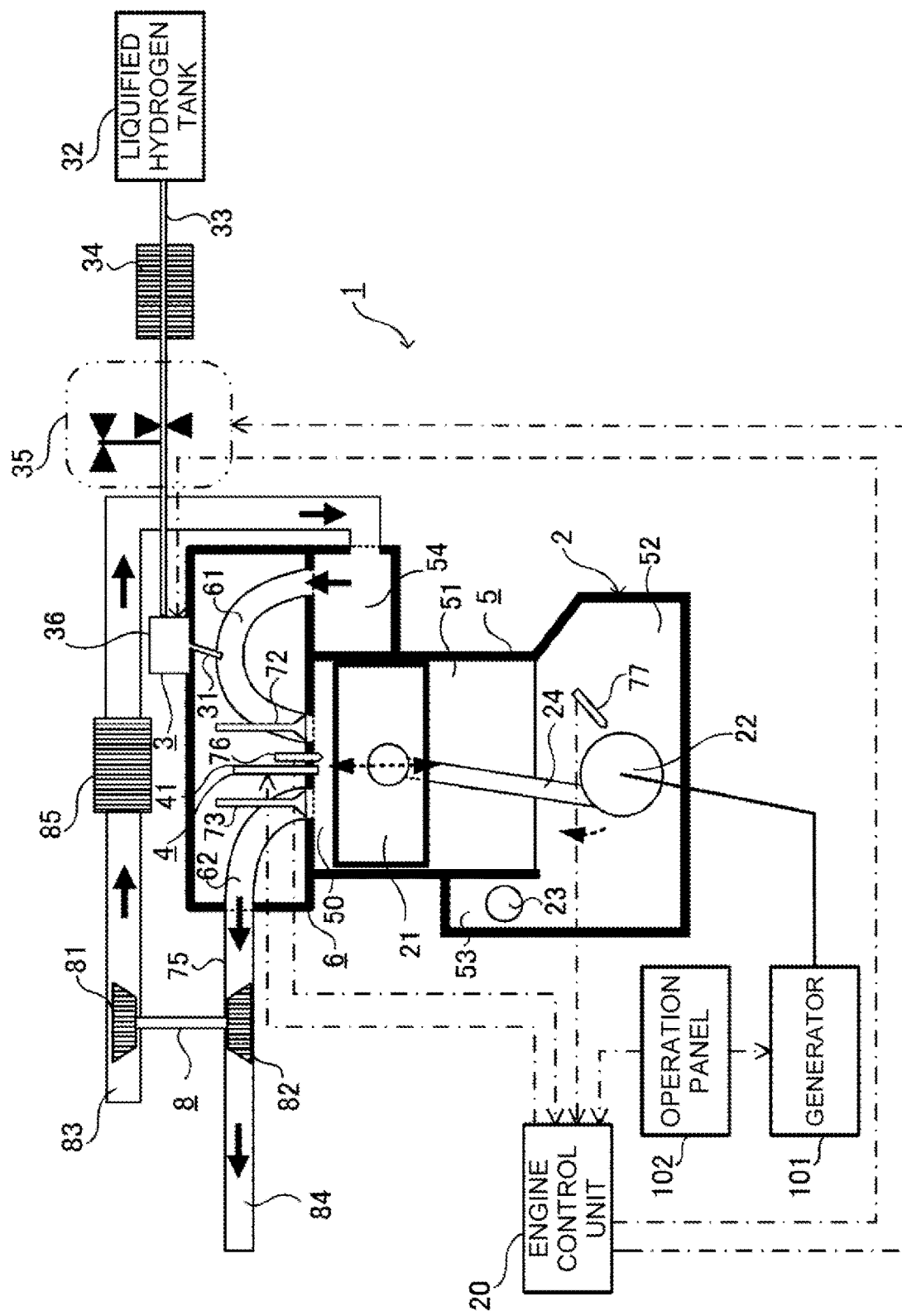
FIG. 1 is a system diagram showing a schematic configuration of an engine system according to a first embodiment.

A description will hereinafter be made on embodiments of the present disclosure with reference to the accompanying drawings. The following embodiments are each one example that embodies the present disclosure, and are not intended to limit the technical scope of the present disclosure. The drawings referenced in the present disclosure are all schematic views, and the respective ratios of size and thickness of each component in the drawings do not necessarily reflect the actual dimensional ratios.

First Embodiment

[1] Overall Configuration

First, an overall configuration of an engine system 1 according to the present embodiment will be described with reference to FIGS. 1 to 6. FIG. 1 schematically shows a configuration of each portion of the engine system 1, showing electrical connections by dashed dotted lines (toward a direction of flow of electrical signal).

As shown in FIG. 1, the engine system 1 according to the present embodiment is provided with an engine body 2 which is a main component of the engine system 1. The term "engine" here includes an internal combustion engine that is a heat engine for generating mechanical energy (dynamic power) by combusting a fuel and that is a prime mover in which the combustion of the fuel takes place inside the engine and combustion gas is used as operation gas to convert thermal energy into the mechanical energy. That is, the engine body 2 generates the dynamic power (mechanical energy) by using the supplied fuel.

The engine body 2 according to the present embodiment is a reciprocating engine that converts a reciprocating movement of the piston 21 (see FIG. 1) into a rotational movement, and outputs a rotational power as dynamic power. In particular, according to the present embodiment, a hydrogen fueled internal combustion engine, that is, a hydrogen fueled reciprocating engine, which uses at least hydrogen as fuel, is described as an example of the engine body 2.

As an example, the present embodiment describes the engine system 1 used for a ship 10, as shown in FIG. 1. This engine system 1 is mounted on a hull 100 of the ship 10. That is, the ship 10 according to the present embodiment includes the engine system 1 and the hull 100. The engine system 1 is used as a drive source for generating a propelling power to propel the hull 100.

According to the present embodiment, the engine system 1 is further usable as a drive source for driving a generator 101 (see FIG. 1) to generate electrical energy (power) for use in the hull 100. That is, the engine system 1 is used for generating the propelling power for the hull 100 or as a drive source for driving the generator 101. The electrical energy generated by the generator 101 may be stored in an energy storage unit.

Figure 2:
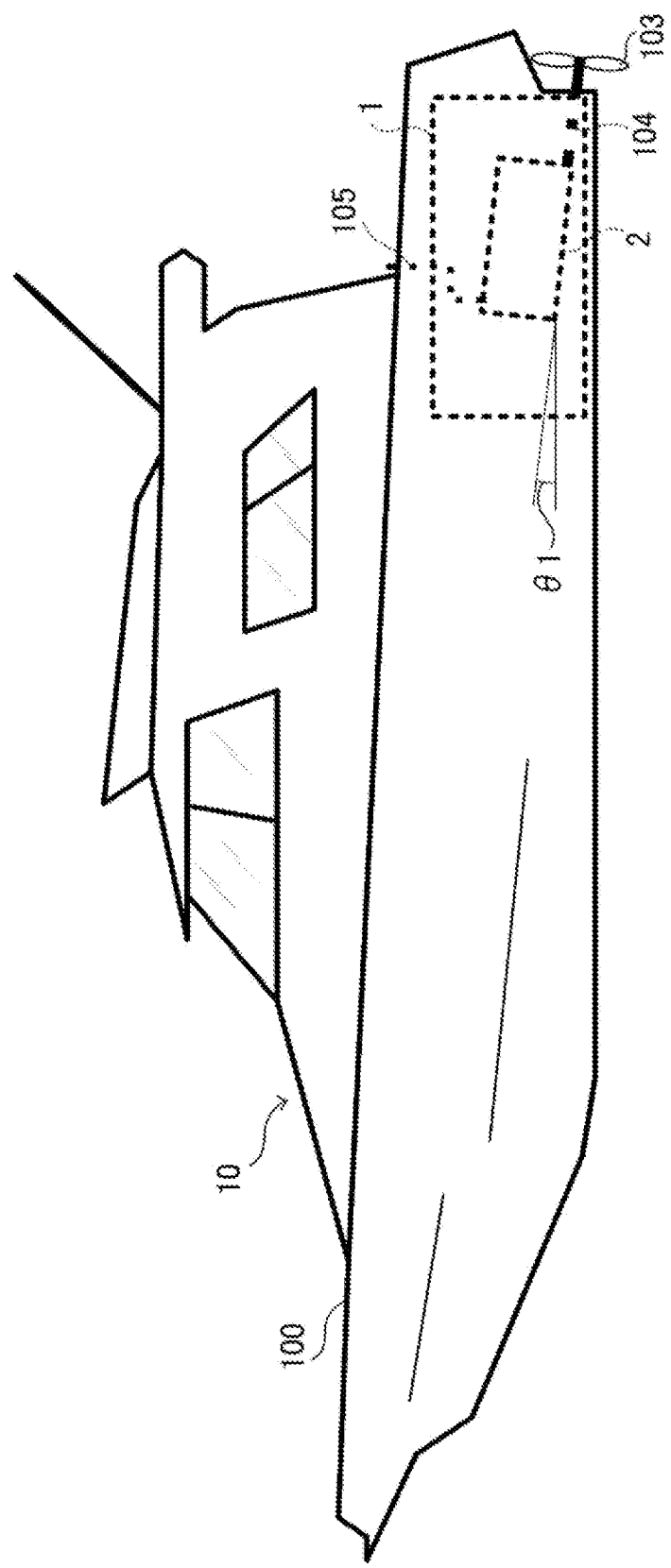
FIG. 2 is an explanatory view showing a schematic configuration of a ship provided with the engine system according to the first embodiment.

The ship 10 is a moving body that sails (navigates) on water such as ocean, lake, or river. As an example of the present embodiment, the ship 10 is a "pleasure boat" that is a small-sized ship mainly used for sport, recreation, or the like. The hull 100 of the ship 10, as shown in FIG. 2, has a propeller 103 and a propeller shaft 104. By the propeller shaft 104, the propeller 103 is connected to the engine body 2 of the engine system 1. The ship 10 receives dynamic power generated by the engine body 2 and rotates the propeller 103 around the propeller shaft 104, to thereby generate the propelling power to move the hull 100 forward or rearward.

The engine body 2 is mounted via a base platform, for example, on an internal bottom plate of an engine chamber of the hull 100. Here, when the hull 100 is anchored on the water, the engine body 2 is placed at an inclination angle of θ1 in one forward direction of the hull 100 relative to the horizontal plane, as shown in FIG. 2. Specifically, the engine body 2, with a crankshaft 22 (see FIG. 1)'s rotational axis Ax1 (FIG. 3) along the forward direction of the hull 100, is placed in a "forward up" posture inclined in a manner to be higher on the forward side (side for moving forward) in the forward direction of the hull 100.

Further, according to the present embodiment, the ship 10 is configured to be operated according to an operation (including a remote operation) by a person (a navigator); in particular, the ship 10 is of a manned type that can be boarded by the person as the navigator. Therefore, in the hull 100, the ship 10 has an operation panel 102 (see FIG. 1) that accepts the operation by the operator; in response to the operation on the operation panel 102, an engine control unit 20 of the engine system 1 drives the engine body 2. This allows the ship 10 to drive the engine body 2 in response to the navigator's operation and rotate the propeller 103, thereby making it possible to move the hull 100 forward or rearward. Further, the hull 100 further includes various onboard facilities including a rudder mechanism, a display unit, a communication unit, and a lighting facility. When the engine system 1 is used to drive the generator 101, the engine control unit 20 drives the engine body 2 according to a control state (generator load) of the generator 101 or the person (operator)'s operation (including remote control).

The engine system 1 according to the present embodiment is a so-called dual-fuel engine (DF engine) which is applicable to any of a premix combustion method in which a gaseous fuel is mixed with air before flowing into a combustion chamber 50, and a diffusion combustion method in which a liquid fuel is injected into the combustion chamber 50 for combustion. Here, the gaseous fuel is hydrogen as an example, and the liquid fuel is a fossil fuel (such as light oil or gasoline) as an example. More specifically, by using a diesel oil as the liquid fuel, the engine system 1 is applicable to any of a gas mode which uses hydrogen as fuel, and a diesel mode which uses diesel oil as fuel. Here, in the gas mode, a small volume of liquid fuel (such as light oil) may be further used as an ignition fuel.

Figure 3:
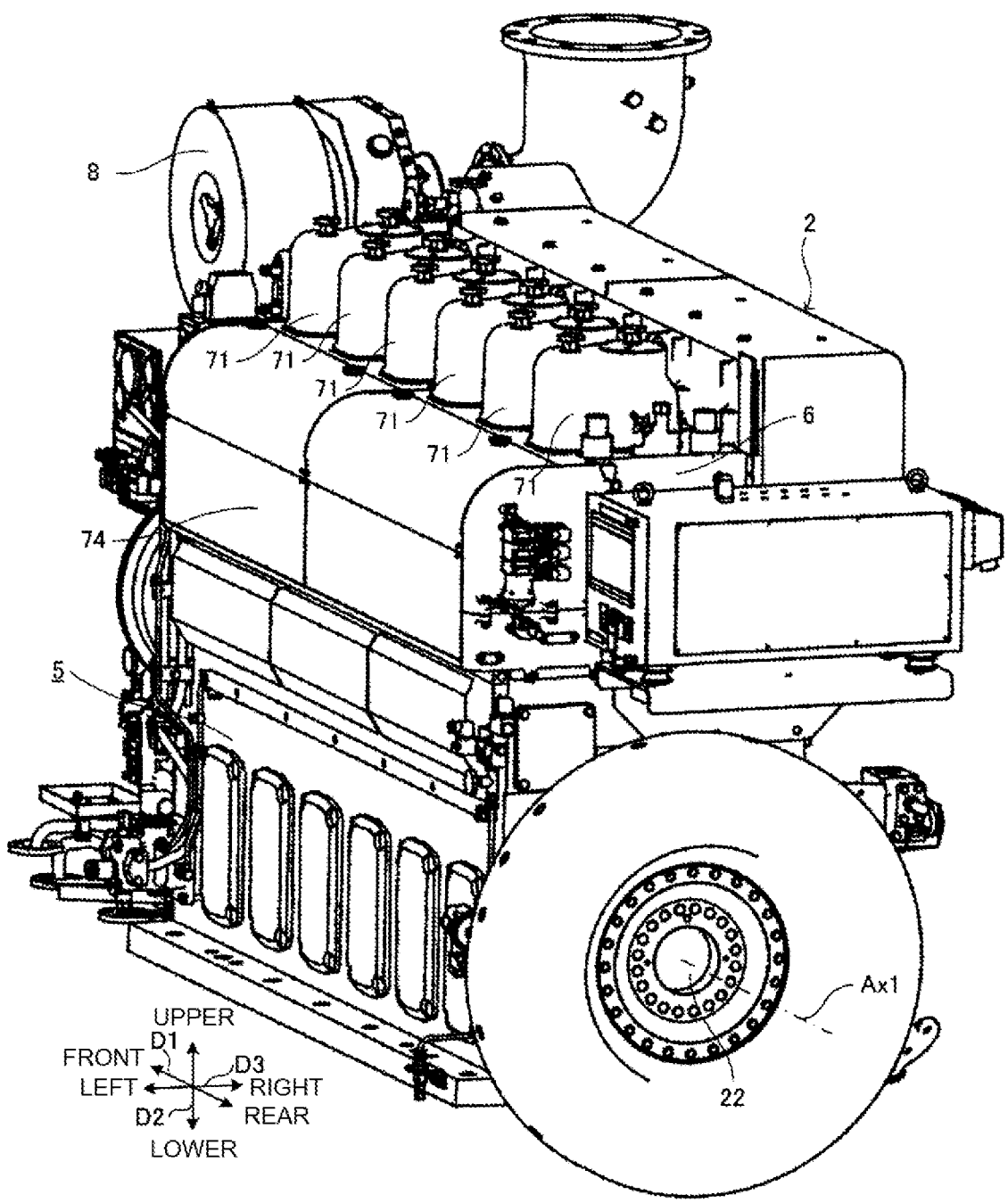
FIG. 3 is a schematic perspective view of an engine body of the engine system according to the first embodiment.

For convenience of explanation, a direction along the rotational axis Ax1 of the crankshaft 22, as shown in FIG. 3, is defined as an output axis direction D1. Further, as shown in FIG. 3, a direction orthogonal to the output axis direction D1 and along a vertical direction seen when the engine body 2 is ready for use is defined as an up/down direction D2, and a direction orthogonal to both the output axis direction D1 and the up/down direction D2 is defined as a width direction D3. Here, one of the output axis directions D1 is defined as "forward" and another as "rearward"; in the crankshaft 22, the side connected to the propeller shaft 104 (the side where a flywheel is placed) is defined as "rearward". Similarly, one side of the width direction D3 is defined as "leftward" and another side as "rightward". Further, of the up/down direction D2, the side where a cylinder 51 (see FIG. 1) is placed as seen from an after-described crank chamber 52 (see FIG. 1) is defined as "upward", and the opposite side is defined as "downward.

In other words, each of the directions used in the present embodiment is a direction defined with reference to the rotational axis Ax1 of the crankshaft 22. Here, as described above, the engine body 2, with the crankshaft 22's rotational axis Ax1 along the forward direction of the hull 100, is placed in the "forward up" posture inclined relative to the horizontal plane by the inclination angle θ1. Therefore, a virtual straight line extending in the up/down direction D2 is to be inclined (to the rearward side), by the inclination angle θ1, relative to a vertical direction seen in a state of the engine body 2 installed on the hull 100. However, any of the above directions is not intended to limit a use direction (a direction in use) of the engine body 2.

The crankshaft 22 as an engine output shaft protrudes rearward from a rear end portion of the engine body 2. To the crankshaft 22, the propeller shaft 104 is connected via a reduction gear. Driving the engine body 2 thereby to rotate the crankshaft 22 around rotational axis Ax1 rotates the propeller 103, which connects to the propeller shaft 104, thereby to generate a propelling power of the hull 100. When the engine system 1 is used to drive the generator 101, the generator 101 is connected to the crankshaft 22. In this case, driving the engine body 2 thereby to rotate the crankshaft 22 around the rotational axis Ax1 drives the generator 101 thereby to generate electrical energy.

The engine system 1 according to the present embodiment is the dual-fuel engine, as described above. Therefore, the engine system 1 can select any of the premix combustion method (gas mode) in which the gaseous fuel (hydrogen) is mixed with air for combustion, and the diffusion combustion method (diesel mode) in which the liquid fuel (light oil) is diffused for combustion, making it possible to drive the engine body 2. Therefore, it is so configured that, the engine body 2 can be supplied with two types of fuels from outside the engine body 2, that is, the gaseous fuel (in this case hydrogen) and the liquid fuel (in this case light oil).

That is, the engine system 1 has a fuel supply unit 3 for supplying the gaseous fuel and a liquid fuel supply unit 4 for supplying the liquid fuel, as shown in FIG. 1.

The fuel supply unit 3 has an injection unit 31, a liquefied hydrogen tank 32, a fuel supply path 33, a vaporizer 34, a pressure regulator valve 35, and a gas admission valve 36. The liquefied hydrogen tank 32 is a fuel tank that tanks the liquefied gaseous fuel (in this case hydrogen), and is connected through the fuel supply path 33 to the gas admission valve 36. The vaporizer 34 and the pressure regulator valve 35 are inserted in the fuel supply path 33 in the following order from the upstream: vaporizer 34 and pressure regulator valve 35. The vaporizer 34 vaporizes the liquefied hydrogen. The pressure regulator valve 35 is a gas valve unit that regulates the gaseous fuel's supply volume to the engine body 2. From a nozzle-shaped (cylindrical) injection unit 31 into the engine body 2, the gas admission valve 36 injects the gaseous fuel supplied through the fuel supply path 33.

The liquid fuel supply unit 4 has a liquid fuel injection unit 41. The liquid fuel supply unit 4 is connected via a liquid fuel supply path to a liquid fuel tank. From the nozzle-shaped (cylindrical) liquid fuel injection unit 41 into the engine body 2, the liquid fuel supply unit 4 injects the liquid fuel supplied through the liquid fuel supply path.

Here, the injection unit 31, which injects the gaseous fuel, is placed in a position facing the internal portion of an intake port 61 connecting to the combustion chamber 50, and the liquid fuel injection unit 41, which injects the liquid fuel, is placed in a position facing the combustion chamber 50. As a result, the injection unit 31 injects the gaseous fuel into the intake port 61, causing the gaseous fuel to mix with air thereafter to flow the mixture into the combustion chamber 50. Meanwhile, the liquid fuel injection unit 41 directly injects the liquid fuel into the combustion chamber 50. That is, a port injection method is used for the gaseous fuel, and a direct injection method is used for the liquid fuel.

Figure 4:
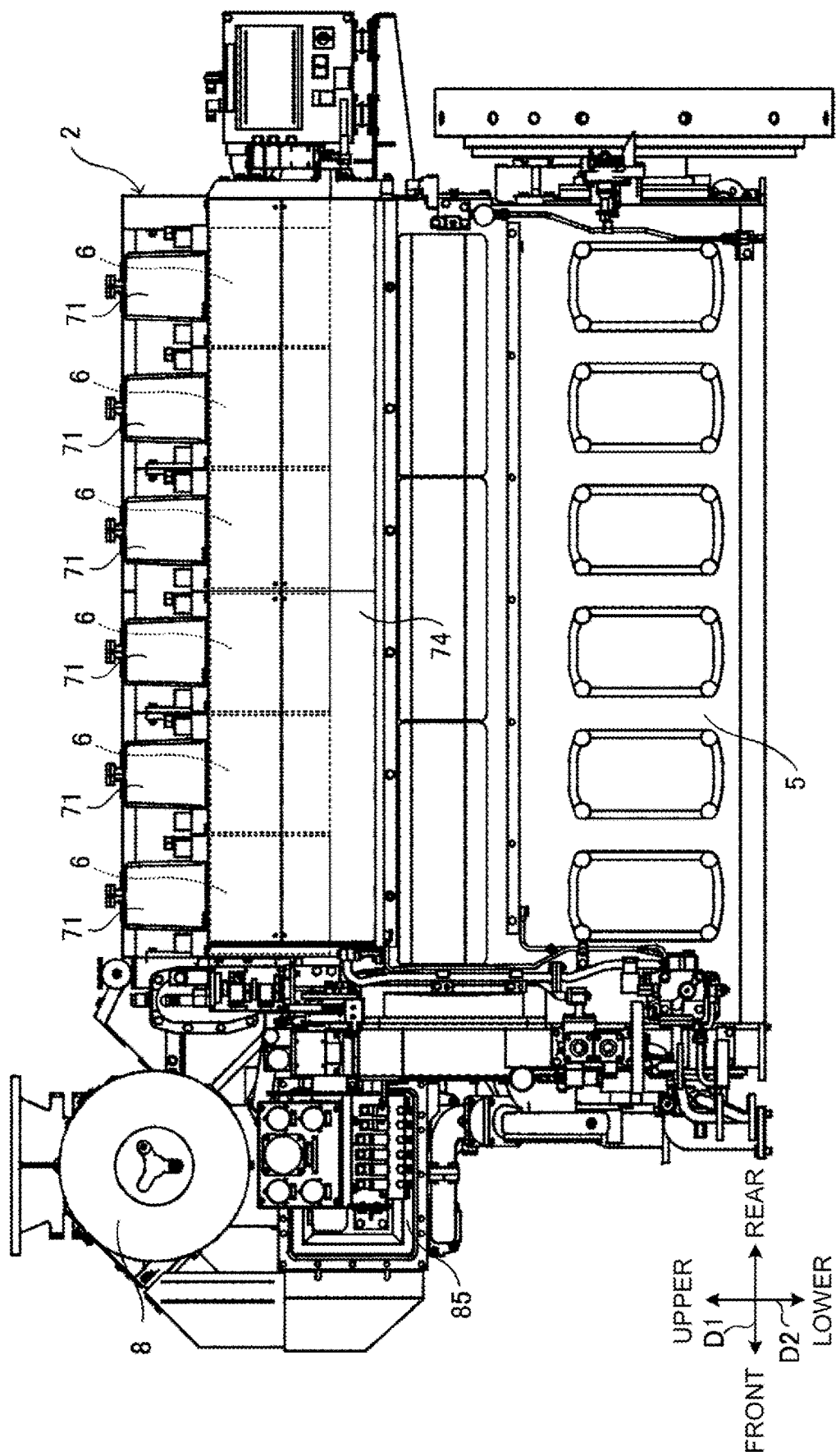
FIG. 4 is a schematic left side view of the engine body of the engine system according to the first embodiment.

The engine body 2 includes a cylinder head 6 assembled on a cylinder block 5, as shown in FIGS. 3 and 4. The cylinder block 5 has a cylinder 51 (cylinder) and a crank chamber 52. The cylinder head 6 has the intake port 61 and an exhaust port 62. As shown in FIG. 3, at a lower portion of the cylinder block 5, the crankshaft 22 is rotatably supported with the rotational axis Ax1 in the output axis direction D1.

Figure 5:
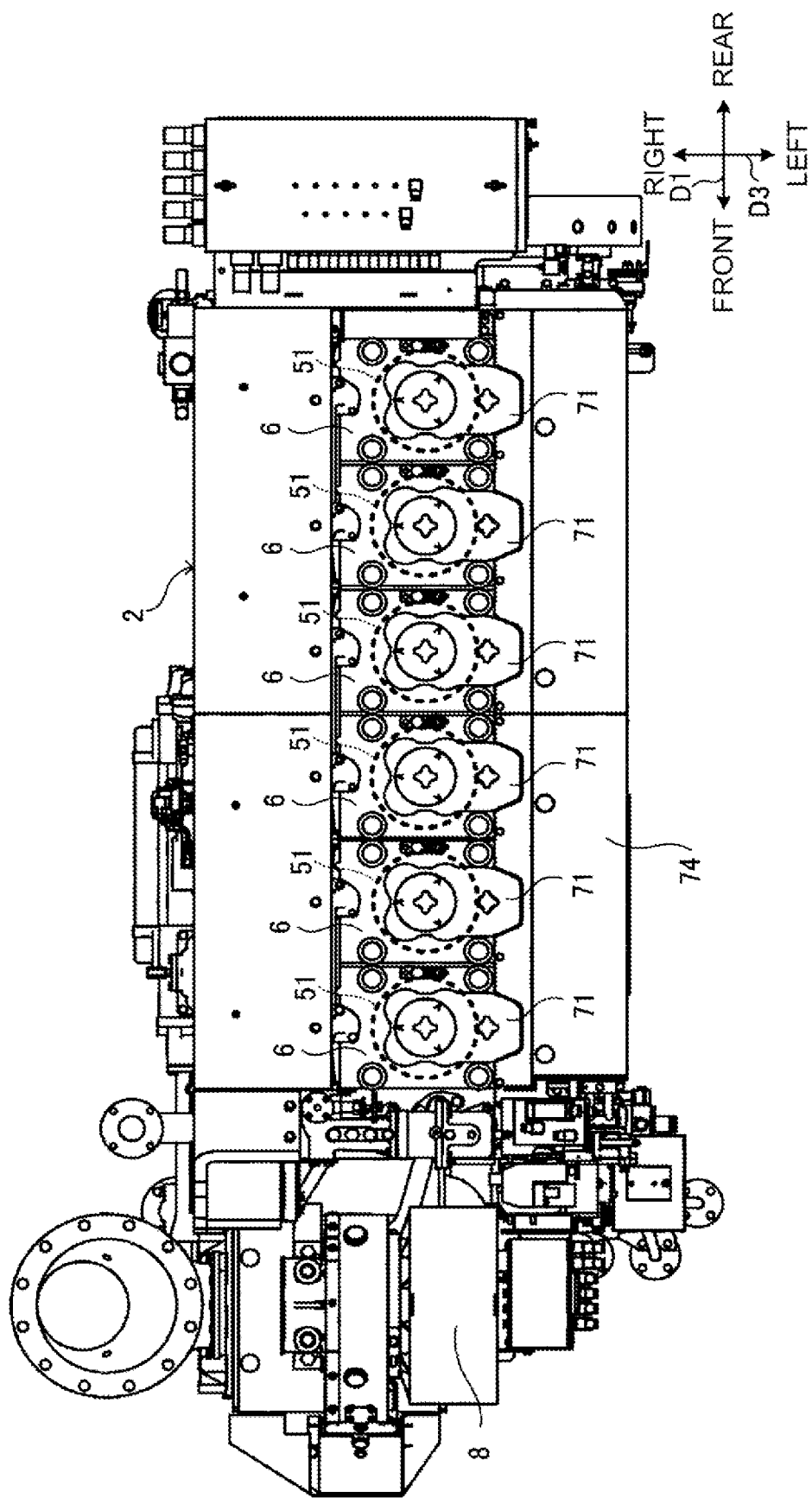
FIG. 5 is a schematic plan view of the engine body of the engine system according to the first embodiment.

As shown in FIG. 5, the cylinder block 5 has multiple cylinders (six in the present embodiment) 51 formed to be arranged on one row (in line) along the rotational axis Ax1 of the crankshaft 22. That is, in the present embodiment, the engine body 2 is an in-line multi-cylinder engine (in-line 6-cylinder engine) with multiple cylinders 51 arranged in line. The output axis direction D1 along the rotational axis Ax1 of the crankshaft 22 and a direction of arranging the multiple cylinders 51 are consistent. In each of the cylinders 51, as shown in FIG. 1, a piston 21 is housed in a manner to be slidable, i.e., reciprocable, in the up/down direction D2. The piston 21 is connected to the crankshaft 22 via a connecting rod 24.

Multiple cylinder heads 6 are so provided as to correspond one-to-one to the multiple cylinders 51 (six in the present embodiment). The multiple cylinder heads 6 (six in the present embodiment) are fixed to the upper portion of one cylinder block 5 in a manner to cover the cylinders 51 from above, respectively. That is, of the multiple cylinder heads 6 are arranged in one row in the output axis direction D1. As shown in FIG. 1, of the internal space of each of the cylinders 51, a space enclosed by the upper face of the piston 21 and the lower face of the cylinder head 6 functions as the combustion chamber 50. That is, reciprocating the piston 21 the up/down direction D2 allows the combustion chamber 50 to alternately expands and contracts.

In a one-to-one correspondence with the multiple cylinders 51 (six in the present embodiment), multiple head covers 71 are arranged in one row in the output axis direction D1 to be placed on the cylinder head 6. Inside of each of the head covers 71, there is housed a valve operating mechanism including a push rod, a rocker arm, etc. for operating an intake valve 72 and an exhaust valve 73. Of the intake port 61 formed in the cylinder head 6, an opening that connects to the combustion chamber 50 is opened and closed by the intake valve 72. Of the exhaust port 62 formed in the cylinder head 6, an opening that connects to the combustion chamber 50 is opened and closed by the exhaust valve 73. With this; when the intake valve 72 is open, air from the intake port 61 (intake air) can be taken into the combustion chamber 50. When the exhaust valve 73 is open, exhaust air from the combustion chamber 50 can be discharged to the exhaust port 62.

Figure 6:
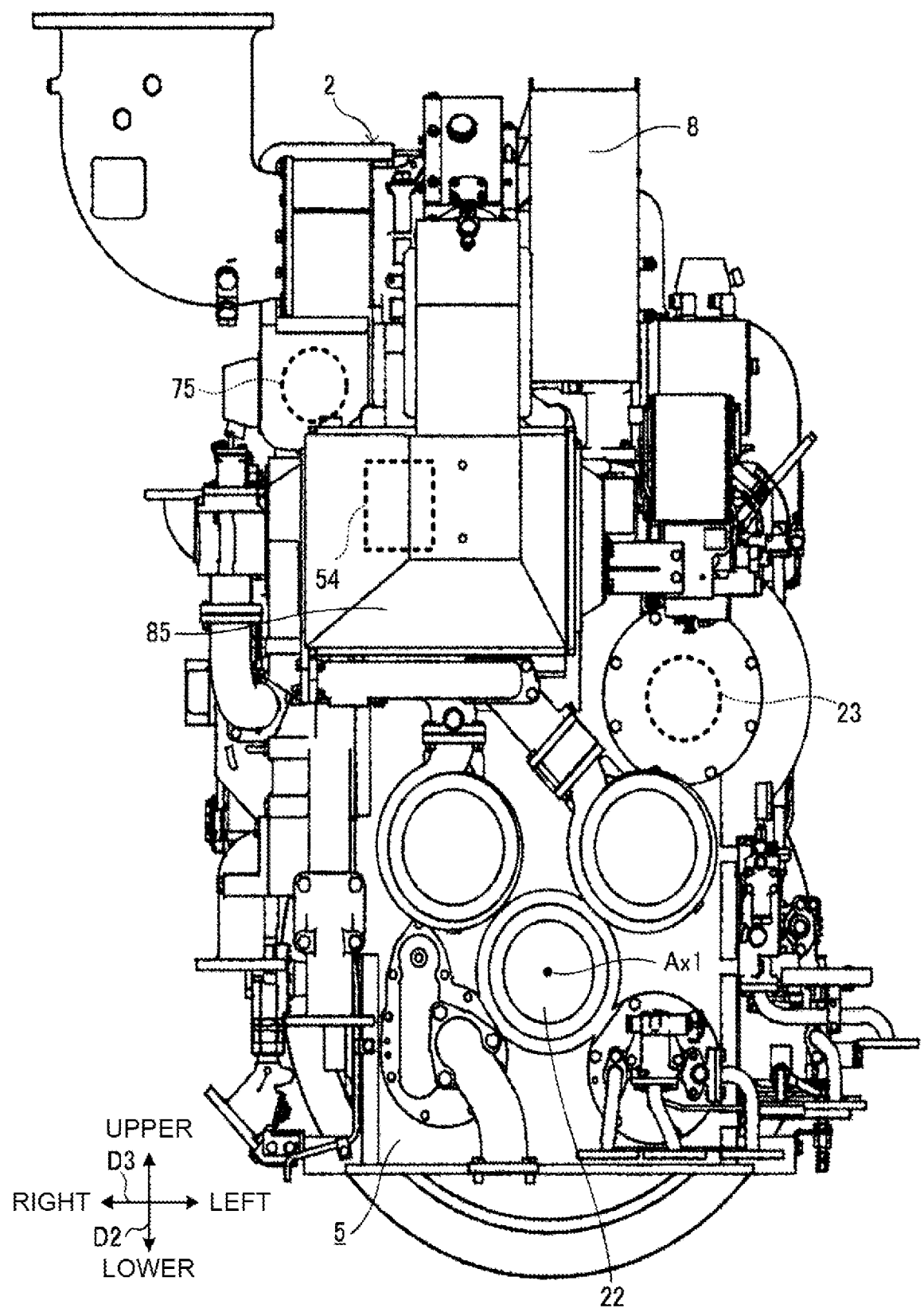
FIG. 6 is a schematic front view of the engine body of the engine system according to the first embodiment.

The intake valve 72 and the exhaust valve 73 are opened and closed by a camshaft 23 (see FIG. 1). The camshaft 23 is housed in a cam chamber 53 placed to the left of the cylinder 51 in the cylinder block 5, as shown in FIGS. 1 and 6. The cam chamber 53 is formed in the cylinder block 5 integrally with the cylinder 51, the crank chamber 52, etc. The cam chamber 53 extends in the output axis direction D1, and houses the camshaft 23 which likewise extends in the output axis direction D1. In conjunction with the rotation of the crankshaft 22, the camshaft 23 rotates about the rotational axis along the output axis direction D1, thereby to open and close each of the intake valve 72 and the exhaust valve 73.

A side cover 74 is mounted to a site above the cylinder block 5 and the left to the cylinder head 6. That is, a step is formed at the upper portion of the left side of the engine body 2, and the side cover 74 is so mounted as to cover this step portion. In a space covered with the side cover 74, there are placed a liquid fuel supply rail piping, a main fuel injection pump, a pilot fuel supply rail piping, and the like. The liquid fuel supply rail piping is so placed as to extend in the output axis direction D1, and during combustion in the diffusion combustion method, distributes and supplies the liquid fuel to the combustion chamber 50 of each of the cylinders 51. The liquid fuel supplied to the liquid fuel supply rail piping is distributed to the main fuel injection pump provided for each of the cylinders 51, and the liquid fuel supplied from the main fuel injection pump is injected from the liquid fuel injection unit 41 into the combustion chamber 50. For the purpose of the gaseous fuel ignition during the combustion in the premix combustion method, the pilot fuel supply rail piping distributes and supplies the pilot fuel to the combustion chamber 50 of each of the cylinders 51.

As shown in FIGS. 1 and 6, on the right of the cylinder 51 in the cylinder block 5, there is placed an intake manifold 54 for distributing and supplying, to the combustion chamber 50 of each of the cylinders 51, the air (intake air) from outside the engine body 2. The intake manifold 54 is formed in the cylinder block 5 integrally with the cylinder 51, the crank chamber 52, etc. The intake manifold 54 extends in the output axis direction D1, and connects to the multiple intake ports 61 formed in the multiple cylinder heads 6. This distributes the air from the intake manifold 54 to the multiple intake ports 61. That is, the intake manifold 54, through the intake port 61, communicates to the combustion chamber 50 of each of the cylinders 51.

As shown in FIG. 6, at the upper right of the cylinder head 6, there is placed an exhaust manifold 75 that collects the exhaust air generated by the combustion in the combustion chamber 50 of each of the cylinders 51, thereby to discharge the exhaust air to outside of the engine body 2. The exhaust manifold 75 extends in the output axis direction D1, connecting to the multiple exhaust ports 62 formed at the multiple cylinder heads 6. This allows the exhaust air from the multiple exhaust ports 62 to be concentrated in the exhaust manifold 75. That is, the exhaust manifold 75, through the exhaust port 62, communicates to the combustion chamber 50 of each of the cylinders 51.

Here, the engine body 2's main components such as the cylinder block 5, the cylinder head 6, and the piston 21 are made of metal materials such as aluminum alloy and cast iron. The above main components have a desired durability (including rigidity and wear resistance) and relatively excellent thermal conductivity.

According to the above configuration; when the engine body 2 is being driven in the diffusion combustion method, the liquid fuel is injected into the combustion chamber 50 from the liquid fuel injection unit 41, at proper timing when the air supplied from the intake manifold 54 to each of the cylinders 51 is compressed by the piston 21's sliding. As the liquid fuel is injected into the combustion chamber 50, the piston 21 makes a reciprocating movement in the cylinder 51 by the propelling power acquired from an explosion caused in the combustion chamber 50, converting the reciprocating movement of the piston 21 into a rotational movement of the crankshaft 22 via the connecting rod 24. With this, the engine body 2 outputs the rotational power of the crankshaft 22 as dynamic power (mechanical energy).

Meanwhile, when the engine body 2 is being driven in the premix combustion method, the gaseous fuel supplied from the liquefied hydrogen tank 32 through the fuel supply path 33 is injected from the injection unit 31 into the intake port 61. With this, the air supplied from the intake manifold 54 to intake port 61 mixes with the gaseous fuel in the intake port 61. Therefore, a mixture of the air and the gaseous fuel is introduced from the intake port 61 into each of the cylinders 51, and at the proper timing when the mixture is compressed by the piston 21's sliding, a small volume of pilot fuel is injected into the combustion chamber 50, thereby to ignite the gaseous fuel. The piston 21 reciprocates in the cylinder 51 by the propelling power acquired from the explosion generated in the combustion chamber 50, converting the reciprocating movement of the piston 21 into the rotational movement of the crankshaft 22 via the connecting rod 24. With this, the engine body 2 outputs the rotational power of the crankshaft 22 as dynamic power (mechanical energy).

In any of the diffusion combustion method and the premix combustion method, the exhaust air generated by the combustion (explosion) in the combustion chamber 50 is pushed out from the cylinder 51 by the movement of the piston 21, and collected in the exhaust manifold 75 through the exhaust port 62, followed by being discharged to the outside of the engine body 2.

Further, the engine system 1 according to the present embodiment is a supercharged engine provided with a turbocharger 8 (see FIG. 1) in addition to the engine body 2. The turbocharger 8 is placed on and above the front portion of the engine body 2, as shown in FIGS. 3 and 4.

The turbocharger 8 has an intake side turbine 81 and an exhaust side turbine 82, as shown in FIG. 1. The intake side turbine 81 is placed on an intake passage 83 to take air into the intake manifold 54. The exhaust side turbine 82 is placed on an exhaust passage 84 connecting to the exhaust manifold 75. The exhaust side turbine 82 is connected to the intake side turbine 81, and the flow of air (exhaust air), which is discharged through the exhaust passage 84, rotating the exhaust side turbine 82 rotates the intake side turbine 81. As the intake side turbine 81 rotates, the air taken in from the intake passage 83 (intake air) is compressed, and sent through an intercooler 85 to the intake manifold 54. The intercooler 85, as shown in FIG. 6, is placed along the front end face of the engine body 2, and cools the air (intake air) compressed by the turbocharger 8. The bold arrow in FIG. 1 shows the flow (airflow) of air (including intake air and exhaust air).

By the way, in addition to the engine body 2 (and turbocharger 8) having the above configuration, the engine system 1 according to the present embodiment, as shown in FIG. 1, is further provided with the engine control unit 20, an in-cylinder pressure sensor 76, a revolution speed sensor 77, etc.

The engine control unit 20 is mainly configured by a computer system having at least one processors such as a CPU (Central Processing Unit) and at least one storages such as a ROM (Read Only Storage) and a RAM (Random Access Storage), and executes various processes (information process). A program (engine control program) for causing at least one processor to execute the engine control method is recorded in the at least one storage in the engine control unit 20. The engine control unit 20 outputs a control signal (electrical signal) to the pressure regulator valve 35, the gas admission valve 36, the liquid fuel injection unit 41, etc., controlling the pressure regulator valve 35, the gas admission valve 36, the liquid fuel injection unit 41, etc. Thereby, the engine control unit 20 can so control the engine body 2 as to adjust the engine body 2's output (mainly, revolution speed) to an arbitrary value.

The in-cylinder pressure sensor 76 is placed at a position facing the combustion chamber 50 of each of the cylinders 51, measures the pressure in the combustion chamber 50, and outputs, to the engine control unit 20, an electrical signal that corresponds to the measured value (pressure). The revolution speed sensor 77 measures the number of revolutions (and rotational angle) of the crankshaft 22, and outputs, to the engine control unit 20, an electrical signal that corresponds to the measured value (the number of revolutions).

[2] Definition

The term "blow-by gas" in the present disclosure means, of the combustion gas (exhaust), the uncombusted gas, etc. which became high in pressure in the compression stroke or combustion stroke of the engine body 2, the gas that leaked out from the cylinder 51 (combustion chamber 50) to the crank chamber 52 through a gap between an internal peripheral face of the cylinder 51 and an external peripheral face of the piston 21. That is, the term "the blow-by gas" includes "compressed leak gas", which becomes high in pressure during the compression stroke and which is the mixture in the combustion chamber 50, leaks out to the crank chamber 52. That is, when the uncombusted gas, etc. in the combustion chamber 50 exceeds a piston ring (compression ring)'s seal capacity for ensuring airtightness between the cylinder 51 and the piston 21, the uncombusted gas, etc. in the combustion chamber 50 as the blow-by gas leaks out to the crank chamber 52, as the case may be.

The term "specific gravity" referred to in the present disclosure means the ratio of the density of a certain substance to the density of a reference substance; the specific gravity for gas is expressed as the ratio of the gas's density to the density of air as the reference substance at the same temperature and same pressure. Therefore, when the specific gravity of the blow-by gas as a gaseous body, is smaller than "1", the mass of the blow-by gas is smaller (i.e., lighter) than the air of the same volume (as the blow-by gas) at the same temperature and same pressure as the blow-by gas. Conversely, when the specific gravity of the blow-by gas as the gaseous body is greater than "1", the mass of the blow-by gas is greater (i.e., heavier) than the air of the same volume (as the blow-by gas) at the same temperature and same pressure as the blow-by gas. As an example, the specific gravity of hydrogen is "0.06952" which is well below "1", so when the main component of the blow-by gas is hydrogen, the specific gravity of the blow-by gas is smaller than "1", therefore, the blow-by gas is lighter than the air of the same volume at the same temperature and same pressure. Alternatively, the specific gravity of the gas may be expressed as the ratio of the gas's density to the density of air as a reference substance in a standard condition (0° C., 1 atm).

The term "backfire" referred to in the present disclosure means, for example, a flame that is unintentionally ignited in the combustion chamber 50, the intake port 61, etc., in the intake stroke, and that is present in the combustion chamber 50, the intake port 61, etc. Therefore, when the backfire occurs in the intake stroke (with the intake valve 72 open), the intake port 61 may be exposed to the flame.

The term "parallel" referred to in the present disclosure means a relation that, in addition to the case where two straight lines on one plane do not intersect no matter how far they are extended, that is, the angle between the two is strictly 0 degree (or 180 degree), the angle between the two is within an error range of several degrees (less than 10 degree, for example) relative to 0 degree. Similarly, the term "orthogonal" referred to in the present disclosure means a relation that, in addition to the case where the angle of intersection between the two is exactly 90 degrees, the angle between the two is within an error range of several degrees (less than 10 degrees, for example) relative to 90 degrees.

[3] Configuration of Cylinder Block

Figure 7:
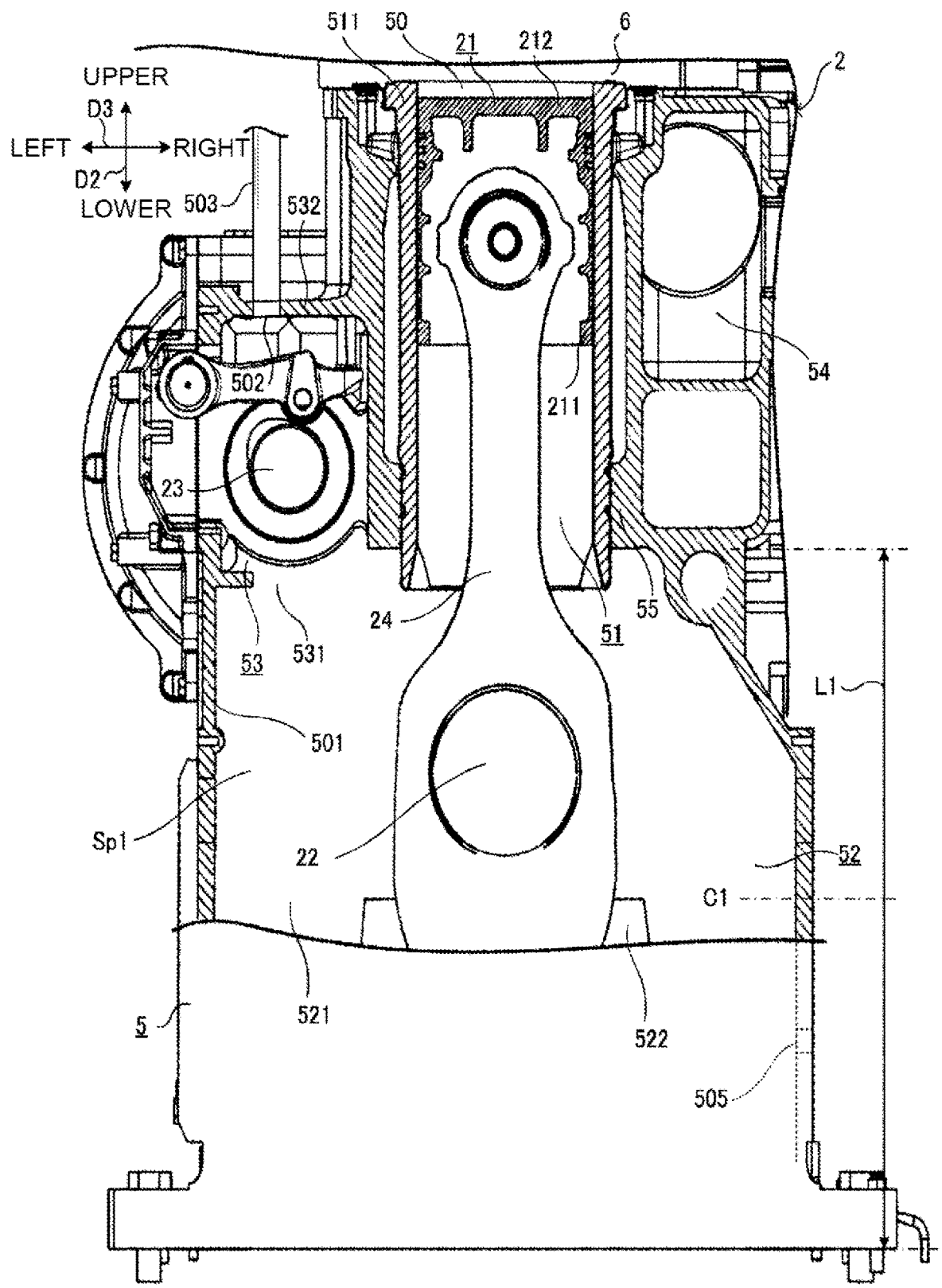
FIG. 7 is a schematic view partially breaking an essential portion of the engine body of the engine system according to the first embodiment.

Then, the configuration of the cylinder block 5 (and its surrounding configuration) of the engine body 2 is to be described in more detail with reference to FIGS. 7 through 16. FIG. 7 shows a schematic view of the engine body 2 from the rear side (side from which the crankshaft 22 protrudes) which is one side in the output axis direction D1, partially breaking the cylinder block 5 and adding diagonal lines (hatching) to a main cross section. FIG. 7 properly omits the side cover 74 and the like.

In the present embodiment, in addition to the cylinder 51 and the crank chamber 52, as described above, the cylinder block 5 is formed with the cam chambers 53 and the intake manifold 54. The cylinder 51, the crank chamber 52, the cam chamber 53, and the intake manifold 54 all include compartments (chambers) that are separated from each other inside the cylinder block 5, and each has its own internal space. Therefore, an internal peripheral face of each of the cylinders 51, the crank chamber 52, the cam chamber 53, and the intake manifold 54 is included in an internal peripheral face 501 of the cylinder block 5. Specifically, the crank chamber 52 is placed in the lower portion of the cylinder block 5, and the cylinder 51, the cam chamber 53, and the intake manifold 54 are placed above crank chamber 52. Of the cylinder 51, the cam chamber 53 and the intake manifold 54, the cylinder 51 is placed in the center of the width direction D3, the cam chamber 53 is placed to the left of the cylinder 51, and the intake manifold 54 is placed to the right of the cylinder 51. Thus, the cylinder block 5 includes the cylinder 51 and the crank chamber 52 which are arranged in the up/down direction D2, with the crank chamber 52 placed below the cylinder 51.

Here, in FIG. 7, the cylinder 51, the crank chamber 52, the cam chamber 53 and the intake manifold 54 are shown one by one, but in reality, the multiple cylinders 51 (six in the present embodiment) are arranged in the output axis direction D1 (perpendicular to the paper face in FIG. 7). Meanwhile, the crank chambers 52 are partitioned in the output axis direction D1 by a partition wall 521 placed between the adjacent cylinders 51, but is integrally continuous by a communicating hole 522 formed at the lower portion of the partition wall 521. That is, the crank chambers 52 include a single compartment (chamber) connecting in the output axis direction D1. Further, an opening portion 531 is formed in the lower face of the cam chamber 53, and an internal space of the cam chamber 53 is continuous with an internal space Sp1 of the crank chamber 52 through the opening portion 531. The intake manifold 54 includes a single compartment (chamber) extending in the output axis direction D1.

The cylinder 51 is formed in the shape of a cylinder extending in the up/down direction D2, and inside which the piston 21 is housed for reciprocating movement along the up/down direction D2. The cylinder 51's both end faces in the up/down direction D2 are open. The piston 21 is a cylindrical member having an external diameter that corresponds to an internal diameter of the cylinder 51, and the internal space of the cylinder 51 is bisected in the up/down direction D2 by the piston 21. Then, of the internal spaces of the cylinder 51, the space above the piston 21, i.e., the space enclosed by the upper face of the piston 21 and the lower face of cylinder head 6 is the combustion chamber 50. Meanwhile, of the internal spaces of the cylinder 51, the space below the piston 21 is continuous with the internal space Sp1 of the crank chamber 52.

In the present embodiment, the piston 21 is made of a hollow member with a lower face (the face facing the crank chamber 52) opened. That is, the piston 21 has a cylindrical portion 211 and a bulkhead 212. The cylindrical portion 211 is a cylindrical site with both end portions open in the up/down direction D2, and the bulkhead 212 is a site that covers the upper face of the cylindrical portion 211. Here, the cylindrical portion 211 and the bulkhead 212 are integrally formed, and the piston 21 as a whole is formed into a bottomed cylindrical shape. Therefore, strictly speaking, of the internal spaces of the cylinder 51, the combustion chamber 50, and a space continuous with the internal space Sp1 of the crank chamber 52 are separated by the bulkhead 212. In other words, the space above the bulkhead 212 is the combustion chamber 50, and the space below the bulkhead 212, including the internal space of the cylindrical portion 211, is continuous to the internal space Sp1 of the crank chamber 52. The connecting rod 24, with its upper end portion inserted into the piston 21, is supported by the piston 21.

In the present embodiment, the cylinder 51 is composed of a cylinder liner 511 that guides the piston 21. The cylinder liner 511, which is a cylindrical component, has the piston 21 slide relative to an internal peripheral face of the cylinder liner 511, thereby to regulate the movement direction (up/down direction D2) of the piston 21. The cylinder liner 511 is supported at a liner support wall 55 of the cylinder block 5. The liner support wall 55 is a cylindrical site that is one-step greater in internal diameter than the cylinder liner 511, and the cylinder liner 511, by being fitted into the liner support wall 55, is fixed to the cylinder block 5. Here, the cylinder liner 511's dimension in the up/down direction D2 is greater than the liner support wall 55's dimension in the up/down direction D2, and the lower end portion of the cylinder liner 511 protrudes downward (toward the crankshaft 22 side) from the lower face of the liner support wall 55. In short, in the present embodiment, the cylinder block 5 has the liner support wall 55 that supports the cylinder liner 511 included in the cylinder 51. The lower end of the cylinder liner 511 protrudes downward from the lower end of the liner support wall 55.

The crank chamber 52 is placed below the cylinder 51, as described above. In the internal space Sp1 of the crank chamber 52, the crankshaft 22 is housed in a manner to be rotatable around the rotational axis Ax1. The crankshaft 22 is rotatably supported by the partition wall 521 and rotates in conjunction with the reciprocating movement of the piston 21 connected via the connecting rod 24. Here, by the piston 21, the crank chamber 52 is separated from the combustion chamber 50 that is of the internal spaces of the cylinder 51 and that is above the piston 21. However, for example, in the compression stroke causing a high pressure in the combustion chamber 50, the blow-by gas such as uncombusted gas, as the case may be, leaks out from the combustion chamber 50 to the crank chamber 52 through the gap between the cylinder 51 and the piston 21, as described above.

By the way, as a related technology, an engine system is known that takes countermeasure against the blow-by gas leaking out from the combustion chamber 50 to the crank chamber 52. In the engine system according to the related technology, the internal peripheral face portion of the crank chamber 52 is provided with an intake port to take in the blow-by gas from the crank chamber 52. The intake port is connected to a blow-by gas passage by an intake passage, and the engine system is configured to return, by the blow-by gas passage, the blow-by gas to the combustion chamber 50 via an intake system. Here, the intake port (blow-by gas intake portion) is placed in a position below a crank journal, thereby to avoid an interference between the blow-by gas intake portion and the crankshaft 22's crank journal.

However, in the engine system 1 that uses the gaseous fuel such as hydrogen with a specific gravity smaller than 1, for example, the blow-by gas having leaked out to the crank chamber 52 is likely to stay above the crank chamber 52. Therefore, when the intake port is placed in the position below the crank journal as in the above related technology, the blow-by gas may not be efficiently discharged from the crank chamber 52.

Therefore, in the present embodiment, adopting the configuration described below makes it possible to provide the engine system 1 that efficiently discharges the blow-by gas from the crank chamber 52 with ease.

That is, the engine system 1 according to the present embodiment is an engine system 1 in which the blow-by gas with a specific gravity smaller than 1 with reference to air is generatable. In the above engine system 1, the internal peripheral face 501 of the cylinder block 5 has a ventilation port 502 that is open. The ventilation port 502 is an opening (hole) connecting to a ventilation passage 503 that connects the internal space Sp1 of the crank chamber 52 with an external space out of the cylinder block 5. The ventilation port 502 is placed above a center C1 in the up/down direction D2 in the crank chamber 52.

In short, in the engine system 1 where using the gaseous fuel such as hydrogen with a specific gravity of less than 1, for example, may generate the blow-by gas with a specific gravity of less than 1 (with reference to air), adopting the above configuration makes it possible to efficiently discharge the blow-by gas. In the engine system 1 of this type, the blow-by gas leaking out to the crank chamber 52 is likely to stay above the crank chamber 52. In the engine system 1 according to the present embodiment, the ventilation port 502 is placed above the center C1 in the crank chamber 52, thus making it possible to efficiently discharge, from the ventilation port 502, the blow-by gas that stays above the crank chamber 52. That is, since the ventilation port 502 serving as an outlet of the blow-by gas is formed in a site above the crank chamber 52, in which site the blow-by gas stays, the blow-by gas is efficiently discharged from the internal space Sp1 of the crank chamber 52 via the ventilation port 502 (and ventilation passage 503). The above can provide the engine system 1 that efficiently discharges the blow-by gas from the crank chamber 52 with ease.

Specifically, as shown in FIG. 7, the center C1 in the crank chamber 52 in the up/down direction D2 is set at a position that bisects the crank chamber 52's dimension (height dimension) L1 in the up/down direction D2. That is, the center C1 is set at a position that is equidistant from both the upper end and lower end of the crank chamber 52. The ventilation port 502 is so placed as to be positioned on the upper side in the up/down direction D2, that is, on the cylinder 51 side, as viewed from this center C1. In plan view, the ventilation port 502 is open in a circular shape (true circle) that is large enough to allow the blow-by gas to pass through, for example. However, the ventilation port 502, not limited to the circular shape, may be open in an oval shape, a square shape, or a polygonal shape, for example.

More in detail, the ventilation port 502 is placed above the lower end of the cylinder 51. That is, in the up/down direction D2, the ventilation port 502 is placed above the center C1 of the crank chamber 52, and above the lower end of the cylinder 51. The lower end of the cylinder 51 here is the cylinder 51's lowest site that faces the crank chamber 52. In the present embodiment, the cylinder liner 511 included in the cylinder 51 protrudes downward from the lower end of the liner support wall 55, as described above, so the lower end (lower face) of the cylinder liner 511 is the lower end of the cylinder 51. As shown in FIG. 7, the lower end of the cylinder 51 (lower end of the cylinder liner 511) is placed above the center C1 in the crank chamber 52 in the up/down direction D2, and the ventilation port 502 is placed further above the lower end of the above cylinder 51.

With this, after leaking out from the lower end of the cylinder 51 to the crank chamber 52, the blow-by gas which has the specific gravity of less than 1 is likely to be directed to the ventilation port 502 side positioned above the lower end of the cylinder 51. As a result, it becomes easy to more efficiently discharge the blow-by gas from the crank chamber 52, making it possible to improve the performance of discharging the blow-by gas.

The ventilation port 502 opens downward. Here, in the up/down direction D2, the crank chamber 52 side is "down" viewed from the cylinder 51, so the ventilation port 502 is to open toward the crank chamber 52 side as viewed from the cylinder 51. Since the ventilation port 502 is open in the internal peripheral face 501 of the cylinder block 5, the ventilation port 502 is formed in the downward-facing site of the internal peripheral face 501, i.e., the site serving as an upper face, thus realizing the ventilation port 502 open downward. It is sufficient that the ventilation port 502 should open downward, including not only a configuration that opens strictly straight down, but also a configuration that opens diagonally downward. That is, a normal of an opening face of the ventilation port 502 may be parallel to the up/down direction D2, or may be inclined relative to the up/down direction D2.

With this, after leaking out from the lower end of the cylinder 51 to the crank chamber 52, the blow-by gas which has the specific gravity of less than 1 is likely to be discharged from the ventilation port 502 at the time of flowing upward. As a result, it becomes easy to more efficiently discharge the blow-by gas from the crank chamber 52, making it possible to improve the performance of discharging the blow-by gas.

In the present embodiment, as described above, the cylinder block 5 connects to the crank chamber 52, and further includes the cam chamber 53 that houses the camshaft 23. Here, the ventilation port 502 is formed in the cam chamber 53. In short, as shown in FIG. 7, the ventilation port 502 is placed in the cam chamber 53, of the cylinder block 5 which includes the cylinder 51, the crank chamber 52, the cam chamber 53, etc. Here, as an example, the ventilation port 502 is formed at the cam chamber 53's position above the camshaft 23, i.e., at an upper wall portion 532 of the cam chamber 53. Here, the ventilation port 502 penetrates the upper wall portion 532 in the up/down direction D2. The internal space of the cam chamber 53 is continuous with the internal space Sp1 of the crank chamber 52 through the opening portion 531, so the blow-by gas leaking out to the crank chamber 52 is introduced into the cam chamber 53 through the opening portion 531.

With this, using the space to house the camshaft 23, without having to build a new space to form the ventilation port 502, can efficiently discharge the blow-by gas from the crank chamber 52. Moreover, since the cam chamber 53 is positioned above the crank chamber 52, the blow-by gas with the specific gravity less than 1, after leaking out to the crank chamber 52, can easily collect to the cam chamber 53 formed with the ventilation port 502, making it possible to improve the performance of discharging the blow-by gas.

As an example of the present embodiment, the ventilation passage 503 is a cylindrical pipe (tube) that extends straight from the ventilation port 502 along the up/down direction D2, as shown in FIG. 7. The ventilation passage 503 is coupled to the ventilation port 502, serving as a passage of the blow-by gas discharged from the ventilation port 502. The tip (opposite the ventilation port 502) of the ventilation passage 503 is placed in a proper position of a space outside the cylinder block 5. As an example, the tip of the ventilation passage 503 may be placed inside the side cover 74 or outside the side cover 74. Further, the tip of the ventilation passage 503 may be positioned outside the hull 100 in which the engine body 2 is mounted or may be connected to a ventilation unit provided in the engine chamber of the hull 100.

The ventilation passage 503 is, however, not limited to this configuration, and may be shaped other than cylindrical, such as a square cylinder, or may be a tube or a hose, for example. Further, as long as being able to be configured to serve as the blow-by gas's passage between the internal space Sp1 of the crank chamber 52 and the external space out of the cylinder block 5, the ventilation passage 503 need not even be a cylindrical member. That is, as long as the ventilation port 502 ultimately connects to the external space out of the cylinder block 5 through the ventilation passage 503, the internal space of the side cover 74, for example, may serve as the ventilation passage 503.

Figure 8:
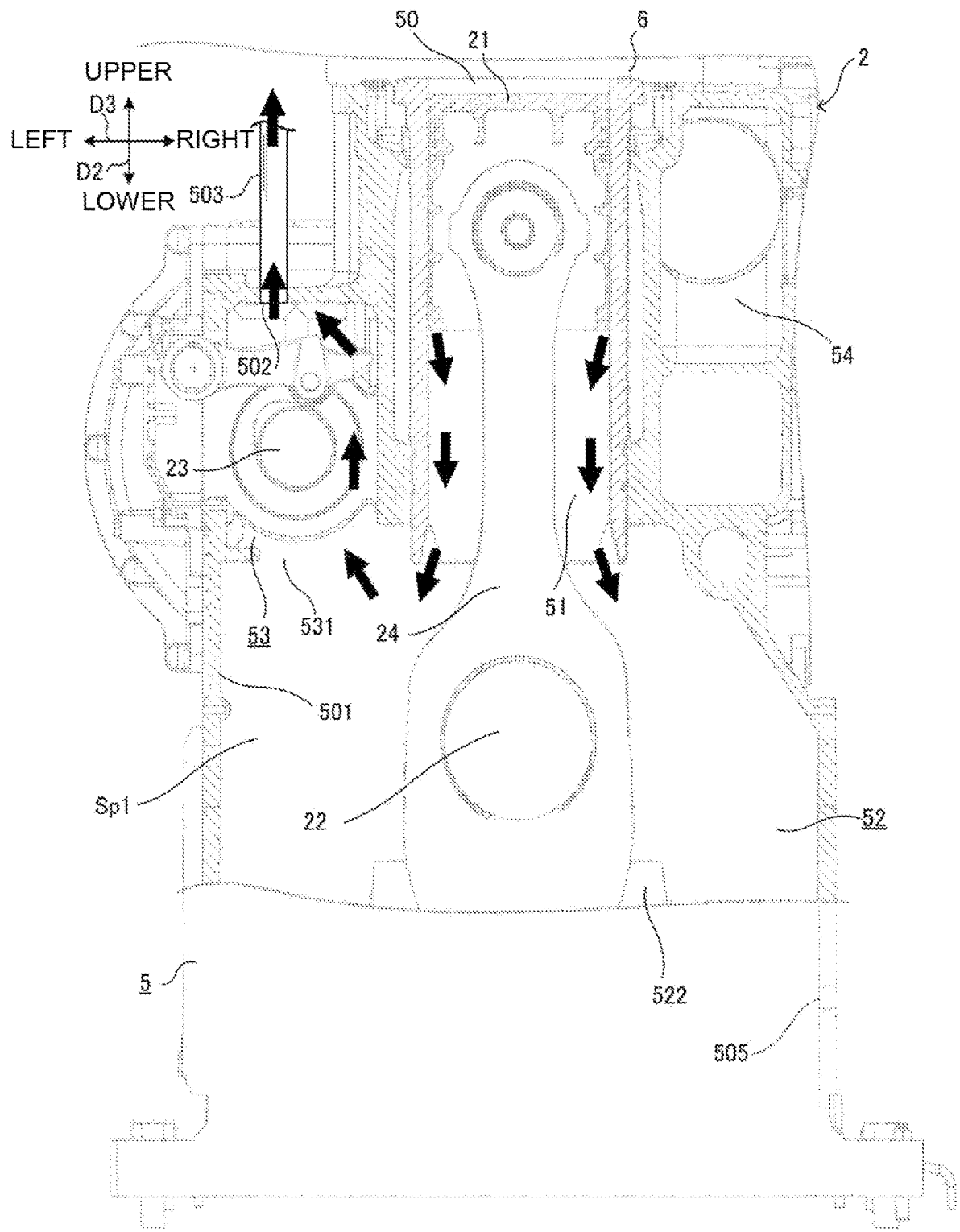
FIG. 8 is a schematic explanatory view of flow of blow-by gas in the engine system according to the first embodiment.

According to the configuration described above, as shown in FIG. 8, the blow-by gas is efficiently discharged from the internal space Sp1 of the crank chamber 52 via the ventilation port 502 (and ventilation passage 503). In FIG. 8, the flow of the blow-by gas is shown by bold arrows. That is, the uncombusted gas or the like leaks from the combustion chamber 50 to the crank chamber 52 through the gap between the cylinder 51 and the piston 21, generating the blow-by gas. In the present embodiment, using the gaseous fuel (hydrogen) with the specific gravity smaller than 1 also makes the specific gravity smaller than 1 for the blow-by gas, thereby to cause the blow-by gas having leaked out to the crank chamber 52 to move upward in the crank chamber 52. Above the crank chamber 52, there is provided the cam chamber 53 connected, by the opening portion 531, to the internal space Sp1 of the crank chamber 52, thereby to allow the blow-by gas, which moves upward, to flow into the cam chamber 53 through the opening portion 531. As a result, the blow-by gas is discharged from the ventilation port 502 of the cam chamber 53, and is discharged through the ventilation passage 503 to the external space out of the cylinder block 5.

Figure 9:
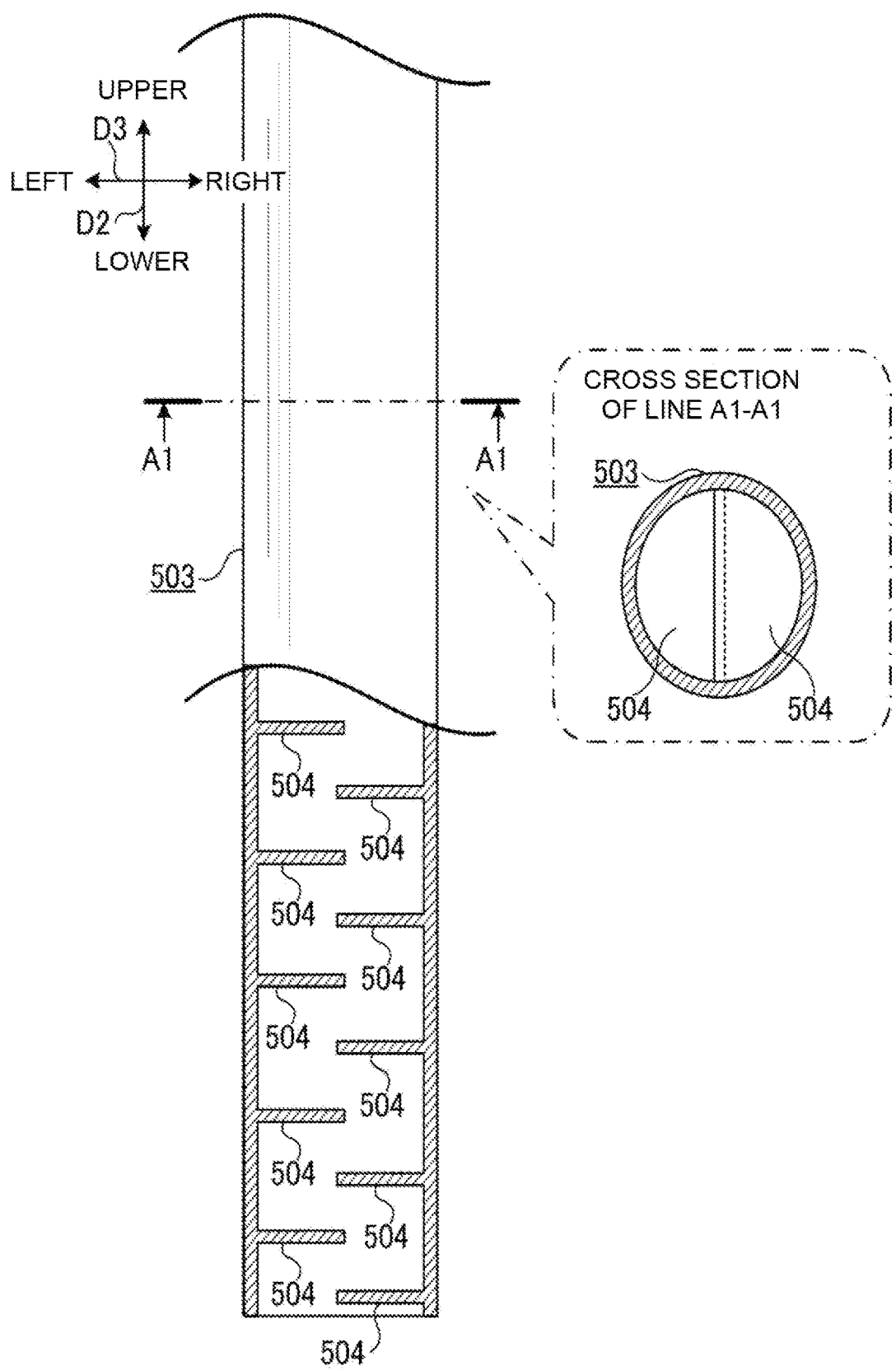
FIG. 9 is a schematic view showing a ventilation passage of the engine system according to the first embodiment.

As shown in FIG. 9, the ventilation passage 503 has a gas/liquid separating portion 504 to separate the gas from the liquid. The gas/liquid separating portion 504, as an example, includes a protruding wall provided inside the ventilation passage 503. The protruding wall as the gas/liquid separating portion 504 protrudes from an internal peripheral face of the ventilation passage 503 toward a central axis of the ventilation passage 503. In the present embodiment, multiple protruding walls as the gas/liquid separating portions 504 are so provided that, of the internal peripheral faces of the ventilation passage 503, the protruding wall protruding from one side (left) of the width direction D3 and the protruding wall protruding from the another side (right) of the width direction D3 are alternately arranged in the up/down direction D2. The protruding wall protruding from the one side (left) of the width direction D3 and the protruding wall protruding from the other side (right) of the width direction D3 overlap at their tip portions in the up/down direction D2.

Providing the above gas/liquid separating portion 504 causes the inside of the ventilation passage 503 to be a labyrinth configuration, and the blow-by gas introduced from the ventilation port 502 into the ventilation passage 503 flows in the ventilation passage 503 while meandering between the protruding walls as the gas/liquid separating portions 504. When the blow-by gas contacts the protruding wall as the gas/liquid separating portion 504, a liquid such as oil or moisture discharged together with the blow-by gas adheres to the protruding wall as the gas/liquid separating portion 504. With this, the liquid (oil or moisture, etc.) discharged together with the blow-by gas is captured by the gas/liquid separating portion 504 and is separated from the gas included in the blow-by gas. As a result, the blow-by gas is exhausted from the ventilation passage 503 with at least a part of the liquid component such as oil removed, connecting to suppressing of oil consumption, etc. involved in the exhausting of the blow-by gas.

The gas/liquid separating portion 504 is not limited to the protruding wall as described above, but is sufficient as long as having the function of separating the liquid from the blow-by gas discharged from the ventilation port 502. The gas/liquid separating portion 504 may be, for example, a filter or the like placed in the ventilation passage 503, or a combination of the protruding wall and the filter.

By the way, the engine body 2 according to the present embodiment is an in-line multi-cylinder engine (in-line 6-cylinder engine) with the multiple cylinders 51 (six in the present embodiment) arranged in line, as described above. In this type of engine, where the blow-by gas may occur for each of the multiple cylinders 51; according to the present embodiment, only one blow-by gas discharging ventilation port 502 is provided for the multiple cylinders 51. In other words, the ventilation port 502 is shared by the multiple cylinders 51. That is, according to the present embodiment, the crank chamber 52 includes a single compartment (chamber) connecting in the output axis direction D1, as described above. Therefore, no matter which of the multiple cylinders 51 generates the blow-by gas, the blow-by gas it so eventually leak out to the same crank chamber 52. With this, it is sufficient to have only one blow-by gas discharging ventilation port 502 for the multiple cylinders 51.

Figure 10:
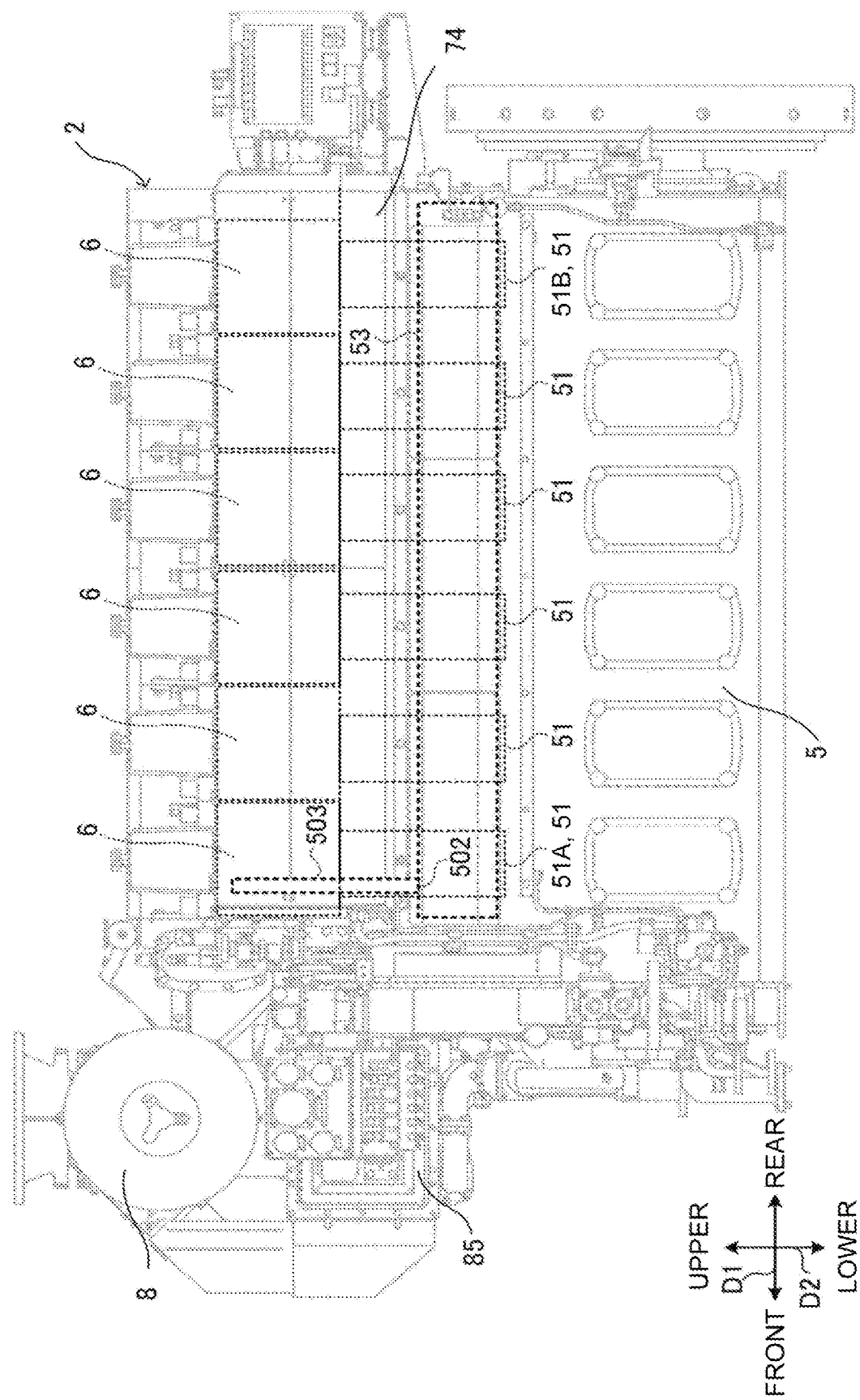
FIG. 10 is a schematic left side view of the engine body of the engine system according to the first embodiment.

Specifically, as shown in FIG. 10, the multiple cylinders 51 are provided to be arranged in the output axis direction D1, and the multiple cylinders 51 include a one end side cylinder 51A and another end side cylinder 51B which are positioned on respective sides in the output axis direction D1. Here, the ventilation port 502 is placed at a position that corresponds to the one end side cylinder 51A. In short, of the six cylinders 51 arranged in the output axis direction D1, the cylinder 51 on the one end (front end in the present embodiment) side in the output axis direction D1 is defined as "one end side cylinder 51A", and the cylinder 51 on the other end (rear end in the present embodiment) side in the output axis direction D1 is defined as "the other end side cylinder 51B. In this case, in the cam chamber 53, the ventilation port 502 is formed in a position that corresponds to the one end side cylinder 51A, i.e., at the front end portion. The ventilation passage 503 is so provided as to extend upward from this ventilation port 502.

Thus, it is sufficient that the ventilation port 502 should be at one position for the multiple cylinders 51, as a result, making it possible to simplify the configuration for discharging the blow-by gas. In particular, according to the present embodiment, the engine body 2 is placed in the "front up" posture (see FIG. 2), so the blow-by gas having leaked out to the crank chamber 52 is likely to be concentrated on the front end portion side positioned relatively upper. Therefore, in the configuration where the ventilation port 502 is placed at the front end portion of (the cam chamber 53 in) the cylinder block 5, it is possible to more efficiently discharge the blow-by gas from the exhaust pipe 105 (see FIG. 2) mounted in the hull 100.

Figure 11:
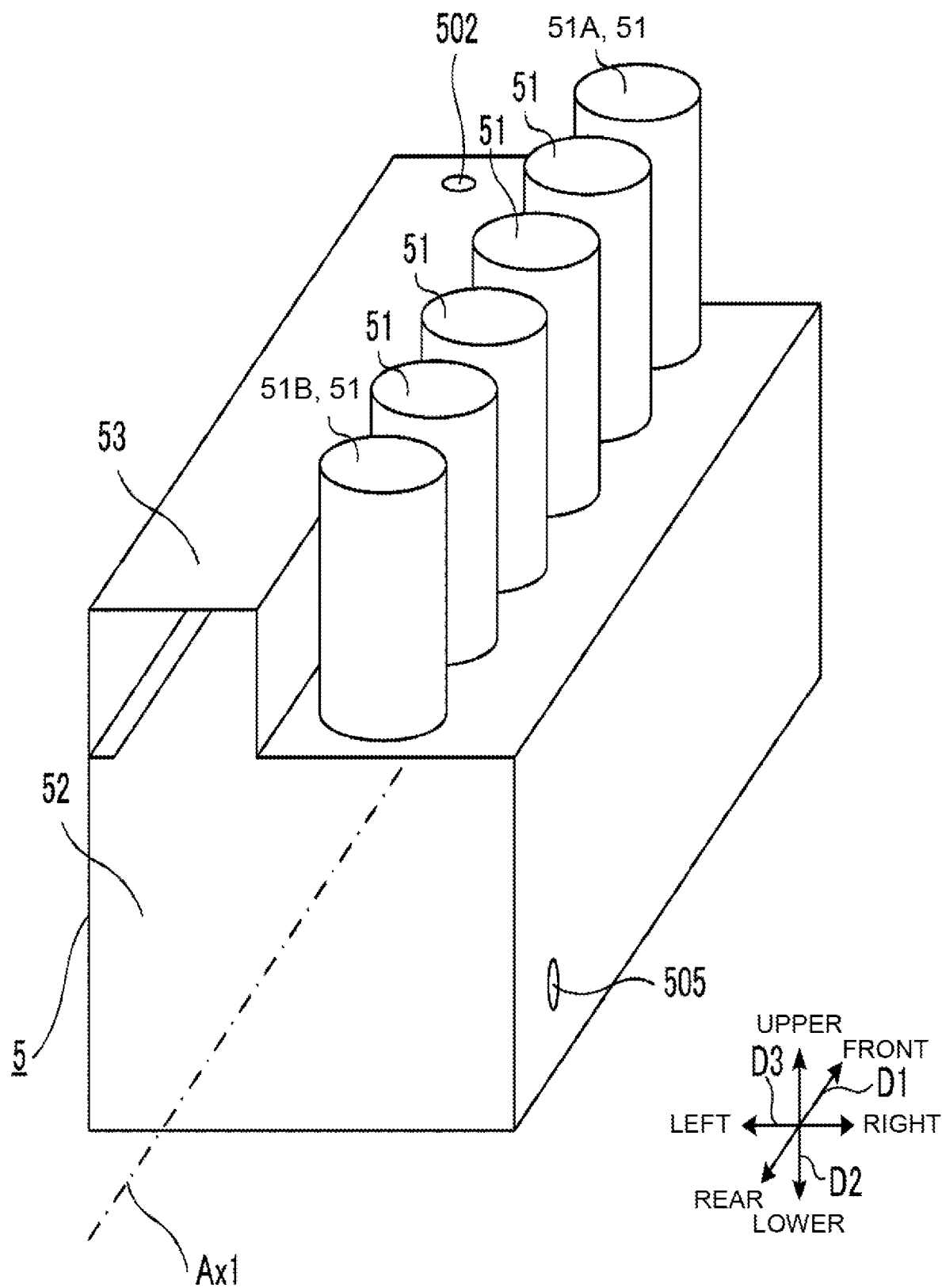
FIG. 11 is a schematic view showing a positional relation between a cylinder, crank chamber, and cam chamber in a cylinder block of the engine system according to the first embodiment.

Further, in the present embodiment, for more smoothly exhausting the blow-by gas from the ventilation port 502, the internal peripheral face 501 of the cylinder block 5 has a gas introduction port 505 that connects the internal space Sp1 of the crank chamber 52 with the external space out of the cylinder block 5, and that is open, as shown in FIG. 11. FIG. 11 is a schematic view of the cylinder block 5, schematically showing the positional relation between the cylinder 51, the crank chamber 52, and the cam chamber 53.

Providing the above gas introduction port 505 separately from the ventilation port 502 makes it possible to take in fresh air into the internal space Sp1 of the crank chamber 52 at the time of the exhausting of the blow-by gas from the ventilation port 502. As a result, the ventilation (exhaust of the blow-by gas) of the internal space Sp1 of the crank chamber 52 can be more smoothly performed. In plan view, the gas introduction port 505 has a circular (true circle) opening, for example, large enough to allow air to pass through. However, the gas introduction port 505 is not limited to the circular shape, but may have oval, square, or polygonal openings, for example.

As shown in FIG. 11, in the output axis direction D1 along the rotational axis Ax1 of the crankshaft 22 placed in the crank chamber 52, the ventilation port 502 and the gas introduction port 505 are placed at positions different from each other. That is, the ventilation port 502 and the gas introduction port 505 are offset from each other in the output axis direction D1. In the example in FIG. 11, the gas introduction port 505 is placed at a position that corresponds to the other end side cylinder 51B present on the other end side in the output axis direction D1, i.e., at the rear end portion of the cylinder block 5. In short, the ventilation port 502 is placed at the one end (front end in the present embodiment) side in the output axis direction D1, whereas the gas introduction port 505 is placed at the other end (rear end in the present embodiment) side in the output axis direction D1.

According to this configuration, the gas (air) introduced from the gas introduction port 505 flows toward the ventilation port 502 thereby to form an airflow along the output axis direction D1, thus making it possible to cause the airflow to act across a wide range in the output axis direction D1. Therefore, the performance of discharging the blow-by gas by airflow can be further improved.

In particular, in the present embodiment, the ventilation port 502 is placed at the position (front end portion) that corresponds to the one end side cylinder 51A, whereas the gas introduction port 505 is placed at the position that corresponds to the other end side cylinder 51B (rear end section). Thus, placing the ventilation port 502 and the gas introduction ports 505 at respective end portions of the cylinder block 5 in the output axis direction D1 can cause the airflow to act across substantially the entire area in the output axis direction D1 in the crank chamber 52. Therefore, the performance of discharging the blow-by gas by airflow can be further improved.

In the present embodiment, the ventilation port 502 and the gas introduction port 505 are, in plan view, placed on opposite sides sandwiching therebetween the rotational axis Ax1 of the crankshaft 22 placed in the crank chamber 52. That is, in plan view, the ventilation port 502 is placed on the one side (left side in the present embodiment) of the width direction D3 as viewed from the rotational axis Ax1, while the gas introduction port 505 is placed on the other side (right side in the present embodiment) of the width direction D3 as viewed from the rotational axis Ax1. The gas introduction port 505 is, as an example, so formed in the right side wall of the crank chamber 52 as to penetrate the right side wall of the crank chamber 52. In this way, the ventilation port 502 and the gas introduction port 505 are placed on opposite sides sandwiching therebetween the rotational axis Ax1, making it possible to cause the airflow to act across the wide range in the width direction D3 in the crank chamber 52. Therefore, the performance of discharging the blow-by gas by airflow can be further improved.

Further, in the present embodiment, the gas introduction port 505 is placed below the center C1 (see FIG. 7) in the crank chamber 52 in the up/down direction D2. This allows the airflow by the gas (air) introduced from the gas introduction port 505 to flow diagonally upward toward the ventilation port 502 thereby to form the airflow along the up/down direction D2, making it possible to cause the airflow to act across the entirety of the crank chamber 52. Therefore, the performance of discharging the blow-by gas by airflow can be further improved.

Figure 12:
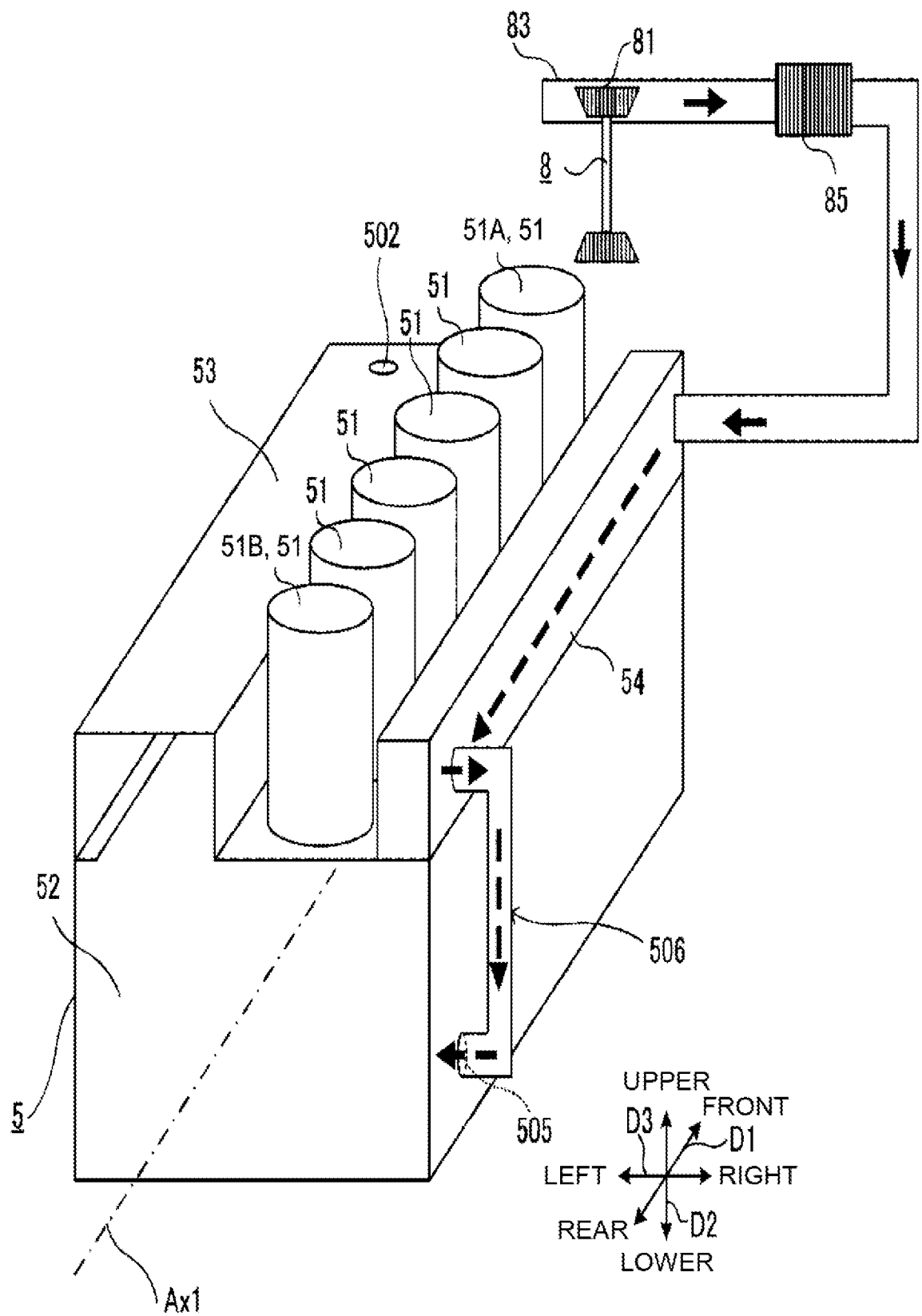
FIG. 12 is a schematic view of a positional relation of the cylinder, crank chamber, cam chamber, and intake manifold in the cylinder block of the engine system according to the first embodiment.

Here, the engine system 1 is further provided with an airflow forming portion 506, as shown in FIG. 12. The airflow forming portion 506 forms the airflow from the gas introduction port 505 toward the ventilation port 502. FIG. 12 is a schematic view of the cylinder block 5, schematically showing the positional relation between the cylinder 51, the crank chamber 52, the cam chamber 53, and the intake manifold 54. In the present embodiment, as an example, the turbocharger 8 is used for the airflow forming portion 506. Specifically, the airflow forming portion 506 includes a bypass pipe that connects between the intake manifold 54 and the gas introduction port 505. The bypass pipe as the airflow forming portion 506 forms, for example, an air passage from the intake manifold 54's end position (rear end portion in the present embodiment) on the airflow's downstream side to the gas introduction port 505. As a result, the air (intake air) compressed by the turbocharger 8 is sent through the intercooler 85 to the intake manifold 54, and is further sent through the bypass pipe, as the airflow forming portion 506, to the gas introduction port 505. As a result, the compressed air causes the gas introduction port 505 to be in a state of a positive pressure relative to the internal space Sp1 of the crank chamber 52, generating, in the crank chamber 52, an airflow in the direction of pushing out the gas (the blow-by gas) from the ventilation port 502.

In this way, providing the airflow forming portion 506 can coercively form the airflow in the internal space Sp1 of the crank chamber 52, making it difficult for the blow-by gas to stay in the crank chamber 52. That is, the airflow forming portion 506 promotes the blow-by gas's being discharged from the ventilation port 502, making it possible to further improve the performance of discharging the blow-by gas. Moreover, the turbocharger 8 is used for the airflow forming portion 506 in the present embodiment, thus causing no need for setting a new unit to form the airflow.

FIGS. 13A, 13B, 13C, 13D show a modified example about the positional relation between the ventilation port 502 and the gas introduction port 505, and about the airflow forming portion 506. In the modified example shown in FIG. 13A, the ventilation port 502 is placed in a center portion of the cylinder block 5 in the output axis direction D1, and the gas introduction ports 505 are placed both end portions of the cylinder block 5 in the output axis direction D1, respectively. In this example, the gas (air) introduced from the gas introduction ports 505 formed in the two positions flow toward the ventilation port 502 in the one position, thereby forming the air flow along the output axis direction D1.

Figure 13A:
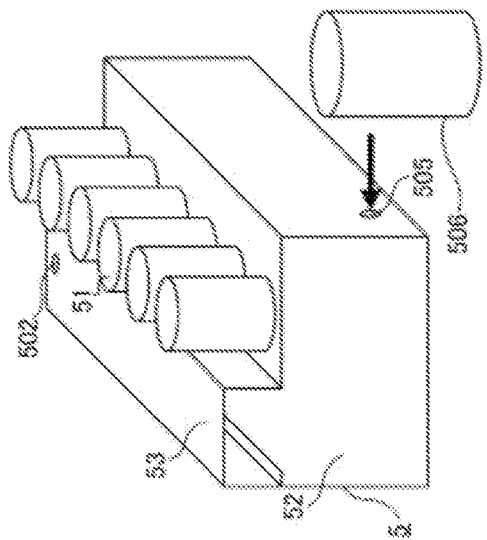
FIGS. 13A to 13D are a schematic view showing a modified example for the positional relation between a ventilation port and gas introduction port of the engine system, and for an airflow forming portion, according to the first embodiment.
Figure 13B:
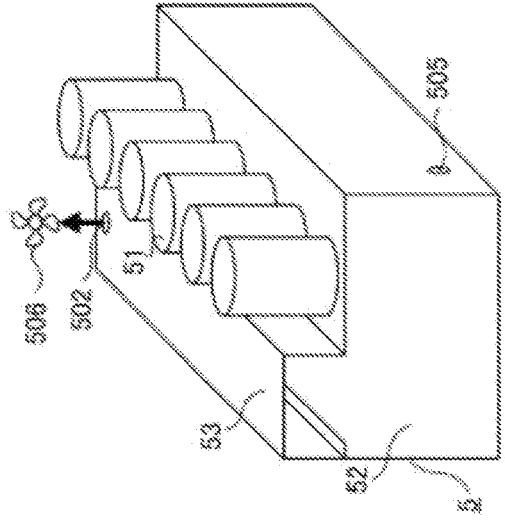
Figure 13C:
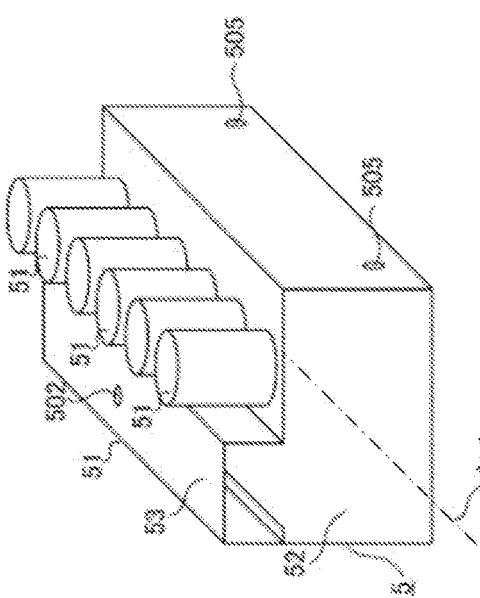

In the modified example shown in FIG. 13B, the airflow forming portion 506 includes an air tank installed on the hull 100, sending the air from the air tank into the gas introduction port 505. In the modified example shown in FIG. 13C, the airflow forming portion 506 includes an electric fan, sending the air from the electric fan into the gas introduction port 505. In any example in FIG. 13B and FIG. 13C, the gas introduction port 505 is brought into a state of a positive pressure relative to the internal space Sp1 of the crank chamber 52, generating, in the crank chamber 52, the airflow in the direction of pushing the gas (the blow-by gas) out from the ventilation port 502.

Figure 13D:
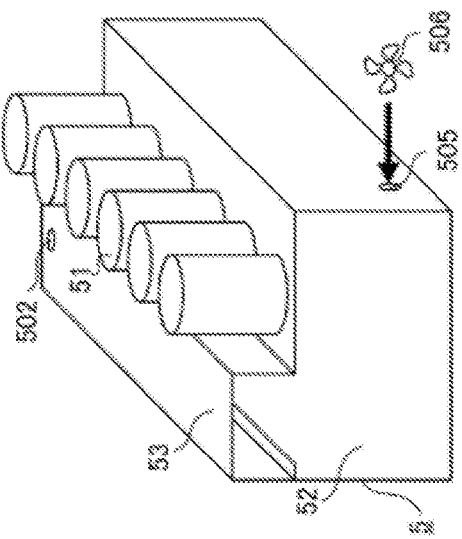

Meanwhile, in the modified example shown in FIG. 13D, the airflow forming portion 506 includes an electric fan, drawing in the blow-by gas from the ventilation port 502, by the electric fan. In this example, the downstream side (ventilation passage 503 side) of the ventilation port 502 becomes in a state of a negative pressure relative to the internal space Sp1 of the crank chamber 52, generating, in the crank chamber 52, an airflow in the direction in which the gas (the blow-by gas) is drawn in from the gas introduction port 505 to the ventilation port 502. Thus, the airflow forming portion 506 may form the airflow by generating any of the positive pressure and the negative pressure, or may be configured to generate both of the positive pressure and the negative pressure. In the modified examples of FIG. 13C and FIG. 13D, a pump, for example, may be used instead of the electric fan.

Figure 14:
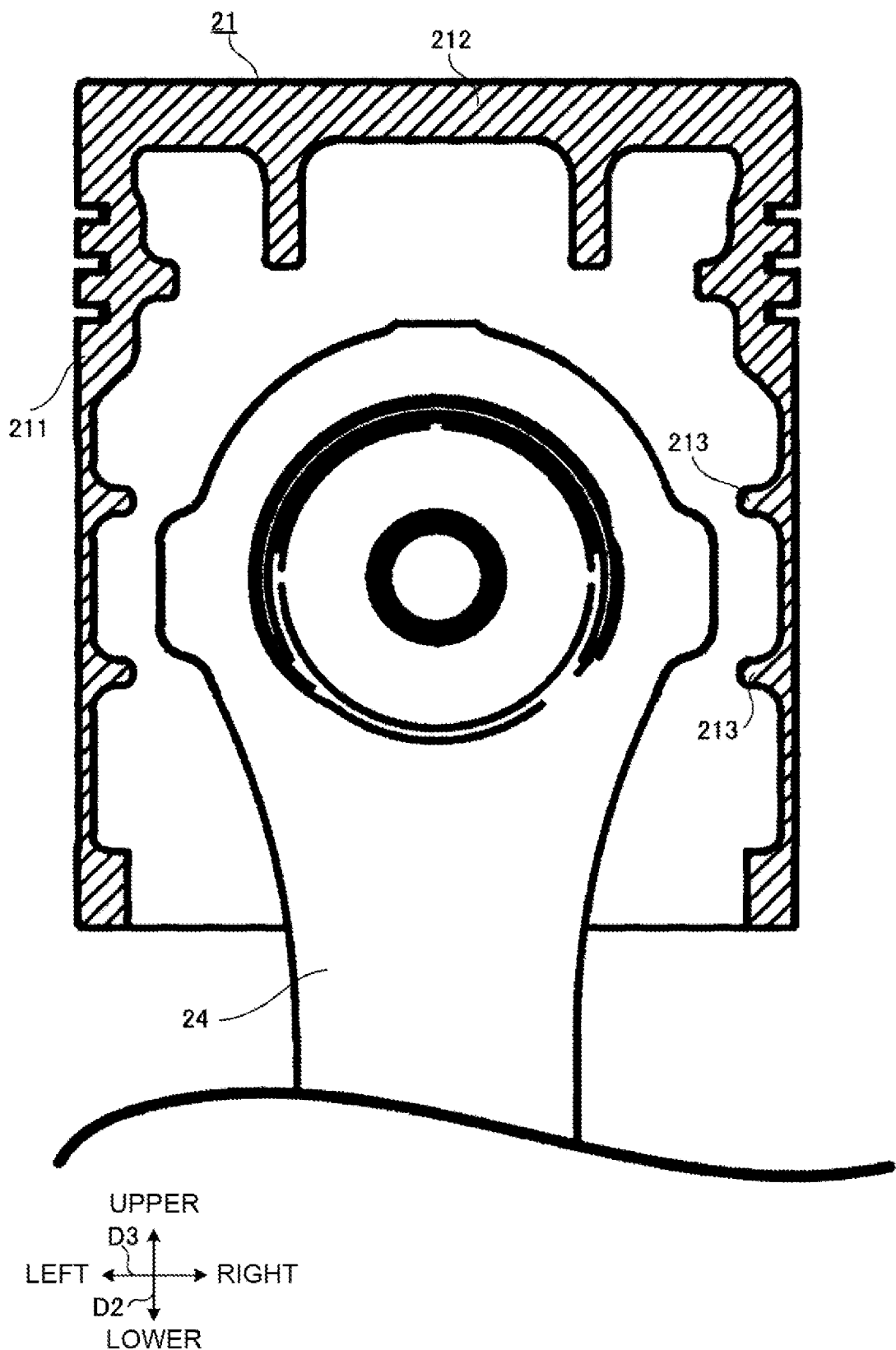
FIG. 14 is a schematic cross sectional view, enlarging an area around a piston of the engine system according to the first embodiment.
Figure 15:
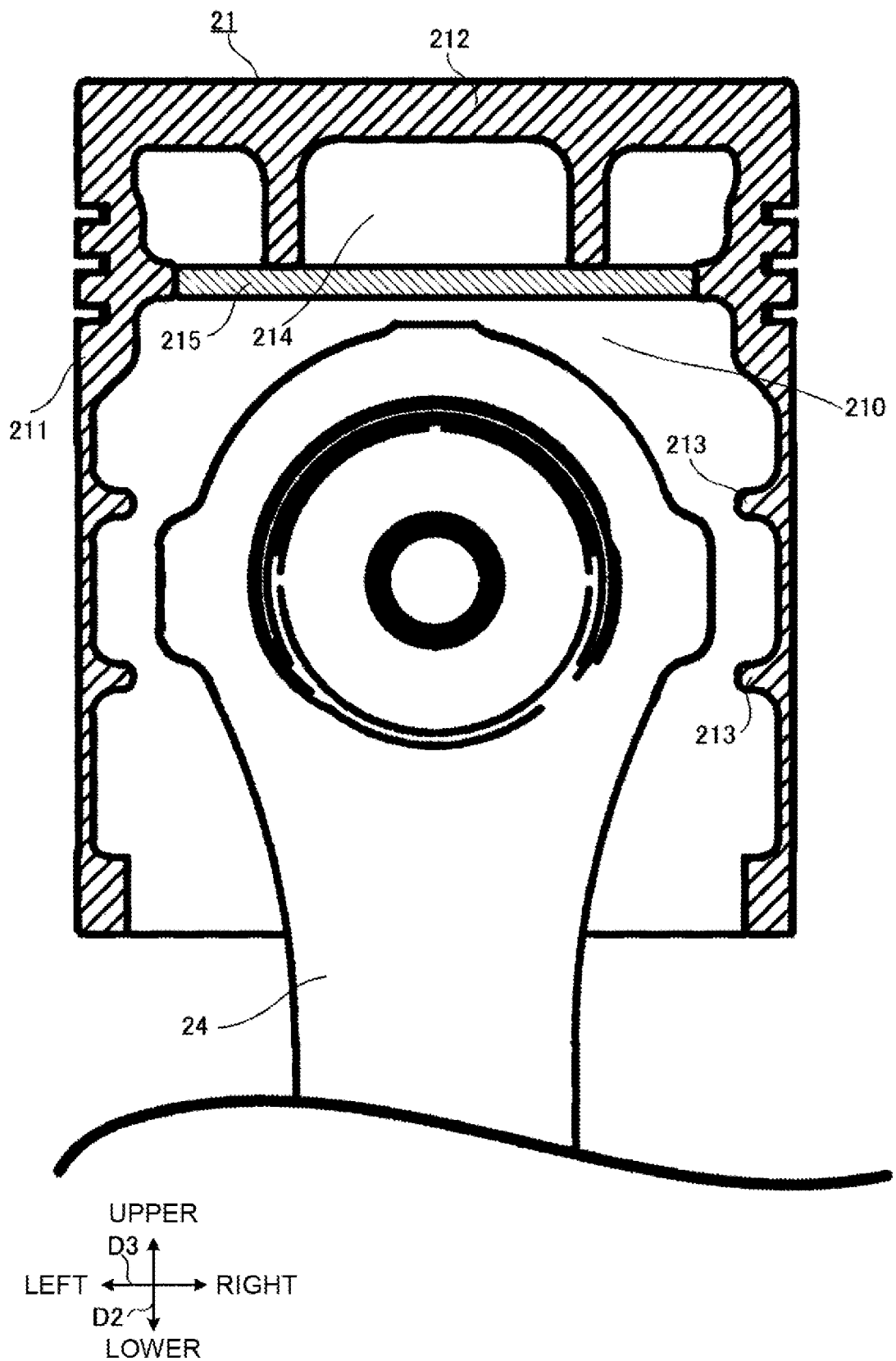
FIG. 15 is a schematic cross sectional view, enlarging the area around the piston of the engine system according to the first embodiment.

The configuration of the piston 21 of the engine system 1 according to the present embodiment is described more in detail below, with reference to FIGS. 14 and 15. FIGS. 14 and 15 are each a schematic cross sectional view of an enlarged area around the piston 21.

In a piston internal space 210 formed inside the piston 21 that reciprocates along the up/down direction D2 in the cylinder 51, a stirring portion 213 that reciprocates along the up/down direction D2 as the piston 21 moves is placed, as shown in FIG. 14. According to the present embodiment, a feather-like protrusion protruding from the internal peripheral face of the cylindrical portion 211 of the piston 21 toward the central axis of the piston 21 constitutes the stirring portion 213. The piston internal space 210 is a cylindrical space enclosed by the cylindrical portion 211 of the piston 21, and is a space separated from the combustion chamber 50 by the bulkhead 212 of the piston 21. The connecting rod 24, with its upper end portion inserted into the piston internal space 210, is supported by the piston 21. The stirring portions 213 are formed around the entire circumference of the cylindrical portion 211, and are so provided in multiplicity (two in this case) as to be spaced apart in the up/down direction D2.

In short, the piston internal space 210 continuous with the internal space Sp1 of the crank chamber 52 is provided with the stirring portion 213 that reciprocates as the piston 21 moves. Being provided in the above manner, the stirring portion 213 reciprocates in the piston internal space 210 as the piston 21 reciprocates, thus stirring the gas in the piston internal space 210. Therefore, even if the blow-by gas such as uncombusted gas leaks out from the combustion chamber 50 to the piston internal space 210 through the gap between the cylinder 51 and the piston 21, the blow-by gas in the piston internal space 210 is caused to actively flow, making it easy to move the blow-by gas to the crank chamber 52. Therefore, it is easier to suppress the blow-by gas from staying in the piston internal space 210, making it possible to expect a further improvement of the performance of discharging the blow-by gas.

As long as having the configuration of being provided in the piston internal space 210 and reciprocating according to the movement of the piston 21, the stirring portion 213 is not limited to the protrusion protruding from the cylindrical portion 211 of the piston 21, and may be a protrusion protruding from the upper end portion of the connecting rod 24, for example. That is, the connecting rod 24's protrusion provided above the lower end of the piston 21, like the above stirring portion 213, can stir the gas in the piston internal space 210 as the piston 21 reciprocates. The stirring portion 213 may be provided on both of the piston 21 and the connecting rod 24.

It is preferable that, as shown in FIG. 15, of the piston 21 that reciprocates along the up/down direction D2 in the cylinder 51, the bulkhead 212 that separates the internal space of the cylinder 51 in the up/down direction D2 has a cavity portion 214 inside. Specifically, fixing a plate 215 to the lower face (the side opposite the combustion chamber 50) of the bulkhead 212 by a proper method such as welding causes the bulkhead 212 to have a double-layered configuration. With this, on the upper side of the plate 215 (combustion chamber 50 side), the cavity portion 214 as a heat-insulating layer is formed.

In short, of the internal spaces of the cylinder 51, the combustion chamber 50, and the space continuous with the internal space Sp1 of crank chamber 52 are separated by the bulkhead 212, thus exposing the upper face of the bulkhead 212 to the combustion chamber 50. Therefore, in the configuration without the cavity portion 214, as shown in FIG. 14, heat of the upper face of the bulkhead 212 is likely to be transferred to the rear face (lower face) side of the bulkhead 212, causing a possibility of heating the blow-by gas which is mainly composed of hydrogen, etc., for example. In contrast, according to the FIG. 15's configuration in which the cavity portion 214 is formed as the heat-insulating layer, the heat is unlikely to be transferred to the lower face side of the plate 215 at the cavity portion 214. Therefore, the blow-by gas mainly composed of hydrogen and the like can be suppressed from being heated by the heat of the combustion chamber 50 can suppress the heating of.

Figure 16:
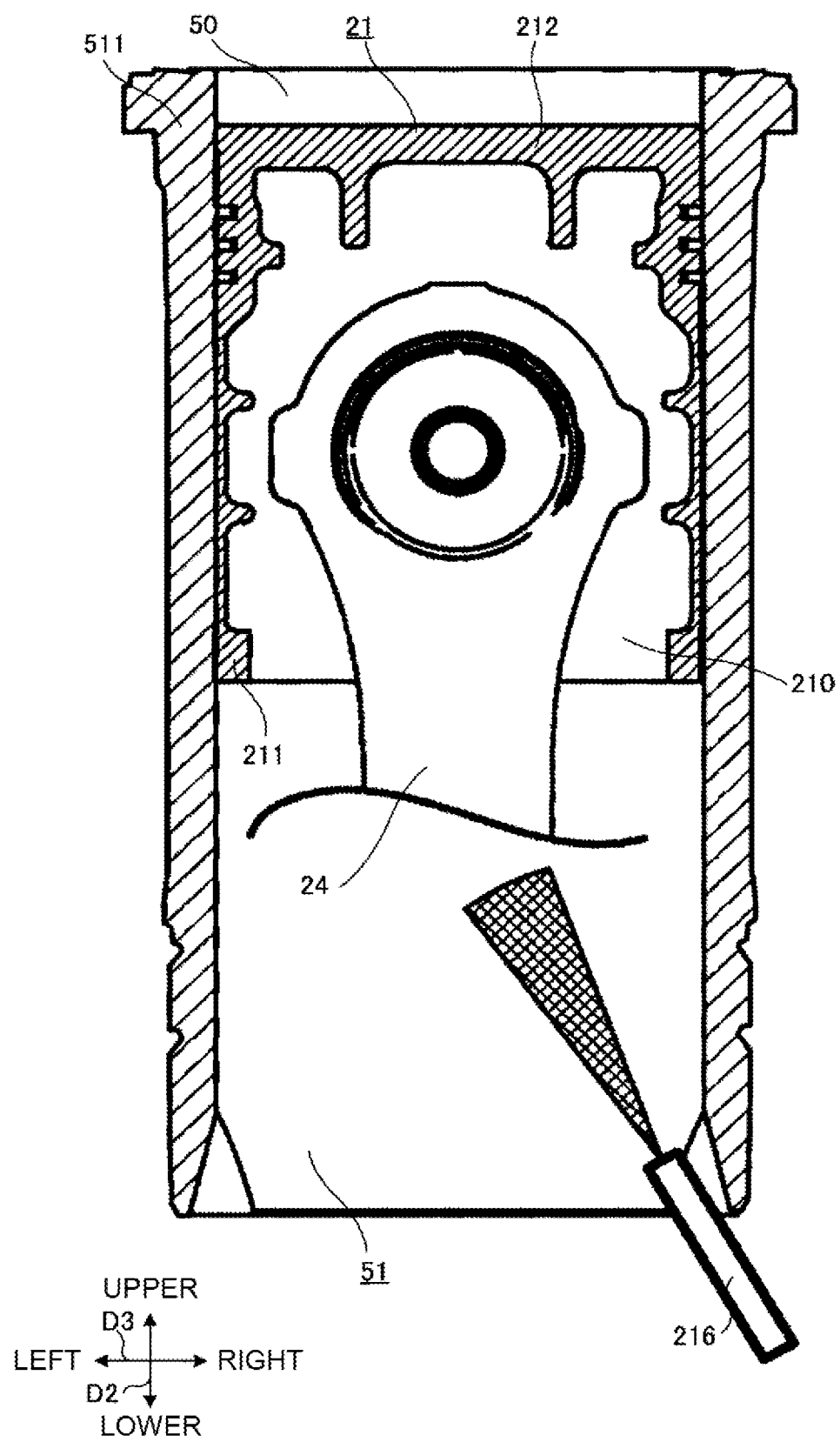
FIG. 16 is a schematic cross sectional view, enlarging an area around a cylinder of another example of the engine system according to the first embodiment.

In addition to or instead of the stirring portion 213, as the configuration for actively flowing the blow-by gas in the piston internal space 210, a stirring nozzle 216 may be provided, as shown in FIG. 16. In each of the cylinders 51, the stirring nozzle 216 is provided in a position where its tip portion faces the internal space of the cylinder 51 from the lower face of the cylinder 51. The stirring nozzle 216 intermittently or continuously injects the gas (e.g., air) or the liquid (e.g., oil) toward the internal portion of the cylinder 51. This causes the gas in the piston internal space 210 to be stirred by the gas or liquid injected into the cylinder 51. Therefore, even if the blow-by gas such as uncombusted gas leaks out from the combustion chamber 50 to the piston internal space 210 through the gap between the cylinder 51 and the piston 21, the blow-by gas in the piston internal space 210 is caused to actively flow, making it easy to move the blow-by gas to the crank chamber 52. Therefore, it is easier to suppress the blow-by gas from staying in the piston internal space 210, making it possible to expect a further improvement of the performance of discharging the blow-by gas.

By the way, the above configuration regarding the piston 21 can be adopted independently of the configuration and the like (ventilation port 502) of the blow-by gas exhaust countermeasure. That is, the engine system 1 according to one aspect has the cylinder block 5 including the cylinder 51 and the crank chamber 52, and in the piston internal space 210 formed inside the piston 21 that reciprocates in the cylinder 51, the stirring portion 213 that reciprocates according to the movement of the piston 21 is placed. The engine system 1 according to another aspect has the cylinder block 5 including the cylinder 51 and the crank chamber 52, and of the piston 21 that reciprocates in the cylinder 51, the bulkhead 212 that separates the internal space of the cylinder 51 (in the direction in which the piston 21 reciprocates) has the cavity portion 214 inside.

[4] Configuration of Cylinder Head

Figure 17:
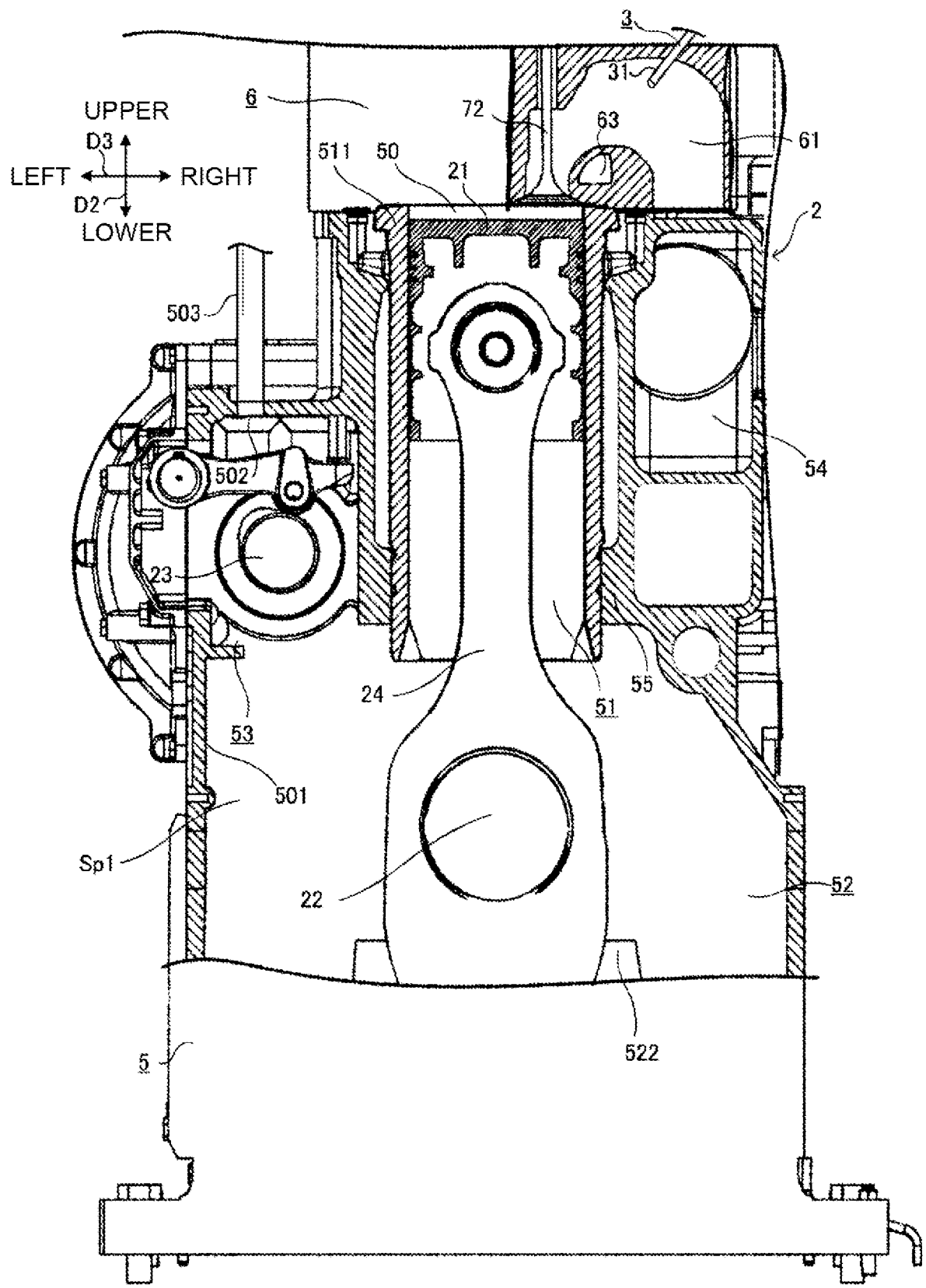
FIG. 17 is a schematic view partially breaking an essential portion of the engine body of the engine system according to the first embodiment.

Then, the configuration of the cylinder head 6 (and its surrounding configuration) of the engine body 2 is to be described more in detail with reference to FIGS. 17 through 21. FIG. 17 is a schematic view of the engine body 2 viewed from the rear side (side from which the crankshaft 22 protrudes) as one side in the output axis direction D1, partially breaking the cylinder block 5 and cylinder head 6 and adding diagonal lines (hatching) a main cross section. FIG. 17 properly omits the side cover 74 and the like.

According to the present embodiment, the cylinder head 6 has the intake ports 61 and the exhaust ports 62, as described above. The intake port 61 and the exhaust port 62 each include compartments (chambers) that are separated from each other in the cylinder head 6, having internal spaces respectively. There is provided a multiplicity of cylinder heads 6 (six in the present embodiment), and the multiple cylinder heads 6 adopt a common configuration. Then, unless particularly noted, the following description will focus on one cylinder head 6.

Figure 18:
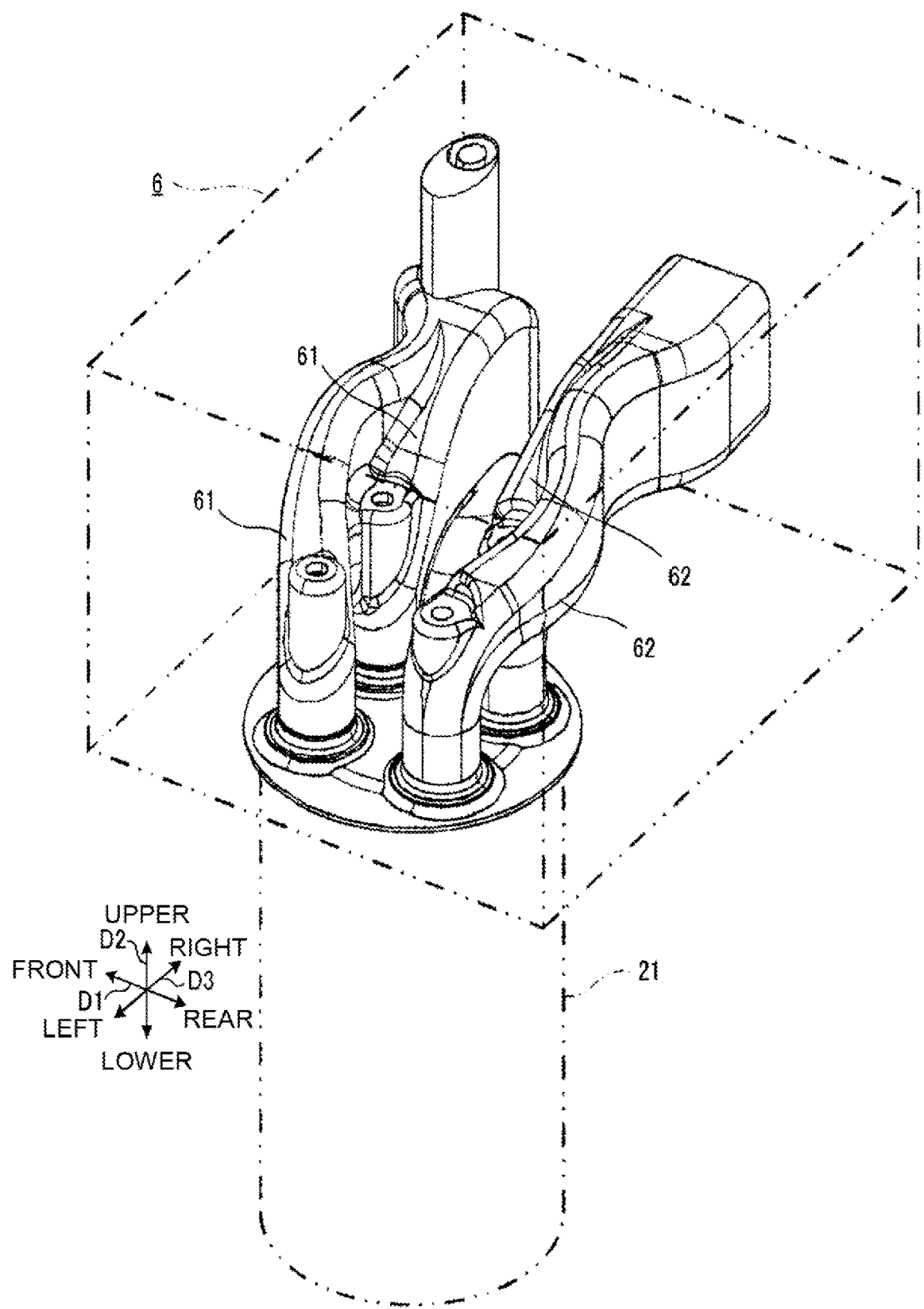
FIG. 18 is a schematic perspective view of showing internal configuration of a cylinder head of the engine system according to the first embodiment.
Figure 19:
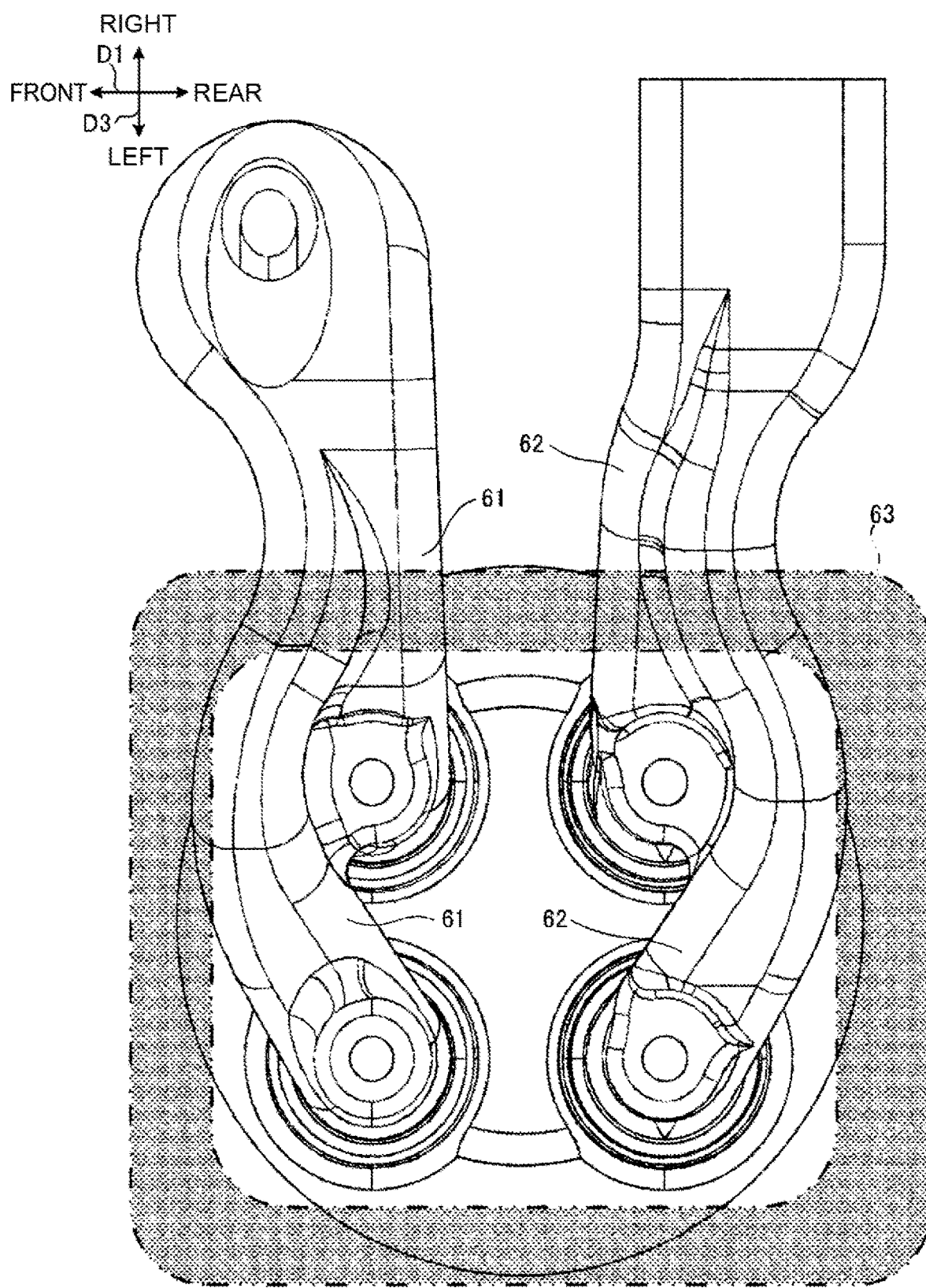
FIG. 19 is a schematic plan view of the internal configuration of the cylinder head of the engine system according to the first embodiment.

As an example of the present embodiment, two each of the intake ports 61 and the exhaust ports 62 are provided at the cylinder head 6, as shown in FIGS. 18 and 19. That is, for the one cylinder head 6, two intake ports 61 and two exhaust ports 62 are formed. However, the two intake ports 61 are basically of a common configuration, and the two exhaust ports 62 are basically of a common configuration. Therefore, unless particularly noted, the following description will focus on the one intake port 61 or the one exhaust port 62. FIG. 18 is a schematic perspective view, showing schematic outlines of the cylinder head 6 and cylinder 51 with imaginary lines (double-dashed line), and highlighting the intake port 61 and the exhaust port 62. Further, FIG. 19 is a schematic plan view, showing an after-described refrigerant passage 63 with an imaginary line (double-dashed line), and highlighting the intake port 61 and the exhaust port 62.

The cylinder head 6 is placed above the cylinder 51, as shown in FIGS. 17 and 18. With this, of the internal spaces of the cylinder 51, the space surrounded by the upper face of the piston 21 and the lower face of the cylinder head 6 functions as the combustion chamber 50. Each of the intake port 61 and exhaust port 62 formed at the cylinder head 6 has an opening connecting to the combustion chamber 50.

The intake port 61 is the gas (intake air)'s passage that connects between the intake manifold 54, which is formed at the cylinder block 5, and the combustion chamber 50. Of the intake port 61, at the opening on the combustion chamber 50 side, that is, the opening as the downstream side of the airflow, there is provided the intake valve 72. Therefore, the air distributed from the intake manifold 54, with the intake valve 72 open, is supplied via the intake port 61 to the combustion chamber 50.

Further, in the present embodiment, since the port injection method is adopted as the fuel supply method for the gaseous fuel, the fuel supply unit 3 supplies the gaseous fuel (hydrogen in the present embodiment) to the internal space of the intake port 61. That is, the fuel supply unit 3's injection unit 31 which injects the gaseous fuel is placed in a position facing the inside of the intake port 61, injecting the gaseous fuel in the intake port 61. The timing at which the fuel supply unit 3 injects the gaseous fuel is to be described in detail in the column "[5] Engine System Control Operation".

Meanwhile, the exhaust port 62 is the gas (exhaust)'s passage that connects between the exhaust manifold 75 and the combustion chamber 50. Of the exhaust port 62, at the opening on the combustion chamber 50 side, that is, the opening as the upstream side of the airflow, there is provided the exhaust valve 73. Therefore, the gas discharged from the combustion chamber 50, with the exhaust valve 73 open, is discharged (concentrated) through the exhaust port 62 to the exhaust manifold 75.

As shown in FIGS. 17 and 19, the cylinder head 6 has the refrigerant passage 63, in addition to the intake port 61 and the exhaust port 62. The refrigerant passage 63 is a passage for the refrigerant to pass through. The term "refrigerant" here refers to a heat medium used to move heat in the cooling cycle, examples thereof including a liquid such as water (cooling water) or oil, or a gas such as cooling gas. That is, the refrigerant as a fluid, by flowing through the refrigerant passage 63, can remove heat from the surrounding of the refrigerant passage 63, making it possible to cool the surrounding of the refrigerant passage 63. As an example of the present embodiment, the refrigerant passage 63 is a water jacket for passing the cooling water as a refrigerant.

As shown in FIG. 19, in plan view, the refrigerant passage 63 is formed as an annulus surrounding the opening on the combustion chamber 50 side of the intake port 61 and exhaust port 62. Specifically, as shown in FIG. 17, the refrigerant passage 63 is placed in a position adjacent to the opening on the combustion chamber 50 side of the intake port 61. Then, the refrigerant (coolant) cooled outside the cylinder head 6 is supplied to the refrigerant passage 63 for circulation. With this, the refrigerant flowing through the refrigerant passage 63 cools the area mainly around the opening on the combustion chamber 50 side of the intake port 61 and the exhaust port 62.

By the way, as a related technology, a dual-injection type engine system provided with an in-cylinder injector and an intake passage injector is known. In the engine system according to the related technology, adjusting (correcting) a fuel injection volume suppresses generation of a backfire seen during an execution of a purging process of fuel evaporated gas. Specifically, at the time of executing the purging process of the fuel evaporated gas seen when a sharing ratio of the in-cylinder injector and the intake passage injector is within a predetermined range, the fuel injection volume correction that corresponds to a to-be-introduced purged fuel volume is performed by changing only the fuel injection volume from the intake passage injector.

However, in the engine system 1 that uses the gaseous fuel such as hydrogen, for example, the fuel (gaseous fuel) may be more easily ignited. Therefore, it is desirable to perform a further backfire countermeasure assuming the event of a backfire, even to such an extent that the fuel (gaseous fuel) supplied in the intake port 61 is ignited, causing a chain of backfires.

Therefore, in the present embodiment, adopting the configuration described below makes it possible to provide the engine system 1 that enables the further backfire countermeasure.

That is, the engine system 1 according to the present embodiment has the intake port 61 that supplies air to the combustion chamber 50, and the fuel supply unit 3 that supplies the gaseous fuel to an internal space Sp2 (see FIG. 20) of the intake port 61. The fuel supply unit 3 has the injection unit 31 that injects the gaseous fuel. Here, as shown in FIG. 20, of an internal peripheral face 611 of the intake port 61, at least an intersection with a central axis Ax2 of an injection area R1 of the gaseous fuel from the injection unit 31 has a cooled portion 612. In other words, the intersection between the internal peripheral face 611 of the intake port 61 and the central axis Ax2 of the injection area R1 of the gaseous fuel from the injection unit 31 is included in the cooled portion 612.

The term "cooled portion" as used in the present disclosure means, of the internal peripheral face 611 of the intake port 61, a site that has a relatively low temperature by being cooled. That is, the temperature of the internal peripheral face 611 facing the internal space Sp2 of the intake port 61 is not uniform, and with temperature difference being likely to be caused depending on the site, the site that is relatively lower in temperature than any other site constitutes the cooled portion 612. As an example, of the internal peripheral face 611 of the intake port 61, the site that is below the reference temperature (e.g., the average or median temperature of the internal peripheral face 611) is the cooled portion 612.

In short, for example, adopting the above configuration for the engine system 1 having adopted the port injection method in which the gaseous fuel such as hydrogen is injected to the internal space Sp2 of the intake port 61 enables the further backfire countermeasure. In the engine system 1 of this type, in a situation where the intake port 61 is exposed to the flame due to the backfire, for example, igniting the gaseous fuel (e.g., hydrogen) injected into the intake port 61 may cause a chain of backfires. In the engine system 1 according to the present embodiment, the central axis Ax2 of the injection area R1 of the gaseous fuel is directed to the cooled portion 612, thereby to better the heat sink of the gaseous fuel, making it possible to suppress, even immediately after the backfire occurring, the gaseous fuel's igniting due to heating of the gaseous fuel. This improving of the performance of cooling the gaseous fuel in the intake port 61 can suppress the chain of backfires, making it possible to provide the engine system 1 capable of making the further backfire countermeasure.

More in detail, as shown in FIG. 20, the intake port 61 has a curved portion 600 having a cross sectional shape that is convexed toward one direction. As an example of the present embodiment, the curved portion 600 is provided in the middle portion of the intake port 61, and is so curved as to have the cross sectional shape convexed upward, to thereby cause the intake port 61 to have an inverted U-shaped cross sectional shape as a whole. Therefore, the flow (airflow) of air (intake air) in the internal space Sp2 of the intake port 61 takes a path that draws an arc in one direction (upward in this case) along the curved portion 600. In FIG. 20, the flow of the intake air is shown by a bold arrow.

According to the present embodiment, in the above intake port 61, the cooled portion 612 is placed on the face on the side in the other direction (here, downward) of the curved portion 600 of the internal peripheral face 611, i.e., on an internal peripheral side face 602 of the curved portion 600. That is, the internal peripheral face 611 includes an external peripheral side face 601 which is a face of the curved portion 600 on the one direction (here upward) side, and the internal peripheral side face 602 which is a face of the curved portion 600 on the other direction (here downward) side, and places the cooled portion 612 on the internal peripheral side face 602.

Further, the nozzle-shaped (cylindrical) injection unit 31 is placed in such a way that its tip portion protrudes from the external peripheral side face 601 into the intake port 61, injecting the gaseous fuel from the injection unit 31 toward the cooled portion 612. That is, the tip portion of the injection unit 31 is directed to at least the cooled portion 612 provided on the internal peripheral side face 602. Here, the central axis Ax2 of the injection area R1 is the central axis of the injection area R1 which extends in substantially a conical shape with the tip portion of the injection unit 31 as an apex, substantially coinciding with the central axis of the nozzle-shaped (cylindrical) injection unit 31.

Further, in the intake port 61, the cooled portion 612 is placed more downstream of the airflow of the air than the injection unit 31. In the example in FIG. 20, because of the airflow from the right to the left is caused in the intake port 61, the cooled portion 612 is placed on the left as downstream relative to the tip portion of the injection unit 31 of the fuel supply unit 3.

Thus, the cooled portion 612 is placed downstream of the injection unit 31, making it easier for the gaseous fuel injected from the injection unit 31 to arrive at the cooled portion 612 even if the gaseous fuel is flowed downstream by the airflow. Therefore, the gaseous fuel's cooling effect by the cooled portion 612 can be fully demonstrated.

By the way, specific modes of the cooled portion 612 include, for example, a first mode, a second mode, and a third mode described below. The first mode is a refrigerant cooling method using the refrigerant passage 63, the second mode is a gasification latent heat method using the adherent refrigerant, and the third mode is an air cooling method. That is, the first, second, or third mode, or a combination thereof can realize the cooled portion 612 of the internal peripheral face 611 of the intake port 61.

First, as shown in FIG. 20, in the first mode (refrigerant cooling method), a site near the refrigerant passage 63 is the cooled portion 612. Specifically, the refrigerant passage 63 and the intake port 61's internal space Sp2 are physically separated by a bulkhead portion 64, and the bulkhead portion 64's face (internal peripheral face 611 of the intake port 61) opposite to the refrigerant passage 63 constitutes the cooled portion 612. That is, the engine system 1 has the cylinder head 6 formed with the intake ports 61, and the cylinder head 6 has the refrigerant passage 63 through which the refrigerant passes. Here, the cooled portion 612 is placed at the bulkhead portion 64 that physically separates at least the refrigerant passage 63 from the intake port 61.

According to this configuration, the refrigerant flowing through the refrigerant passage 63 provided at the cylinder head 6 can efficiently cool the cooled portion 612. Further, the temperature of the cooled portion 612 can be adjusted by the refrigerant's flowrate, etc., making it possible to further reliably cool the gaseous fuel. Therefore, the gaseous fuel's igniting due to heating of the gaseous fuel can be further suppressed.

Further, as shown in FIG. 20, the bulkhead portion 64 includes a thin wall portion 641 and a thick wall portion 642. The thin wall portion 641 has a thickness Th1 between the refrigerant passage 63 and the intake port 61 smaller than a reference thickness. The thick wall portion 642 has a thickness Th2 between the refrigerant passage 63 and the intake port 61 greater than the reference thickness. Of the thin wall portion 641 and the thick wall portion 642, the cooled portion 612 is provided only at the thin wall portion 641. The term "reference thickness" here is a reference thickness of the bulkhead portion 64, such as the average or median thickness of the bulkhead portion 64, as an example. That is, the thickness of the bulkhead portion 64 is not uniform, and varies from site to site. And, of the bulkhead portion 64, the cooled portion 612 is provided at the thin wall portion 641 that is relatively thin, and not at the thick wall portion 642.

According to this configuration, the refrigerant flowing in the refrigerant passage 63 can more efficiently cool the cooled portion 612. That is, of the internal peripheral face 611 of the bulkhead portion 64, the cooled portion 612 is placed at the thin wall portion 641 which is relatively close to the refrigerant passage 63 and at which the heat is easily transmitted to the refrigerant flowing through the refrigerant passage 63, making it possible to more reliably cool the gaseous fuel. Therefore, the gaseous fuel's igniting due to heating of the gaseous fuel can be further suppressed.

Figure 21A:
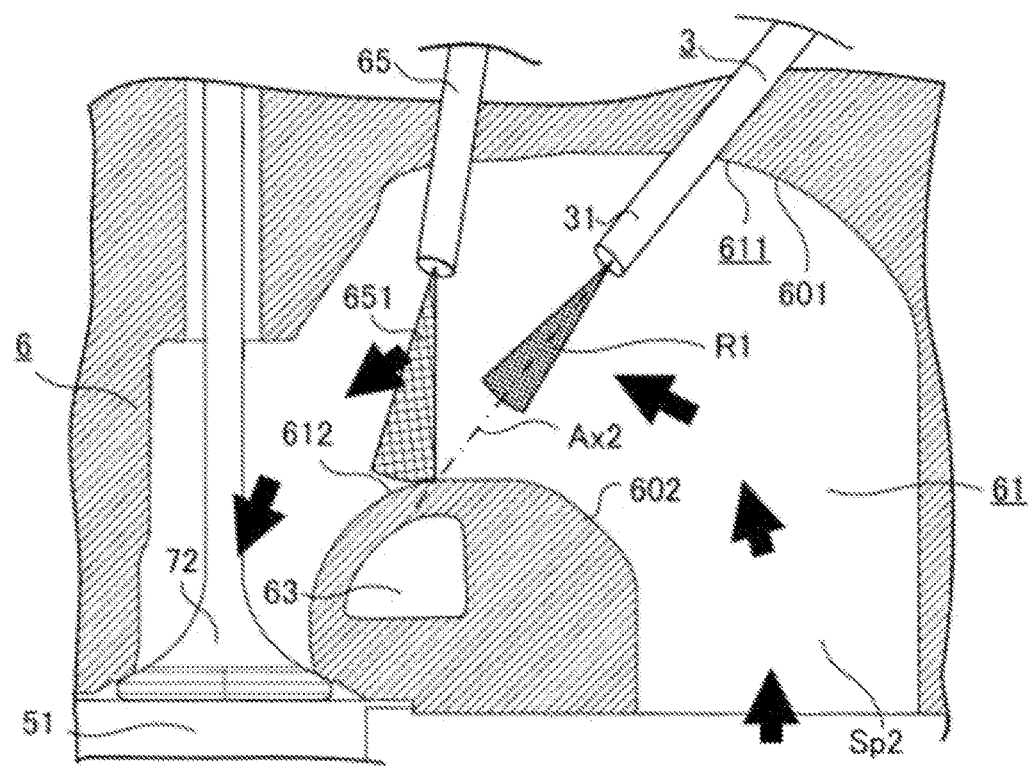
FIGS. 21A and 21B are a schematic cross sectional view showing the configuration around the intake port of the engine system according to the first embodiment.
Figure 21B:
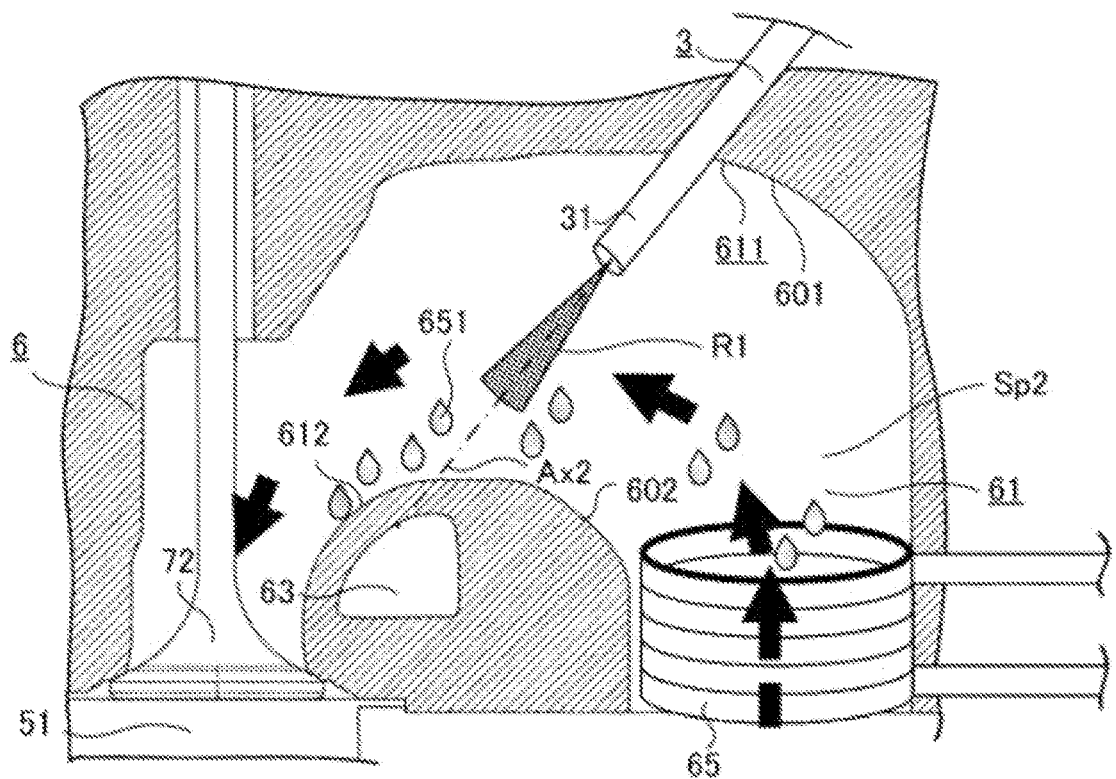

In the second mode (gasification latent heat method), as shown in FIGS. 21A and 21B, the engine system 1 is further provided with a refrigerant supply unit 65 that adheres an adherent refrigerant 651 to a part of the internal peripheral face 611 of the intake port 61. The cooled portion 612 is placed at least at the site to which the adherent refrigerant 651 adheres. The term "adherent refrigerant" here refers to a heat medium mainly used for gasification latent heat, such as water (cooling water), oil or the like. That is, the adherent refrigerant 651 adheres to a part of the internal peripheral face 611 of the intake port 61 thereby to take heat of the internal peripheral face 611 at the time of the adherent refrigerant 651's gasifying, thus cooling the internal peripheral face 611. Therefore, of the internal peripheral face 611 of the intake port 61, making the site, to which the adherent refrigerant 651 adheres, the cooled portion 612 realizes cooling of the cooled portion 612. The mode in which the adherent refrigerant 651 is "adhered" includes, for example, spraying, discharging, condensing, or applying of the adherent refrigerant 651.

Specifically, in the example shown in FIG. 21A, a nozzle-shaped (cylindrical) refrigerant supply unit 65 that injects the adherent refrigerant 651 is used. The refrigerant supply unit 65 is placed in such a way that its tip portion protrudes from the external peripheral side face 601 into the intake port 61, and the gaseous fuel is injected from the injection unit 31 toward the cooled portion 612. That is, the tip portion of the refrigerant supply unit 65 is directed at least to the cooled portion 612 provided on the internal peripheral side face 602. With this, the adherent refrigerant 651 injected from the refrigerant supply unit 65 adheres to the cooled portion 612 of the internal peripheral face 611 (internal peripheral side face 602) of the intake port 61, cooling the cooled portion 612.

In the example shown in FIG. 21B, the refrigerant supply unit 65 that cools the air introduced into the intake port 61 is used. The refrigerant supply unit 65 includes a coiled cooled portion, and is placed near the intake port 61's opening on the intake manifold 54 side. Supplying the refrigerant to the refrigerant supply unit 65 cools the air passing through the refrigerant supply unit 65; when the water vapor volume in the air exceeds the saturated water vapor volume, condensation generates water as the adherent refrigerant 651. The adherent refrigerant 651 is carried by the flow of the air, and adheres to at least the cooled portion 612 provided on the internal peripheral side face 602. As a result, the adherent refrigerant 651 adheres to the cooled portion 612 of the internal peripheral face 611 (internal peripheral side face 602) of the intake port 61, cooling the cooled portion 612. It is preferable that the refrigerant supplied to the refrigerant supply unit 65 should be maintained at a low temperature, for example, by heat exchange with the liquefied hydrogen tank 32.

In the example in FIGS. 21A and 21B, in addition to the refrigerant supply unit 65, the refrigerant cooling method of the first mode is used in combination by the refrigerant passage 63; it is not essential, however, to combine the second mode (gasification latent heat method) with the first mode. That is, when the second mode (gasification latent heat method) is adopted, the refrigerant passage 63 may be omitted, and even in this case as well, the adherent refrigerant 651 can realize the cooled portion 612.

In the third mode (air-cooling method), the air flow (air current) in the internal space Sp2 of the intake port 61 is used, thereby to form the cooled portion 612 on a part of the internal peripheral face 611 of the intake port 61. That is, for example, the velocity of air is increased by using a fan or the like, and air is caused to impinge on a part of the internal peripheral face 611 of the intake port 61; thereby, the site of the internal peripheral face 611 of the intake port 61, which site is exposed to air, is cooled by the airflow thereby to form the cooled portion 612. According to this configuration, it is possible, without otherwise using a refrigerant, to cool a part of the internal peripheral face 611 of the intake port 61 thereby to configure the cooled portion 612.

Further, in the engine system 1 according to the present embodiment, it is further useful to adopt the following configuration as the backfire countermeasure.

The first configuration is to provide a nozzle cooling configuration that cools the injection unit 31 of the fuel supply unit 3, cooling the gaseous fuel itself that is injected from the injection unit 31. The nozzle cooling configuration can be realized, as an example, by a refrigerant passage placed around the injection unit 31. This cools the injection unit 31 by the refrigerant, and suppresses heat entry from the cylinder head 6 to the injection unit 31, thus making it possible to suppress the temperature rise of the gaseous fuel. The refrigerant passage may, for example, extend from the cylinder head 6 in the width direction D3, or may extend upward from the cylinder head 6.

The second configuration is to provide a heat insulation material covering the injection unit 31 of the fuel supply unit 3 thereby to reduce the heat entry to the gaseous fuel injected from the injection unit 31. This suppresses the heat entry from the cylinder head 6 to the injection unit 31, thus making it possible to suppress the temperature rise of the gaseous fuel.

[5] Control Operation of Engine System

Then, the control operation of the engine system 1 according to the present embodiment is to be described with reference to FIGS. 22, 23 and 24. In the present embodiment, the engine control unit 20 controls the engine system 1 as described above, so the control operation of the engine system 1 described below includes a process executed by the engine control unit 20.

In the present embodiment, at the timing as shown in FIG. 22, the engine control unit 20 controls the fuel supply unit 3, injecting the gaseous fuel to the intake port 61. FIG. 22, with the abscissa as the crank angle, shows an opening degree G1 of the exhaust valve 73 and an opening degree G2 of the intake valve 72 ("valve opening degree"), the flow velocity of the intake air in the intake port 61 ("flow velocity"), and the internal peripheral face 611 (wall face)'s temperature ("temperature") in an area that is in the intake port 61 and that is near the combustion chamber 50. Here, according to an elapse of time, the crank angle continuously changes as the piston 21 reciprocates between BDC (bottom dead center) and TDC (top dead center). Therefore, the abscissa showing the crank angle corresponds to a time axis.

In FIG. 22, it is assumed that the piston 21 is at the BDC at a time point t0, the piston 21 is at the TDC at a time point t2, the piston 21 is at the BDC at a time point t7, and the backfire occurred at a time point t1. Here, the time point t1, being between the time point t0 and the time point t2, is a timing immediately after the intake valve 72 starts opening. In this case, at a time point t3 after the time point t2; when the exhaust valve 73 closes (opening degree G1 is 0), then, only after a cooling period T1 has elapsed, an injection permission period T2 for allowing for injecting of the gaseous fuel starts. Here, when the injection of the gaseous fuel is a split injection (intermittent injection), the period from the start of the first injection to the end of the last injection is performed within the injection permission period T2.

That is, in the present embodiment, after satisfying the supply start condition which includes the exhaust valve 73's closing, and after an elapse of the cooling period T1, the fuel supply unit 3 starts supplying the gaseous fuel to the internal space Sp2 of the intake port 61. The cooling period T1 is a period for cooling the cooled portion 612, and prohibits the injection of the gaseous fuel. Specifically, in addition to the exhaust valve 73's closing (opening degree G1 is 0), the start supply condition includes the intake valve 72's opening (opening degree G2 is greater than 0). In the example in FIG. 22, at the time point t3, the exhaust valve 73 is closed and the intake valve 72 is opened (at the time point t1 therebefore), satisfying the supply start condition. Therefore, when the cooling period T1 from the time point t3 to a time point t5 elapses, and the process enters the injection permission period T2, the fuel supply unit 3 can start injecting (supplying) the gaseous fuel.

According to this configuration, the cooling period T1 has been set before the supplying (injecting) of the gaseous fuel is started; therefore, after the cooled portion 612 has been securely cooled down, supplying of the gaseous fuel to the internal space Sp2 of the intake port 61 can be started. Therefore, even when the backfire should occur, the gaseous fuel is cooled by the cooled portion 612, making it easy to suppress the chain of backfires.

The end time point of the cooling period T1 is set at and after the time point at which the opening degree G2 of the intake valve 72 is maximized. That is, the time point t5 as the end time point of the cooling period T1 is set on the retarded side of the crank angle, viewed from a time point t4 when the opening degree G2 of the intake valve 72 is maximized (peak of opening degree G2).

According to this configuration, supplying of the gaseous fuel starts on and after the timing when the flow velocity of intake air in the intake port 61 is maximized, making it possible to more efficiently cooling the gaseous fuel. That is, the flow velocity of intake air in the intake port 61 is maximized when the opening degree G2 of the intake valve 72 is maximized; starting the supplying of the gaseous fuel at and after this timing (time point t4 in FIG. 22) improves the performance of cooling the gaseous fuel. The above further suppresses the chain of backfires with ease.

Further, the engine system 1 according to the present embodiment is provided with the turbocharger 8 that feeds air into the intake port 61. This makes it easier to feed the gaseous fuel into the combustion chamber 50 even if the timing of the start supplying the gaseous fuel is delayed by providing the cooling period T1. That is, the air velocity is accelerated by the turbocharger 8, allowing the gaseous fuel injected in the intake port 61 to more easily flow into the combustion chamber 50.

Here, as shown in FIG. 22, the injection permission period T2 is set in view of a grace period T3 inserted immediately before the intake valve 72's closing. The grace period T3 is a period during which injecting of the gaseous fuel is prohibited, like the cooling period T1. That is, from a time point t6, when the injection permission period T2 ends, until a time point t7, when the intake valve 72 closes (opening degree G2 is 0), injecting of the gaseous fuel is prohibited as the grace period T3. That is, the end time point of the cooling period T1 is set to a time point (t5 in FIG. 22) which is back from the time point t7, at which the intake valve 72 closes, by a total time of the grace period T3 and the injection permission period T2).

According to this configuration, remaining of the gaseous fuel in the intake port 61 is suppressed, which remaining is due to the intake valve 72 being closed at the point t6 when the injection permission period T2 ends. That is, even if the gaseous fuel remains in the intake port 61 at the time point t6 when the injection permission period T2 ends, the remaining gaseous fuel can be discharged to the combustion chamber 50 during the grace period T3.

Further, it is preferable that the length of the grace period T3 should be set based on the distance between (tip of) the injection unit 31 and the intake port 61's opening on the combustion chamber 50 side. The above distance is a distance on the air flow path in the intake port 61. Specifically, the longer the distance between (tip of) the injection unit 31 and the intake port 61's opening on the combustion chamber 50 side, the longer the grace period T3 is set. With this, the grace period T3 is set in view of the time required for the gaseous fuel, which is injected from the injection unit 31, to be discharged to the combustion chamber 50, making it difficult for the gaseous fuel to remain in the intake port 61.

By the way, the above configuration related to the control of the fuel supply unit 3 can be adopted independently of the configuration (ventilation port 502) for the blow-by gas exhaust countermeasure and independently of the cooled portion 612, etc. That is, the engine system 1 according to the one mode has the intake port 61 that supplies air to the combustion chamber 50, and the fuel supply unit 3 that supplies the gaseous fuel to the internal space Sp2 of the intake port 61. After satisfying the supply start condition including the exhaust valve 73's closing, and after an elapse of the cooling period T1, the fuel supply unit 3 starts supplying the gaseous fuel to the internal space Sp2 of the intake port 61.

Figure 23:
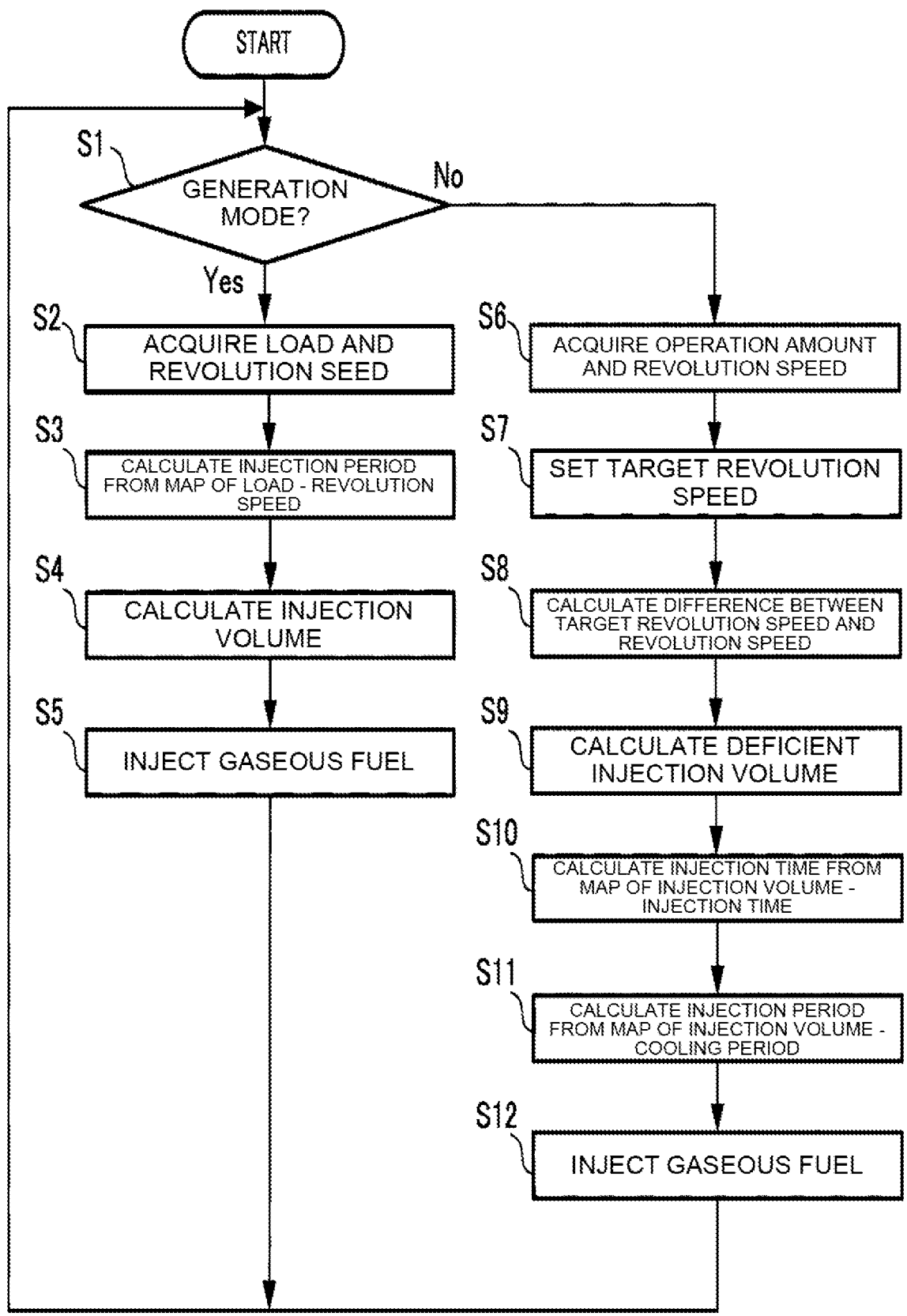
FIG. 23 is a flowchart showing an example of the controlling operation of the engine system according to the first embodiment.

FIG. 23 is a flowchart showing an example of the operation (process) of the engine control unit 20 for the injection of the gaseous fuel, which is seen when the engine system 1 is used to drive the generator 101 or to propel the hull 100.

That is, the engine control unit 20 first determines whether or not the engine system 1 is to be used to drive the generator 101 (S1). When the engine system 1 is used to drive the generator 101 (S1: Yes), the engine control unit 20 determines that the process is in the power generation mode, and moves the process to step S2. Meanwhile, when the engine system 1 is used to propel the hull 100 (S1: No), the engine control unit 20 determines that the process is not in the power generation mode, and moves the process to step S6.

In step S2, the engine control unit 20 acquires the generator 101's load and the engine body 2's revolution speed (actual revolution speed). Then, in light of the "map of load—revolution speed" showing the correlation between the generator 101's load and the engine revolution speed, the engine control unit 20 determines the gaseous fuel's injection period, i.e., the timing to start injecting the gaseous fuel (S3). Then, the engine control unit 20 calculates the gaseous fuel's injection volume (S4), and with an arrival of the gaseous fuel's injection time, so controls the fuel supply unit 3 as to inject the gaseous fuel (S5).

In step S6, the engine control unit 20 acquires the operation amount of (throttle lever of) the operation panel 102 and the revolution speed (actual revolution speed) of the engine body 2. Here, the engine control unit 20 sets the target revolution speed of the engine body 2 (S7), and calculates the difference between the target revolution speed and the actual revolution speed (S8). Further, the engine control unit 20 calculates the gaseous fuel's injection volume (deficient injection volume) that is deficient relative to the gaseous fuel's injection volume in the immediately preceding cycle. Then, in light of the "map of injection volume—injection time" showing the correlation between the gaseous fuel's injection volume and the gaseous fuel's injection time, the engine control unit 20 determines the gaseous fuel's injection time (S10). Further, in light of the "map of injection volume—cooling period" showing the correlation between the gaseous fuel's injection volume and the cooling period T1, the engine control unit 20 determines the gaseous fuel's injection period, that is, the timing to start injecting the gaseous fuel (S11). Then, with an arrival of the time for the gaseous fuel injection, the engine control unit 20 so controls the fuel supply unit 3 as to inject the gaseous fuel (S12).

The engine control unit 20 repeatedly executes the processes in the above step S1 to step S12. However, the flowchart shown in FIG. 23 is merely one example, and therefore, the process may be properly added or omitted, or the order of the processes may be properly changed.

Figure 24:
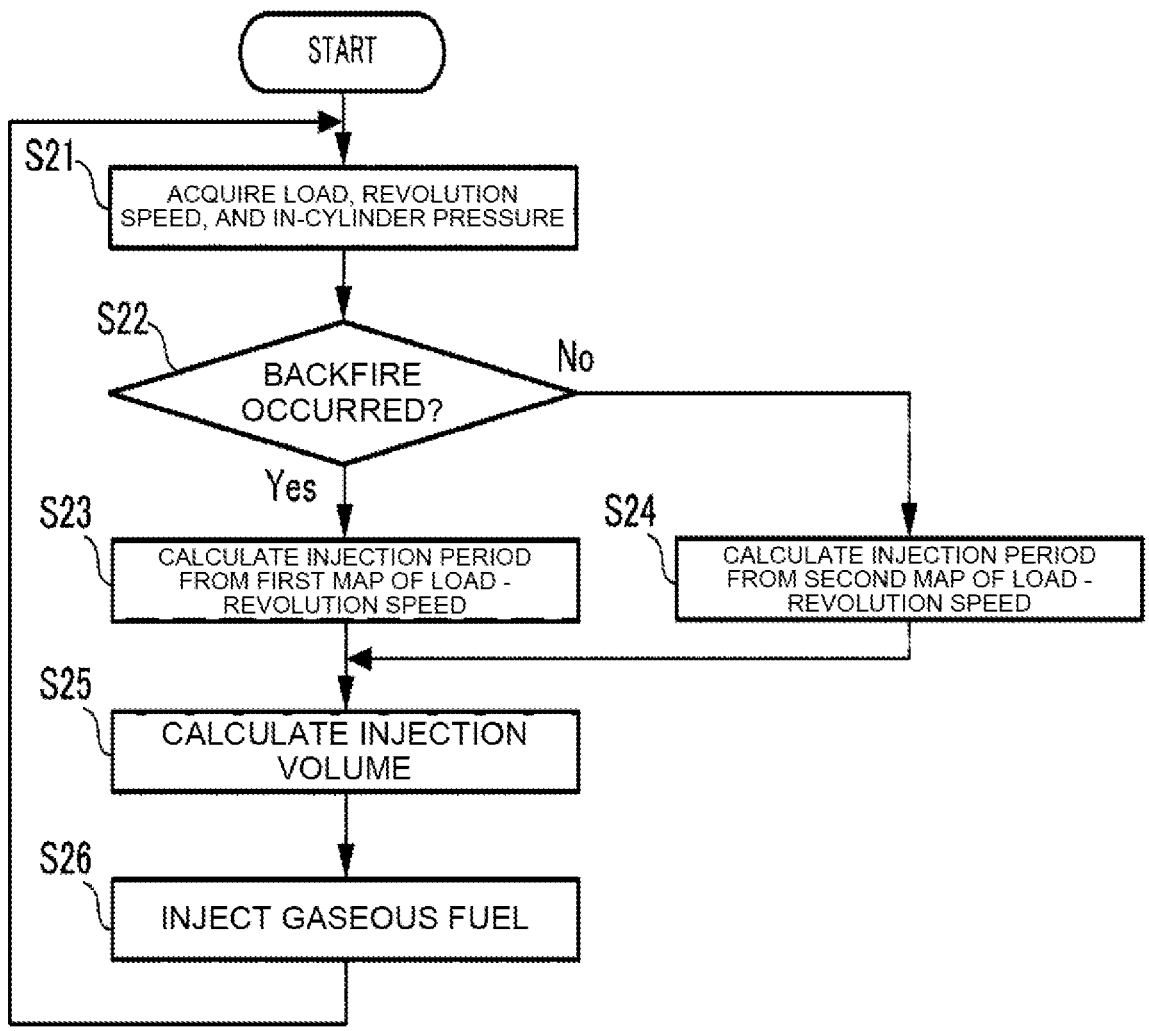
FIG. 24 is a flowchart showing an example of the controlling operation of the engine system according to the first embodiment.

FIG. 24 is a flowchart showing an example of the operation (process) of the engine control unit 20, where a cooling period T1 is provided at the time of occurrence of the backfire, when the engine system 1 is used to drive the generator 101.

That is, the engine control unit 20 first acquires the generator 101's load, the revolution speed (actual revolution speed) of the engine body 2, and the pressure (in-cylinder pressure) of the combustion chamber 50 (S21). Here, the in-cylinder pressure is acquired from the in-cylinder pressure sensor 76, and is information on whether or not the backfire should occur. Then, the engine control unit 20 determines whether or not the backfire is occurring, for example, based on the in-cylinder pressure (S22). When the occurrence of backfire is detected from the waveform, etc. of the in-cylinder pressure (S22: Yes), the engine control unit 20 moves the process to step S23. Meanwhile, when no backfire is detected from the waveform, etc. of the in-cylinder pressure (S22: No), the engine control unit 20 moves the process to step S24.

In step S23, in light of the "first map of load—revolution speed" showing the correlation between the generator 101's load and the engine revolution speed, the engine control unit 20 determines the gaseous fuel's injection period, i.e., the timing to start injecting the gaseous fuel. The "first map of load—revolution speed" is a map prepared for the occurrence of the backfire, and is for setting the gaseous fuel's injection period in view of the cooling period T1.

In step S24, in light of the "second map of load—revolution speed" showing the correlation between the generator 101's load and the engine revolution speed, the engine control unit 20 determines gaseous fuel's injection period, i.e., the timing to start injecting the gaseous fuel. The "second map of load—revolution speed" is a map prepared for a steady state where the backfire is not occurring, and is for setting the gaseous fuel's injection period not in view of the cooling period T1.

Then, the engine control unit 20 calculates the gaseous fuel's injection volume (S25), and with an arrival of the gaseous fuel's injection period, so controls the fuel supply unit 3 as to inject the gaseous fuel (S26).

The engine control unit 20 repeatedly executes the processes in the above step S21 to step S26. However, the flowchart shown in FIG. 24 is merely one example, and therefore, the process may be properly added or omitted, or the order of the processes may be properly changed.

[6] Modified Example

A description will hereinafter be made on a modified example of the first embodiment. The modified examples, which will be described below, can be applied in a proper combination.

The engine system 1 in the present disclosure includes a computer system as the engine control unit 20. The computer system has, as hardware, one or more processors and one or more storages. Executing the program recorded in the storage of the computer system realizes the function as the engine control unit 20 in the present disclosure. The program may be preliminarily recorded in the storage of the computer system, may be provided through an electric communication line, or may be may be provided in a manner to be recorded in a non-transitory recording medium, such as a storage card, an optical disk, a hard disk drive, or the like, each of which is readable by the computer system. Further, a part of or all of the function units included in the engine control unit 20 may be composed of an electronic circuit.

Further, a configuration in which at least a part of the functions of the engine system 1 is concentrated in one case is not essential for the engine system 1, and the components of the engine system 1 may be provided in a multiplicity of cases in a distributed manner. Conversely, in the first embodiment, functions that are distributed to a multiplicity of units (such as engine body 2 and generator 101) may be concentrated in one case.

Further, not limited to being installed on the hull 100, at least a part of the engine system 1 may be provided separate from the hull 100. As an example, when the engine control unit 20 is embodied by a server unit provided separate from the hull 100, a communication between the server unit and (communication unit of) the hull 100 makes it possible for the engine control unit 20 to control the engine system 1. At least a part of the functions of the engine control unit 20 may be realized by a cloud (cloud computing) or the like.

The ship 10 is not limited to the pleasure boat, and may be a commercial ship such as a cargo ship or a passenger ship, a workboat such as a tugboat or a salvage boat, a special ship such as a meteorological observation ship or a training ship, a fishing ship, a naval ship, or the like. Further, the ship 10 is not limited to the ship of the manned type boarded by the navigator, and may be an unmanned type ship that can be remotely operated by a person (the navigator) or autonomously operated. In addition to the engine body 2, the hull 100 of the ship 10 may be provided with one or more dynamic power sources such as a motor (electric motor). The engine system 1 may be used for an application other than the ship 10.

Figure 25:
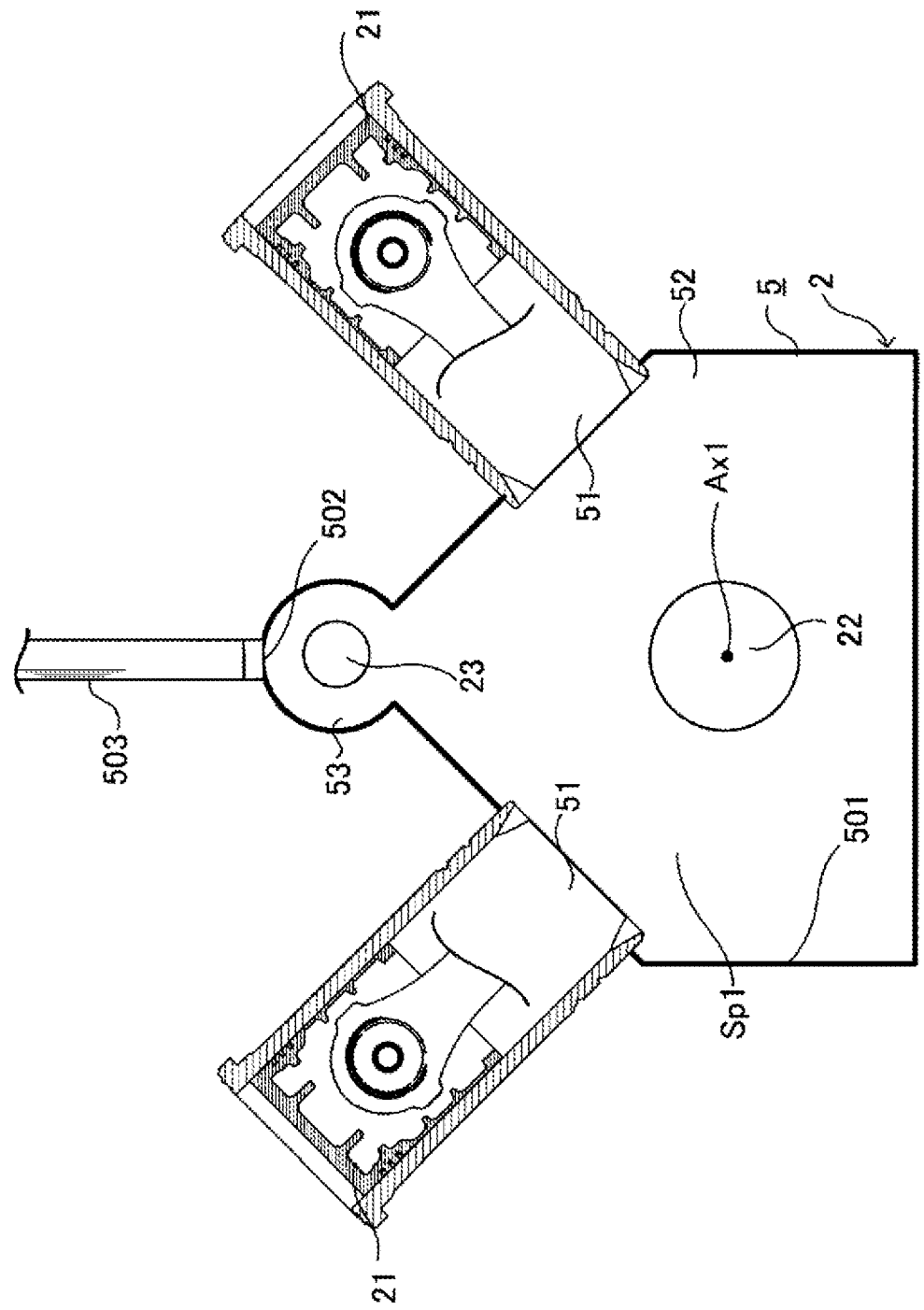
FIG. 25 is a schematic view showing the positional relation between the cylinder, the crank chamber and the cam chamber in the engine system according to a modified example of the first embodiment.

The engine system 1 is not limited to the in-line multi-cylinder engine in which multiple cylinders 51 are arranged in line, but can also be, for example, a V-type engine in which multiple cylinders 51 are placed in a V-shape with the crankshaft 22's rotational axis Ax1 at the apex, or a horizontally opposed engine. In the case of the V-type engine, as shown in FIG. 25, within the bank angle between the cylinders 51 on both sides, for example, the cam chamber 53, which connects to the internal space Sp1 of the crank chamber 52, is placed. Even with this configuration, the ventilation port 502 is formed in the cam chamber 53, for example, thereby making it possible to efficiently discharge the blow-by gas from the crank chamber 52.

The engine system 1 may be a single-cylinder engine provided with only one cylinder 51. The engine system 1 is not limited to the dual-fuel engine, but can also be, for example, an engine (e.g., a hydrogen-only engine) that uses only the gaseous fuel (e.g., hydrogen) as fuel. The engine system 1 is not limited to an engine with the turbocharger, but can also be a naturally aspirated engine without the turbocharger 8.

Further, the fuel supply method of the gaseous fuel is not limited to the port injection method in which the fuel is injected into the intake port 61, but may also be a direct injection method in which the fuel is injected directly into the combustion chamber 50. In this case, the injection unit 31, which injects the gaseous fuel, is placed in a position facing the combustion chamber 50.

Further, the ventilation port 502 is not required to be ordinarily open, and may be configured to open and close with a valve unit, for example. In this case, during the period of opening the ventilation port 502, the blow-by gas is discharged from the ventilation port 502, and during the period of closing the ventilation port 502, no the blow-by gas is discharged from the ventilation port 502.

Second Embodiment

Figure 26:
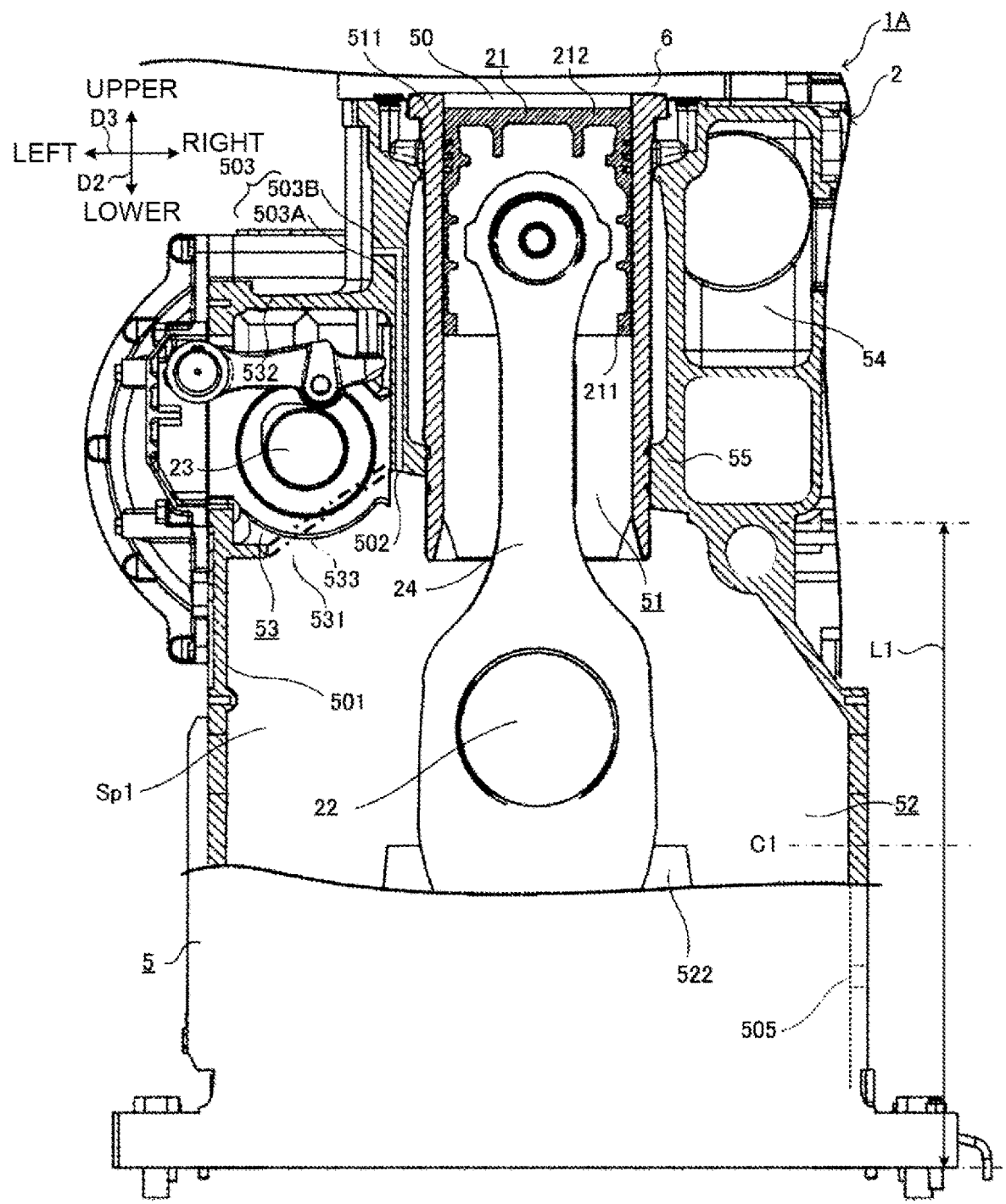
FIG. 26 is a schematic view partially breaking an essential portion of the engine body of the engine system according to a second embodiment.
Figure 27:
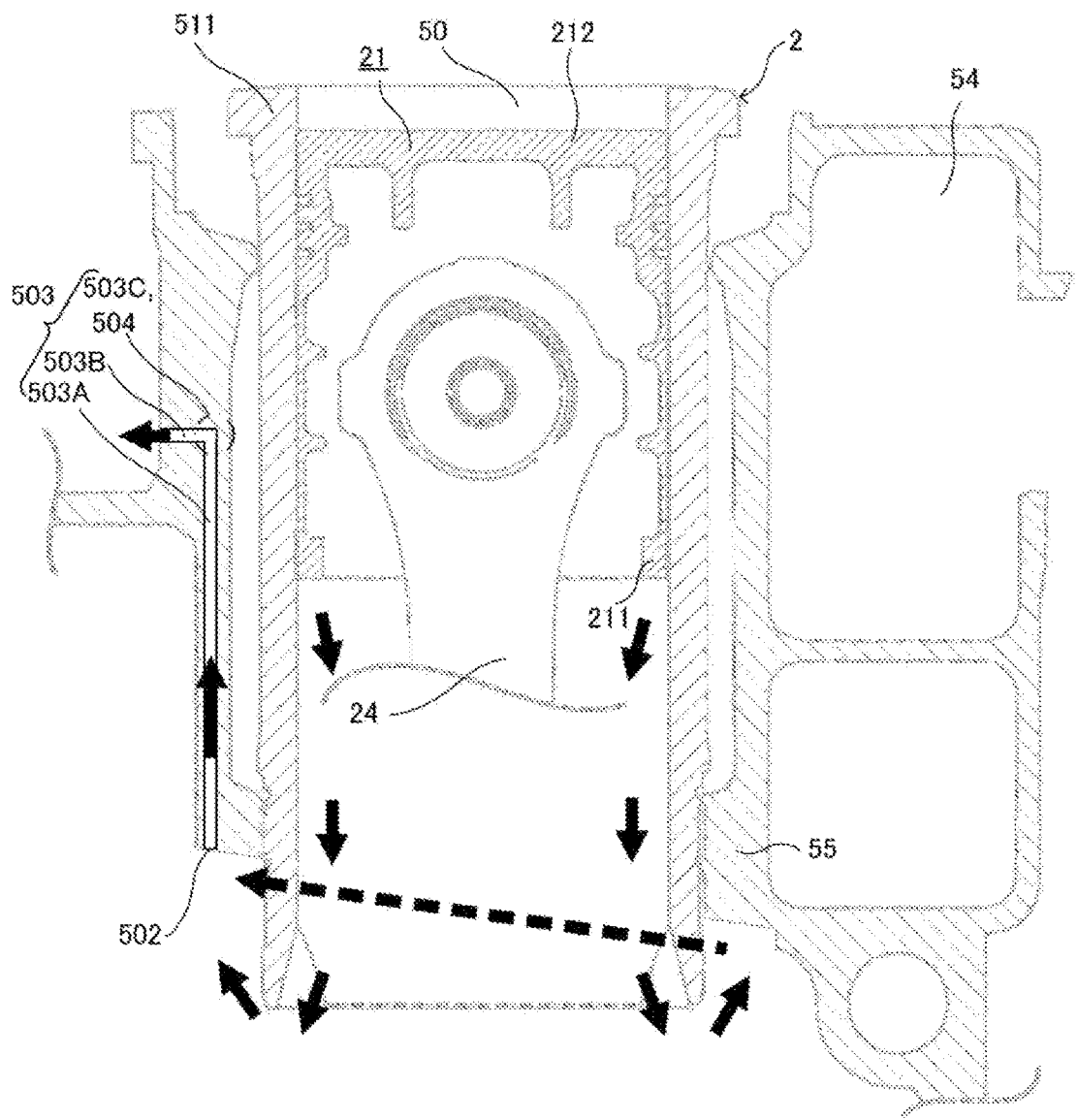
FIG. 27 is a schematic explanatory view of the blow-by gas flow in the engine system according to the second embodiment.

An engine system 1A according to the present embodiment differs from the engine system 1 according to the first embodiment in the position of the ventilation port 502, as shown in FIG. 26 and FIG. 27. Hereinafter, the same components as those in the first embodiment will be denoted by the same reference signs, and the description thereof will be properly omitted. In FIG. 27, the flow of the blow-by gas is shown by the bold arrow.

That is, as shown in FIG. 26, according to the present embodiment, the cylinder block 5 has the liner support wall 55 that supports the cylinder liner 511 included in the cylinder 51. The lower end of the cylinder liner 511 protrudes downward from the lower end of the liner support wall 55. Here, the ventilation port 502 is placed at the lower end of the liner support wall 55. Specifically, the ventilation port 502 is formed at a circumferential part in the lower face of the cylindrical liner support wall 55 that surrounds the cylinder liner 511. In the example in FIG. 26, of the lower face of the liner support wall 55, the ventilation port 502 is formed in a position on the left of the cylinder liner 511. Here, according to the present embodiment, as shown by the imaginary line (double-dashed line) in FIG. 26, the opening portion 531 of the cam chamber 53 has a cam chamber wall 533 that partitions the internal space of the cam chamber 53 from the internal space Sp1 of the crank chamber 52. The cam chamber wall 533 may completely separate the internal space of the cam chamber 53 from the internal space Sp1 of the crank chamber 52, or may partially partition the internal space of the cam chamber 53 from the internal space Sp1 of the crank chamber 52.

The ventilation passage 503 connecting to the ventilation port 502 includes a longitudinal passage 503A which extends straight upward along the up/down direction D2 from the ventilation port 502, and a transverse passage 503B which extends from the upper end portion of the longitudinal passage 503A to the left along the width direction D3. The longitudinal passage 503A may extend upward from the ventilation port 502 along the up/down direction D2, therefore, may extend diagonally upward from the ventilation port 502, or may meander upward from the ventilation port 502, for example. This ventilation passage 503 is an in-wall passage formed inside the liner support wall 55. Thus, including the longitudinal passage 503A and the transverse passage 503B which have different extension directions, the ventilation passage 503 has an inflected portion 503C (see FIG. 27) at a connection site between the longitudinal passage 503A and the transverse passage 503B. That is, the connection site between the longitudinal passage 503A and the transverse passage 503B forms the inflected portion 503C.

According to the configuration described above, as shown in FIG. 27, the blow-by gas is efficiently discharged from the internal space Sp1 of the crank chamber 52 via the ventilation port 502 (and ventilation passage 503). That is, the uncombusted gas or the like leaks from the combustion chamber 50 to the crank chamber 52 through the gap between the cylinder 51 and the piston 21, generating the blow-by gas. In the present embodiment, using the gaseous fuel (hydrogen) with the specific gravity smaller than 1 also makes the specific gravity smaller than 1 for the blow-by gas, thereby to cause the blow-by gas having leaked out to the crank chamber 52 to move upward in the crank chamber 52. The lower end of the cylinder liner 511 protrudes downward from the lower end of the liner support wall 55; therefore, the blow-by gas leaking out from the lower end of the cylinder liner 511 to the crank chamber 52 moves toward the lower face of the upwardly recessed liner support wall 55, in a manner to be folded back at the lower end of the cylinder liner 511. As a result, the blow-by gas is discharged from the ventilation port 502 at the lower end (lower face) of the liner support wall 55, and is discharged through the ventilation passage 503 to the external space out of the cylinder block 5.

Here, the lower end (lower face) of the liner support wall 55 is inclined rather than perpendicular to the central axis of the cylinder 51. That is, as shown in FIG. 27, the lower face of the liner support wall 55 has a "left upward" inclination so that the end portion (left end portion) side where the ventilation port 502 is provided is positioned higher up.

Therefore, the blow-by gas that stays at the lower end of the liner support wall 55 is collected on the left end side by the inclination of the lower face of the liner support wall 55, bypassing around the cylinder liner 511. Thus, the blow-by gas is efficiently discharged from the ventilation port 502 provided at the left end portion of the lower end of the liner support wall 55.

According to the present embodiment, the inflected portion 503C of the ventilation passage 503 functions as the gas/liquid separating portion 504. In short, with the above inflected portion 503C (gas/liquid separating portion 504) provided, the blow-by gas introduced from the ventilation port 502 to the ventilation passage 503 flows in the ventilation passage 503 in such a manner as to impinge on an impinging face of the longitudinal passage 503A at the time of passing the inflected portion 503C as the gas/liquid separating portion 504. When the blow-by gas contacts the internal peripheral face of the inflected portion 503C as the gas/liquid separating portion 504, the liquid such as oil or moisture that is discharged together with the blow-by gas adheres to the internal peripheral face of the inflected portion 503C as the gas/liquid separating portion 504. With this, the liquid (oil or moisture, etc.) discharged together with the blow-by gas is captured by the gas/liquid separating portion 504 and is separated from the gas included in the blow-by gas.

Thus, in the present embodiment, the ventilation passage 503 has the inflected portion 503C that changes the direction of the gas distribution. The gas/liquid separating portion 504 includes an inflected portion 503C.

As a result, the blow-by gas is exhausted from the ventilation passage 503 with at least a part of the liquid component such as oil removed, connecting to suppressing of oil consumption, etc. involved in the exhausting of the blow-by gas.

The cam chamber wall 533 is not an essential component, and may be properly omitted. The configuration (including the modified examples) according to the second embodiment can be adopted in proper combination with the various configurations (including the modified examples) described in the first embodiment.

Third Embodiment

Figure 28:
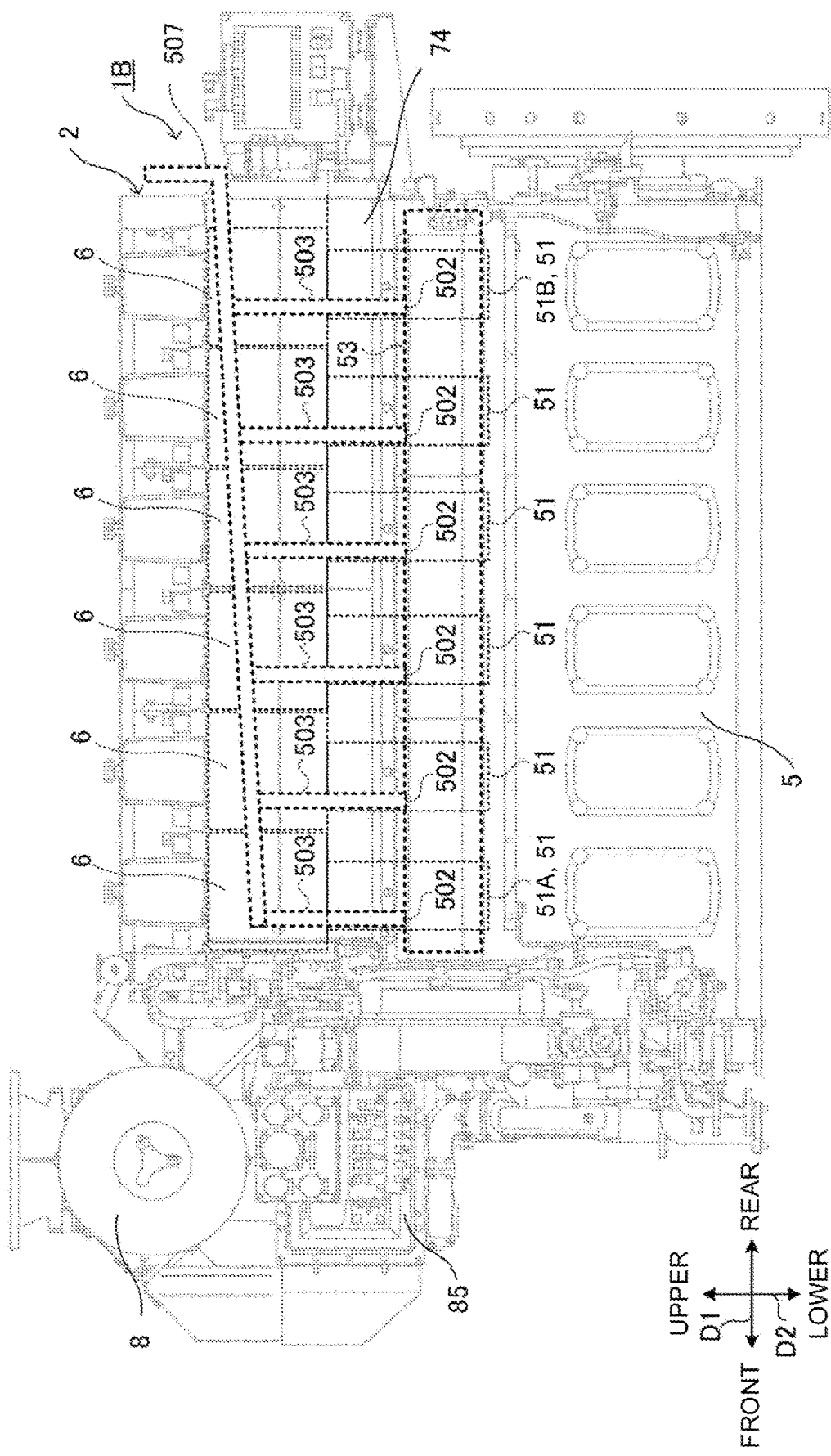
FIG. 28 is a schematic left side view of the engine body of the engine system according to a third embodiment.

An engine system 1B according to the present embodiment differs from the engine system 1 according to the first embodiment in that, as shown in FIG. 28, multiple ventilation ports 502 are so provided as to correspond one-to-one to the multiple cylinders 51. Hereinafter, the same components as those in the first embodiment will be denoted by the same reference signs, and the description thereof will be properly omitted.

That is, according to the present embodiment, the cylinders 51 multiple (six) in number are so provided as to be arranged in the output axis direction D1. Here, at six positions in the output axis direction D1, the ventilation ports 502 are formed in the cam chamber 53 in a manner to correspond to all of the multiple cylinders 51. The multiple ventilation passages 503 are provided in such a manner as to respectively extend upward from the multiple (six in the present embodiment) ventilation ports 502.

Here, the tip positions (upper end portions) of the multiple ventilation passages 503 connect to a single common exhaust pipe 507. The common exhaust pipe 507 extends along the output axis direction D1, with its tip (the rear end in the present embodiment) positioned in the external space out of the engine body 2. With this, the blow-by gas respectively generated in the respective multiple cylinders 51 are concentrated in the common exhaust pipe 507 through the ventilation port 502 and the ventilation passage 503, to be discharged through the common exhaust pipe 507 to the external space out of the engine body 2.

In the present embodiment, the common exhaust pipe 507 is inclined rather than parallel to the rotational axis Ax1 of the crankshaft 22. That is, as shown in FIG. 28, the common exhaust pipe 507 has a "rear upward" inclination so that one end (rear end in the present embodiment) side in the output axis direction D1 is positioned more upward. Therefore, at the tip side (rear end side) of the common exhaust pipe 507, the inclination of the common exhaust pipe 507 collects the blow-by gas concentrated in the common exhaust pipe 507. Thus, the blow-by gas is efficiently discharged from the common exhaust pipe 507.

The configuration according to the third embodiment can be adopted in proper combination with various configurations (including the modified example) described in the first embodiment or the second embodiment.

Fourth Embodiment

Figure 29:
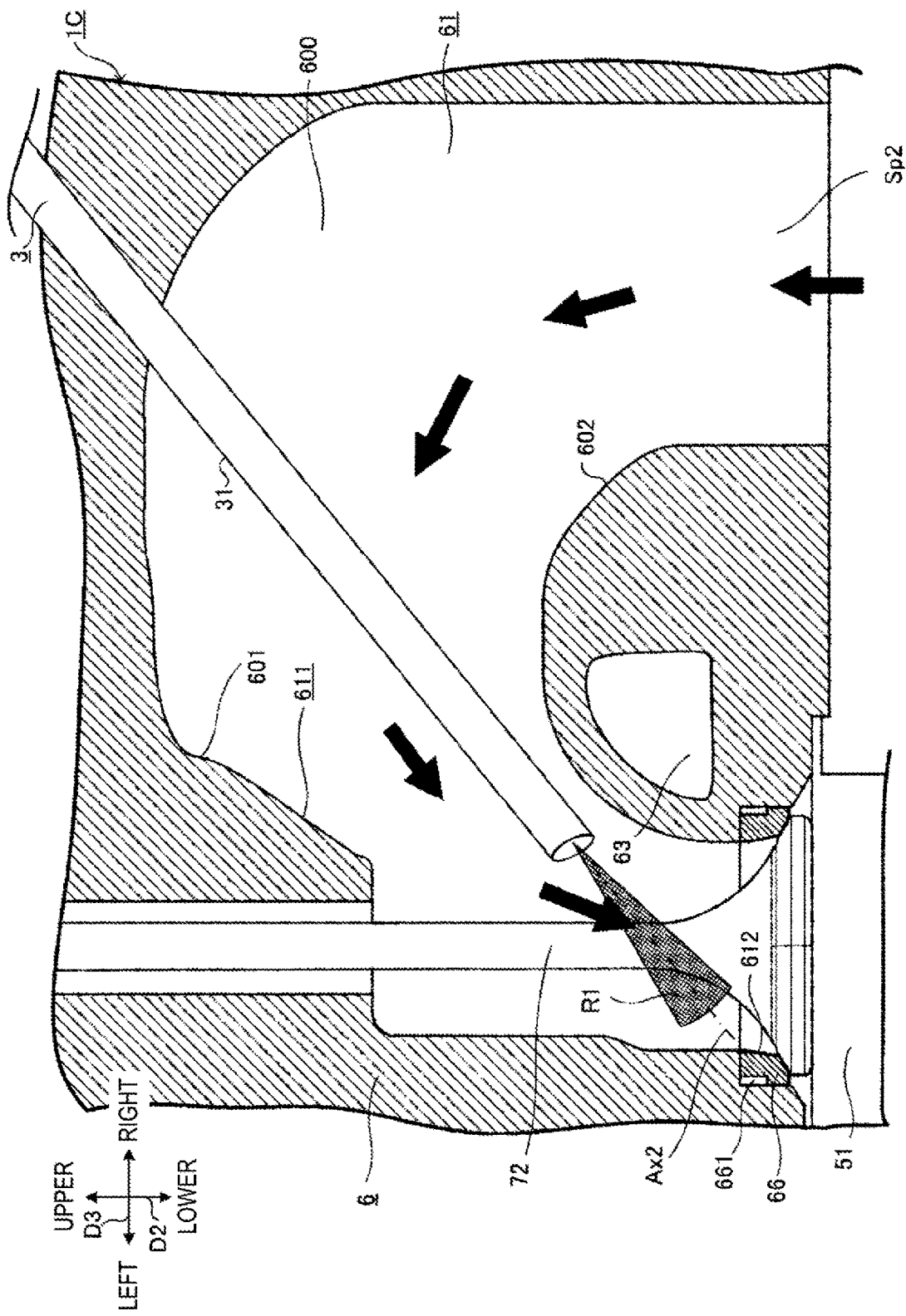
FIG. 29 is a schematic cross sectional view showing the configuration around the intake port of the engine system according to a fourth embodiment.

An engine system 1C according to the present embodiment differs from the engine system 1 according to the first embodiment in that the cooled portion 612 is placed on the external peripheral side face 601, as shown in FIG. 29. Hereinafter, the same components as those in the first embodiment will be denoted by the same reference signs, and the description thereof will be properly omitted.

That is, in the present embodiment, the intake port 61 has the curved portion 600 having a cross sectional shape that is convexed toward one direction. The cooled portion 612 is placed on the curved portion 600's face on the one direction (here upward) side, of the internal peripheral face 611 of the intake port 61, that is, placed on the external peripheral side face 601. That is, the internal peripheral face 611 includes the external peripheral side face 601 which is the curved portion 600's face on the one direction (here upward) side, and the internal peripheral side face 602 which is the curved portion 600's face on the other direction (here downward) side, placing the cooled portion 612 at the external peripheral side face 601.

Thus, the cooled portion 612 is placed at the external peripheral side face 601, making it easier for the gaseous fuel, which is injected from the injection unit 31, to arrive at the cooled portion 612 even if being flown away by the airflow of the air. In short, since the airflow in the curved portion 600 passes mainly near the external peripheral side face 601, the cooled portion 612, by being present on the external peripheral side face 601, makes it easier to cool the gaseous fuel by the cooled portion 612. Therefore, the gaseous fuel's cooling effect by the cooled portion 612 can be fully demonstrated.

Here, setting the relatively long nozzle length of the injection unit 31 enhances the directivity of the gaseous fuel injected from the injection unit 31. That is, the longer the injection unit 31 is, the more improved the directivity of the gaseous fuel injected from the injection unit 31, further making it easier for the gaseous fuel to arrive at the cooled portion 612.

By the way, as an example in the present embodiment, a valve seat portion 66 is used, as shown in FIG. 29, so as to realize the cooled portion 612 placed on the external peripheral side face 601. That is, the valve seat portion 66 for seating the intake valve 72 is provided at the intake port 61's end portion on the combustion chamber 50 side. The cooled portion 612 is placed at the valve seat portion 66. Specifically, a refrigerant passage 661 for passing the refrigerant is formed on the valve seat portion 66's face opposite the internal space Sp2 of the intake port 61. Flowing of the refrigerant in this refrigerant passage 661 cools the valve seat portion 66, cooling the cooled portion 612 provided at the valve seat portion 66. That is, the first mode (refrigerant cooling method) is adopted as the specific mode of the cooled portion 612.

According to this configuration, the gaseous fuel can be cooled at the valve seat portion 66 closest to the combustion chamber 50, of the intake port 61. Therefore, even if a flame (or heated gas) flows into the intake port 61 from the combustion chamber 50 due to the backfire, the cooled portion 612 provided at the inlet (valve seat portion 66) of the intake port 61 can perform cooling, making it possible to further suppress the chain of backfires.

Figure 30:
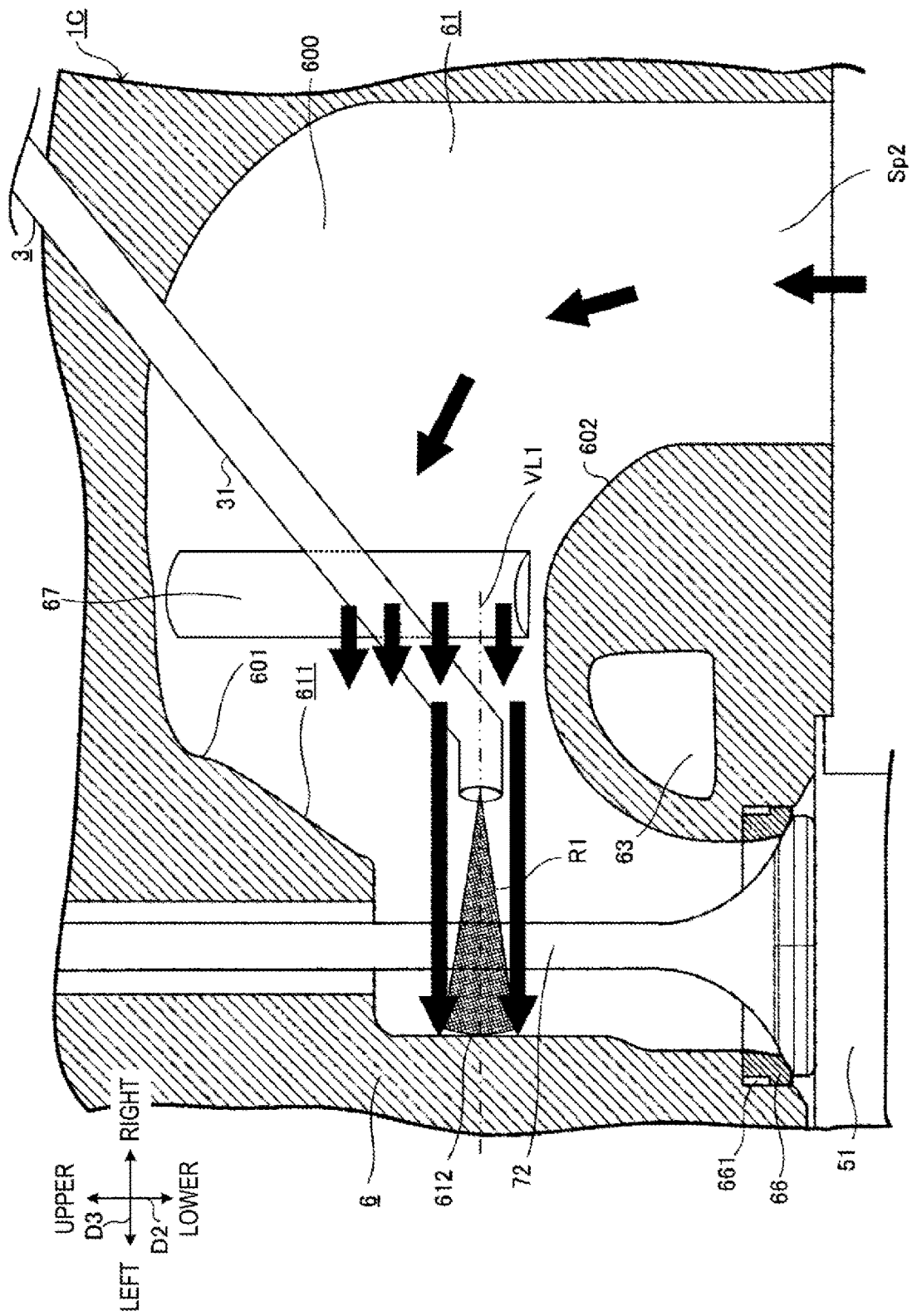
FIG. 30 is a schematic cross sectional view showing the configuration around the intake port of the engine system according to a modified example of the fourth embodiment.

As a modified example of the fourth embodiment, a throttle portion 67 may be used so as to realize the cooled portion 612 placed on the external peripheral side face 601, as shown in FIG. 30. Of the intake port 61's site, the throttle portion 67 with a locally reduced cross sectional area perpendicular to the airflow, that is, the flow path's cross sectional area. That is, the flow path's cross sectional area of the intake port 61 is not uniform, that is, at least at the throttle portion 67, is smaller (narrower) than the upstream and downstream of the throttle portion 67. The above throttle portion 67 is embodied by a rib or the like formed on the internal peripheral face 611 of the intake port 61. In the example shown in FIG. 30, the rib protruding from the internal peripheral face 611 of the intake port 61 rearward (toward the front side of the paper in FIG. 30) constitutes the throttle portion 67 that locally narrows the flow path's cross sectional area of the intake port 61.

With the above throttle portion 67 provided, the air with increased flow velocity seen when passing through the throttle portion 67 moves substantially linearly, thereby impinge on the internal peripheral face 611 (in this case, external peripheral side face 601) of the intake port 61. This allows the site of the internal peripheral face 611 of the intake port 61, which site is exposed to air, to be cooled by the airflow, making it possible to form the cooled portion 612. In short, in the example shown in FIG. 30, the intake port 61 has the throttle portion 67 that has the partially reduced cross sectional area perpendicular to the airflow. The cooled portion 612 includes, of the internal peripheral face 611 of the intake port 61, an intersection with a virtual line VL1 perpendicularly extending from a cross section of the throttle portion 67 in the intake port 61 toward the downstream side of the airflow. Thus, the cooled portion 612 realized by using the throttle portion 67 is a type of the third mode (air-cooling method).

According to this configuration, merely providing the throttle portion 67 can realize the cooled portion 612 by the air-cooling method, without using a fan or the like to increase the air velocity.

Thus, it is possible to simplify the configuration for realizing the cooled portion 612. In the example in FIG. 30, the refrigerant passage 661 at the valve seat portion 66 can be omitted.

According to the present embodiment, the refrigerant passage 63 can be properly omitted. The configuration (including the modified example) according to the fourth embodiment can be adopted in proper combination with the various configurations (including the modified examples) described in the first, second, or third embodiment.

REFERENCE SIGNS LIST 1, 1A to 1C: engine system
3: fuel supply unit
5: cylinder block
6: cylinder head
8: turbocharger
23: camshaft
31: injection unit
50: combustion chamber
51: cylinder
51A: one end side cylinder
51B: another end side cylinder
52: crank chamber
53: cam chamber
55: liner support wall
61: intake port
63: refrigerant passage
64: bulkhead portion
65: refrigerant supply unit
66: valve seat portion
67: throttle portion
72: intake valve
210: in-piston space
212: bulkhead
213: stirring portion
214: cavity portion
501: internal peripheral face (of cylinder block)
502: ventilation port
503: ventilation passage
503C: inflected portion
504 gas/liquid separating portion
511: cylinder liner
505: gas introduction port
506: airflow forming portion
600: curved portion
601: external peripheral side face (one directional side face)
611: internal peripheral face (of intake port)
612: cooled portion
641: thin wall portion
642: thick wall portion
651: adherent refrigerant
Ax1: rotational axis
Ax2: central axis
C1: center
D1: output axis direction
D2: up/down direction
G2: opening degree (of intake valve)
R1: injection area
Sp1: internal space (of crank chamber)
Sp2: internal space (of intake port)
T1: cooling period
VL1: virtual line

The invention claimed is:

1. An engine system in which blow-by gas with a specific gravity less than 1 with reference to air is generatable, the engine system comprising:
   a cylinder block including a cylinder and a crank chamber which are arranged in an up/down direction, the crank chamber being positioned below the cylinder,
   wherein
   an internal peripheral face of the cylinder block has a ventilation port that is open and connects to a ventilation passage that connects an internal space of the crank chamber with an external space outside of the cylinder block, the ventilation port is placed above a center in the up/down direction of the crank chamber, an internal peripheral face of the cylinder block has a gas introduction port that is open and connects the internal space of the crank chamber with the external space out of the cylinder block, and the engine system further comprises an airflow forming portion that forms an airflow from the gas introduction port toward the ventilation port, in an output axis direction along a rotational axis of a crankshaft placed in the crank chamber, the ventilation port and the gas introduction port are placed at positions different from each other, the cylinder includes multiple cylinders provided to be arranged in the output axis direction, the multiple cylinders include a one end side cylinder and another end side cylinder which are positioned on both sides of the multiple cylinders in the output axis direction, the ventilation port is placed at a position that corresponds to the one end side cylinder, and the gas introduction port is placed at a position that corresponds to the other end side cylinder.

2. The engine system according to claim 1, wherein the ventilation port is placed above a lower end of the cylinder.

3. The engine system according to claim 1, wherein the ventilation port is open downward.

4. The engine system according to claim 1, wherein:
the cylinder block further includes a cam chamber that connects to the crank chamber and that houses a camshaft, and
the ventilation port is formed in the cam chamber.

5. The engine system according to claim 1, wherein the ventilation passage has a gas/liquid separating portion configured to separate a gas from a liquid.

6. The engine system according to claim 5, wherein:
the ventilation passage has an inflected portion where a direction of gas distribution changes, and
the gas/liquid separating portion includes the inflected portion.

7. The engine system according to claim 1, wherein:
the cylinder block has a liner support wall configured to support a cylinder liner constituting the cylinder,
a lower end of the cylinder liner protrudes downward from a lower end of the liner support wall, and
the ventilation port is placed at the lower end of the liner support wall.

8. The engine system according to claim 1, wherein the ventilation port and the gas introduction port are, in a plan view, placed on opposite sides such that the rotational axis of the crankshaft placed in the crank chamber is positioned between the ventilation port and the gas introduction port.

9. The engine system according to claim 1, further comprising:
a piston configured to reciprocate along the up/down direction in the cylinder, wherein the piston includes an internal space inside the piston, and
a stirring portion configured to reciprocate along the up/down direction as the piston moves.

10. The engine system according to claim 9, wherein the piston includes a bulkhead that separates an internal space of the cylinder from the piston in the up/down direction, and wherein the bulkhead has a cavity portion inside the bulkhead.

11. The engine system according to claim 1, comprising:
an intake port configured to supply air to a combustion chamber, and
a fuel supply unit configured to supply a gaseous fuel to an internal space of the intake port,
wherein:
the fuel supply unit has an injection unit configured to inject the gaseous fuel, and
at least an intersection with a central axis of an injection area of the gaseous fuel from the injection unit has a cooled portion.

12. The engine system according to claim 11, further comprising:
a cylinder head formed with the intake port,
wherein:
the cylinder head has a refrigerant passage through which a refrigerant is configured to pass, and
the cooled portion is placed at a bulkhead portion that physically separates at least the refrigerant passage from the intake port.

13. The engine system according to claim 12, wherein the bulkhead portion includes:
a thin wall portion having a thickness between the refrigerant passage and the intake port smaller than a reference thickness, and
a thick wall portion having a thickness between the refrigerant passage and the intake port greater than the reference thickness, and
of the thin wall portion and the thick wall portion, only the thin wall portion has the cooled portion.

14. The engine system according to claim 11, further comprising:
a refrigerant supply unit configured to adhere an adherent refrigerant to a part of the internal peripheral face of the intake port,
wherein the cooled portion is placed at at least a site to which the adherent refrigerant adheres.

15. The engine system according to claim 11, wherein:
the intake port has a throttle portion with a partially reduced cross sectional area perpendicular to an airflow of the air, and
the cooled portion includes an intersection between the internal peripheral face of the intake port and a virtual line perpendicularly extending from a cross section of the throttle portion in the intake port toward a downstream side of the airflow.

16. The engine system according to claim 15, wherein, in the intake port, the cooled portion is placed more downstream of the airflow of the air than the injection unit.

17. The engine system according to claim 11, wherein:
the intake port has a curved portion having a cross sectional shape that is convexed toward one direction, and
the cooled portion is placed on a face of the curved portion on a side associated with the one direction, of the internal peripheral face of the intake port.

18. The engine system according to claim 11, wherein:
a valve seat portion for seating an intake valve is provided at an end portion of the intake port on a combustion chamber side, and
the cooled portion is placed at the valve seat portion.

19. The engine system according to claim 18, wherein, after satisfying a supply start condition which includes an exhaust valve's closing, and after an elapse of a cooling period, the fuel supply unit starts supplying the gaseous fuel to the internal space of the intake port.

20. The engine system according to claim 19, wherein an end time point of the cooling period is after a time point at which an opening degree of the intake valve is maximized.

21. The engine system according to claim 11, further comprising:
   a turbocharger configured to feed the air into the intake port.

* * * * *